US011903899B2

(12) United States Patent
Smith, Jr. et al.

(10) Patent No.: US 11,903,899 B2

(45) **Date of Patent: *Feb. 20, 2024**

(54) MASSAGE APPARATUS, SYSTEMS AND METHODS

(71) Applicant: RLSmith Holdings LLC, Dallas, TX (US)

(72) Inventors: Richard Loy Smith, Jr., Dallas, TX (US); Mitchell Edmund Ziska, Little Elm, TX (US); Jerry Douglas Leopold, Yukon, OK (US); James Alan Palma, Jr., Coppell, TX (US)

(73) Assignee: RLSmith Holdings LLC, Dallas, TX (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/074,422

(22) Filed: Oct. 19, 2020

(65) Prior Publication Data

US 2021/0100718 A1 Apr. 8, 2021

Related U.S. Application Data

(63) Continuation of application No. 16/731,687, filed on Dec. 31, 2019, now Pat. No. 10,806,660, which is a (Continued)

(51) Int. Cl.
*A61H 9/00* (2006.01)

(52) U.S. Cl.
CPC ... *A61H 9/0007* (2013.01); *A61H 2201/0153* (2013.01); *A61H 2201/1685* (2013.01)

(58) Field of Classification Search
CPC .... A61H 9/00–0007; A61H 2201/0153; A61H 2201/1685; A61H 2201/1207;
(Continued)

(56) References Cited

U.S. PATENT DOCUMENTS 3,099,837 A * 8/1963 Heilman ................ B25C 1/005 227/112
3,837,335 A 9/1974 Teranishi
(Continued)

OTHER PUBLICATIONS

"Percussion: Massage Technique: Massage Therapy: Holistic Therapies." Dec. 13, 2016. IvyRoses. Retrieved from: https://web.archive.org/web/20161213232809/https://www.ivyroses.com/Define/Percussion (Year: 2016).

*Primary Examiner* — Rachel T Sippel
*Assistant Examiner* — Jacqueline M Pinderski
(74) *Attorney, Agent, or Firm* — Knobbe Martens Olson & Bear, LLP

(57) ABSTRACT

A massage system includes a massage head configured to contact a treatment region of a patient during a massage treatment procedure, a body having a handle, a connector having a first end and a second end, wherein the first end is releasable secured to the body and the second end is coupled to the massage head, a motor positioned within the body and configured to drive movement of the massage head relative to the body, and a platform configured to be placed against the patient during a massage treatment procedure. The platform defines an opening. The platform is positioned so that the massage head extends at least partially through the opening during movement of the massage head relative to the body, and the platform surrounds the massage head in at least one dimension during movement of the massage head relative to the body.

20 Claims, 38 Drawing Sheets

Related U.S. Application Data continuation-in-part of application No. 16/192,703, filed on Nov. 15, 2018, now Pat. No. 10,682,281.

(58) Field of Classification Search
CPC ............ A61H 1/008; A61H 2201/1669; A61H 23/006; A61H 2201/1645; A61H 1/00; A61H 2023/002
See application file for complete search history.

(56) References Cited

U.S. PATENT DOCUMENTS

| | | | | | |
|---|---|---|---|---|---|
| 4,069,816 | A | | 1/1978 | Yamamura | |
| 4,079,733 | A | * | 3/1978 | Denton | A61H 23/0254 601/108 |
| 4,088,128 | A | * | 5/1978 | Mabuchi | A61H 23/0254 601/108 |
| 4,098,266 | A | | 7/1978 | Muchisky | |
| 4,512,339 | A | | 4/1985 | McShirley | |
| 4,549,535 | A | | 10/1985 | Wing | |
| 4,566,442 | A | | 1/1986 | Mabuchi | |
| 5,088,474 | A | * | 2/1992 | Mabuchi | A61H 7/001 601/110 |
| 5,716,332 | A | | 2/1998 | Noble | |
| 5,893,836 | A | * | 4/1999 | Raines | A61H 9/0021 601/75 |
| 5,935,089 | A | | 8/1999 | Shimizu | |
| 6,352,518 | B1 | | 3/2002 | Ruf nee Wolf | |
| 6,432,072 | B1 | | 8/2002 | Harris | |
| 6,500,135 | B2 | | 12/2002 | Huang | |
| 6,599,260 | B2 | | 7/2003 | Tucek | |
| 6,805,679 | B2 | | 10/2004 | Winkley | |
| 6,981,954 | B2 | | 1/2006 | Huang | |
| 7,025,736 | B1 | | 4/2006 | Lawrence | |
| 7,491,184 | B2 | | 2/2009 | Huang | |
| 7,996,996 | B2 | | 8/2011 | Hirabayashi | |
| 8,734,368 | B2 | | 5/2014 | Hoffmann | |
| 8,951,216 | B2 | | 2/2015 | Yoo | |
| 9,889,066 | B2 | | 2/2018 | Danby | |
| 10,806,660 | B1 | * | 10/2020 | Smith, Jr. | A61H 1/00 |
| 2002/0161315 | A1 | | 10/2002 | Harris | |
| 2008/0216280 | A1 | * | 9/2008 | Marshall | A47L 7/0042 15/323 |
| 2009/0306561 | A1 | * | 12/2009 | Naganuma | A61H 7/004 601/137 |
| 2010/0274162 | A1 | | 10/2010 | Evans | |
| 2012/0209157 | A1 | * | 8/2012 | Racine | A61H 1/008 601/99 |
| 2013/0158602 | A1 | * | 6/2013 | Harada | A61B 17/54 606/239 |
| 2013/0261516 | A1 | * | 10/2013 | Cilea | A61H 23/006 601/108 |
| 2014/0336548 | A1 | | 11/2014 | Lee | |
| 2015/0119771 | A1 | | 4/2015 | Roberts | |
| 2016/0271009 | A1 | * | 9/2016 | Giraud | A61H 23/006 |
| 2016/0324717 | A1 | | 11/2016 | Burton | |
| 2017/0020778 | A1 | * | 1/2017 | Bohlinä | A61H 1/008 |
| 2017/0027798 | A1 | | 2/2017 | Wersland | |
| 2017/0281450 | A1 | | 10/2017 | Fuhr | |
| 2017/0304144 | A1 | | 10/2017 | Tucker | |
| 2017/0304145 | A1 | | 10/2017 | Pepe | |
| 2018/0263845 | A1 | | 9/2018 | Wersland | |
| 2018/0296433 | A1 | * | 10/2018 | Danby | A61H 23/0254 |
| 2019/0015294 | A1 | | 1/2019 | Nazarian | |

* cited by examiner

MASSAGE APPARATUS, SYSTEMS AND METHODS

CROSS-REFERENCE TO RELATED APPLICATIONS

Any and all applications for which a foreign or domestic priority claim is identified in the Application Data Sheet as filed with the present application, are hereby incorporated by reference under 37 CFR 1.57. This application is a continuation of U.S. patent application Ser. No. 16/731,687, filed Dec. 31, 2019, which is a continuation-in-part of U.S. patent application Ser. No. 16/192,703, filed Nov. 15, 2018. Each of the aforementioned applications is incorporated by reference herein in its entirety, and each is hereby expressly made a part of this specification.

BACKGROUND

Field

The present disclosure relates to massage therapy, and more particularly, relates to systems, methods, and apparatuses for motor-powered massage therapy.

Description of the Related Art

Percussive massage techniques provide concentrated, rapid, short-duration pulses deep into the tissue of the body. In some instances, percussive massage can be performed manually by a massage therapist striking a patient with soft blows using rapid movements from the wrists. Alternatively, mechanical electrical devices may be used to provide concentrated, rapid, short-duration pulses to the patient.

SUMMARY

Described herein are some embodiments of a massage system. Methods for performing massage therapy are also included. These massage systems and related methods are described in greater detail below.

One aspect of the present application is the recognition that traditional massage systems and devices do not sufficiently facilitate movement of a percussive massage tool over a treatment area of a patient while providing specialized treatment. Certain embodiments described herein can include a massage tool having a platform. The platform can include a surface positioned to contact a treatment area during a massage treatment procedure. The platform can provide stability and repeatability during a treatment procedure while the massage tool is moved about the treatment region.

The platform can also define an opening through which a massage head can extend and retract to contact a treatment region of a patient during a treatment procedure. The opening can be positioned laterally within an interior section of the platform such that the platform can laterally extend around the opening on all sides. By surrounding the opening through which the massage head extends, the platform can at least partially control the interaction of the massage head with a treatment region of the patient. A height of the platform can at least partially define a depth of tissue penetration of the massage head at a treatment region of a patient. A width of the platform can affect positioning of the tool within certain body areas. A length of the platform can affect the maneuverability and stability of the massage tool over the treatment region of a patient. In certain embodiments, the platform can have heights, widths, and lengths that vary at different portions of the platform. In certain embodiments, the platform can have a profile shaped to fit a particular shape or use. A length of the platform in front of the opening in the platform can add stability and at least partially control an angle of treatment by the massage tool by preventing or restricting forward tipping or rotation of the massage tool. A length of the platform behind the opening in the platform can add stability and at least partially control an angle of treatment by the massage tool by preventing or restricting backward tipping or rotation of the massage tool. The platform can include a surface positioned to contact a treatment area during a massage treatment procedure wherein the area of the platform surface positioned to contact a treatment area is greater than a cross-sectional area of the opening defined in the platform that extends in the same plane defined by the platform surface area. The foregoing features of the massage tool can provide for repeatability and consistency of a massage treatment over a treatment area. By controlling features such as depth of penetration, angle of treatment, and stability, the platform can also provide for a safer massage treatment. By surrounding the massage head, the platform can also protect the massage head and/or a connector between the massage head and a body of the massage tool from deflection or limit exposure to forces that can cause deflection from contacting the massage head and/or connector.

In addition to the advantages described above, certain embodiments described herein can include a cover that can at least partially surround the connector and/or massage head. In combination with the platform and platform opening, the cover can at least partially control and enclose an actuation channel in which reciprocal motion of the connector and massage head occurs. The channel can be generally enclosed and can be surrounded by portions of the massage tool, such as the cover, the platform, the body, or any other portion. The massage head and connector can freely reciprocate in the actuation channel. By enclosing the actuation channel, the massage tool can prevent potential damage to enclosed portions of the massage head and connector. Enclosing the actuation channel can also prevent injury caused by contact of the connector with a user or patient.

Another aspect of present application is the recognition that the massage heads of traditional massage treatment devices can be too hard for certain treatments or too hard for patient comfort. A massage head that is formed from a material that is too soft may disconnect from a massage tool and expose a user or patient to portions of a connector that may cause injury. Certain embodiments described herein can include a massage head having an inner molding and an outer molding formed of a material that is softer than the inner molding. The inner molding can be formed around the connector between the massage head and the body of the massage tool. The inner molding can be formed of a material of sufficient hardness to prevent or restrict dislodgement of the inner molding from the connector. The outer molding can be formed of a material of sufficient hardness to prevent or restrict dislodgement of the outer molding from the inner molding. As described above, the outer molding can be softer than the inner molding. The inner molding and outer molding can provide a transition of hardness between the connector and the outer molding, which can allow for a softer patient contact portion of the massage head with less risk of dislodgement of the massage head in comparison to a massage head formed of only a single material. The transition of hardness can also provide for a softer patient contact portion that can undergo repeated use without damage or dislodgement of the massage head in comparison to a massage head formed of only a single material. A softer patient contact portion can enhance patient comfort and prevent injury when the massage head is used on sensitive or delicate treatment regions.

The inner molding can also include one or more surface features that can enhance security of the outer molding to the inner molding. The surface features can include projections, protrusions, slots recesses, bumps, ridges, grooves, irregular shapes, or any other suitable surface features. The surface features can prevent or restrict dislodgement of the outer molding from the inner molding. The surface features can prevent or limit motion or flexing of the outer molding relative to the inner molding.

Certain embodiments can also include methods of treating a patient using a massage tool that provide for improved treatment in comparison to the traditional percussive massage tools. Methods can include positioning the platform of the massage tool over a treatment region of the patient to achieve a treatment that is perpendicular or normal to the treatment region. As described herein, the height, width, and length of the platform, and the positioning of the platform around the opening of the platform can provide for control over tissue depth penetration and the angle of treatment. Methods can also include moving the massage tool over the treatment region of the patient by guiding the platform over the treatment region of the patient while maintaining contact between the platform and the treatment region of the patient. As described herein, the height, width, and length of the platform, and the positioning of the platform around the opening of the platform can provide for repeatability and consistency of the depth of tissue penetration and the angle of treatment as the platform moves across the treatment region while maintaining contact with the treatment region. The length of the connector and the length of the massage head can also be adjusted to work in conjunction with the platform to provide a different, but repeatable and consistent, treatment to the treatment region. That versatility to the breadth of depth and diameter of tissue penetration allows for a customized, repeatable, and consistent treatment to each individual treatment region.

In certain embodiments, a massage system is provided. The massage system includes a massage tool. The massage tool includes a massage head configured to contact a treatment region of a patient during a massage treatment procedure, a body having a handle, and a connector having a first end and a second end, wherein the first end is releasably secured to the body and the second end is coupled to the massage head. The massage tool also includes a motor positioned within the body and configured to drive movement of the massage head relative to the body and a platform configured to be placed against the patient during a massage treatment procedure. The platform defining an opening, wherein the platform is positioned so that the massage head extends at least partially through the opening during movement of the massage head relative to the body. The platform surrounds the massage head in at least one dimension during movement of the massage head relative to the body.

The massage head and platform can be positioned so that the second end of the connector does not extend beyond a bottom surface of the platform during the massage treatment procedure. The massage head can be molded around the second end of the connector. The massage head can include an inner molding molded around the second end of the connector and an outer molding molded around the inner molding. The outer molding can be configured to contact the treatment region of the patient during a massage treatment procedure. The inner molding can have a higher hardness rating than the outer molding. The inner molding and outer molding can be formed of elastomeric materials. The inner molding can include one or more surface features configured to enhance security of the outer molding to the inner molding. The motor can be configured to drive reciprocating motion of the massage head. The connector can be releasably secured to the body of the massage tool via a quick connect coupling. The massage system can include a cover at least partially enclosing the connector. The platform can laterally enclose the massage head and connector at an interface between the platform and the treatment region. An edge of the platform can extend around the massage head and connector to prevent contact between the connector and the treatment region.

In certain embodiments, a method for performing massage therapy is provided. The method includes aligning a massage head of a massage tool with a treatment region of a patient. The massage tool includes the massage head, a body having a handle, a connector including a first end and a second end, wherein the first end is releasable secured to the body and the second end is coupled to the massage head. The massage tool also includes a motor positioned within the body and configured to drive movement of the massage head relative to the body and a platform defining an opening. The platform is positioned so that the massage head extends at least partially through the opening during movement of the massage head relative to the body.

The method can include activating the motor to drive the massage head to reciprocate relative to the body of the massage tool and moving the platform across a surface of the treatment region while the massage head is reciprocating. The method can include adjusting a speed of the motor. The massage head can be a first massage head. The method can include performing a first treatment procedure with the first massage head, replacing the first massage head with a second massage head, and performing a second treatment procedure using the second massage head. The first massage head can have a first hardness and the second massage head can have a second hardness different from the first hardness. The first massage head can have a first size and the second massage head can have a second size different than the first size. The first massage head can have a first shape and the second massage head can have a second shape different than the first shape. The platform can surround the massage head in at least one dimension during movement of the massage head relative to the body. The massage head and platform can be positioned so that the second end of the connector does not extend beyond a bottom surface of the platform during the massage treatment procedure. The massage head can include an inner molding molded around the second end of the connector and an outer molding molded around the inner molding. The outer molding can be configured to contact the treatment region of the patient during a massage treatment procedure. The platform can laterally enclose the massage head and connector at an interface between the platform and the treatment region. The edge of the platform can extend around the massage head and connector to prevent contact between the connector and the treatment region during movement of the platform across the surface of the treatment region.

In certain embodiments, a massage system is provided. The massage system includes a massage tool. The massage tool includes a body having a handle, a single massage head configured to contact a treatment region of a patient during a massage treatment procedure, wherein the single massage head is the only massage head coupled to the body of the massage tool during the massage treatment procedure, wherein the single massage head is coupled to the body of the massage tool at only a single location, a connector having a first end and a second end, wherein the first end is releasably secured to the body and the second end is coupled to the single massage head, wherein the connector is configured to be releasable from the body to facilitate selective removal of the single massage head from the body, a motor positioned within the body and configured to drive movement of the single massage head relative to the body, wherein the motor is configured to drive the connector and the single massage head along an axis of reciprocating movement during the massage treatment procedure; and a platform secured to the body and configured to be placed against the treatment region of the patient during the massage treatment procedure. The platform includes a front end, a back end, wherein a length of the platform extends between the front end and the back end, a first side surface, a second side surface, wherein a width of the platform extends between the first side surface and the second side surface, a top surface; and a bottom surface, wherein a depth of the platform extends between the top surface and the bottom surface, wherein the platform defines an opening in a front portion of the platform near the front end, the opening extending through the platform between the top surface and the bottom surface, wherein an area defined by the bottom surface of the platform is greater than a cross-sectional area of the opening, the cross-sectional area being defined within the opening and extending within the same plane defined by the bottom surface of the platform, wherein a portion of the bottom surface of the platform extending between the opening and the back end of the platform defines an elongate flat surface, wherein a length of the elongate flat surface extends between the opening and the back end of the platform, wherein a width of the elongate flat surface extends between the first side surface and the second side surface, and wherein the length of the elongate flat surface is greater than the width of the elongate flat surface, and wherein the platform is positioned so that the single massage head extends at least partially through the opening during movement of the single massage head relative to the body, wherein the platform surrounds the single massage head in at least one dimension during movement of the single massage head relative to the body, and wherein the elongate flat surface of the platform is configured to be placed against the treatment region of the patient during the massage treatment procedure and moved across the treatment region while maintaining contact with the treatment region during movement of the single massage head relative to the body.

The single massage head and platform can be positioned so that the second end of the connector does not extend beyond the bottom surface of the platform during the massage treatment procedure. The single massage head can be molded around the second end of the connector. The single massage head can include an inner molding molded around the second end of the connector; and an outer molding molded around the inner molding, the outer molding being configured to contact the treatment region of the patient during a massage treatment procedure. The inner molding can have a higher hardness rating than the outer molding. The inner molding and outer molding can be formed of elastomeric materials. The inner molding can include one or more surface features configured to enhance security of the outer molding to the inner molding. The motor can be configured to drive reciprocating motion of the single massage head. The connector can be releasably secured to the body of the massage tool via a quick connect coupling. The massage system can include a removable cover at least partially enclosing the connector. The platform can laterally enclose the single massage head and connector in a space defined within a thickness of the platform and located adjacent to an interface between the platform and the treatment region. An edge of the platform can extend around the single massage head and connector to prevent contact between the connector and the treatment region. A portion of the platform extending between the opening and the front end of the platform can be dimensioned to at least partially control an angle of treatment of the massage tool when the elongate flat surface of the platform is placed against the treatment region of the patient, wherein the portion of the platform extending between the opening and the front end of the platform comprises a length sized to inhibit forward rotation of the massage tool when the elongate flat surface of the platform is placed against the treatment region of the patient. A portion of the platform extending between the opening and the back end of the platform can be dimensioned to at least partially control an angle of treatment of the massage tool when the elongate flat surface of the platform is placed against the treatment region of the patient, wherein the portion of the platform extending between the opening and the back end of the platform comprises a length sized to inhibit a rearward rotation of the massage tool when the elongate flat surface of the platform is placed against the treatment region of the patient. The length of the platform can be sized so that a center of gravity of the massage tool is positioned directly over the platform when the bottom surface of the platform is positioned on a support surface when not in use. The length of the platform can be between 3 inches and 7 inches and a width of the platform is between 0.25 inches and 8 inches.

In certain embodiments, a method for performing massage therapy is provided. The method includes aligning a single massage head of a massage tool with a treatment region of a patient. The massage tool includes a body having a handle, the single massage head, wherein the single massage head is the only massage head coupled to the body of the massage tool during a massage treatment procedure, wherein the single massage head is coupled to the body of the massage tool at only a single location, a connector having a first end and a second end, wherein the first end is releasably secured to the body and the second end is coupled to the single massage head, wherein the connector is configured to be releasable from the body to facilitate selective removal of the single massage head from the body, a motor positioned within the body and configured to drive movement of the single massage head relative to the body, wherein the motor is configured to drive the connector and the single massage head along an axis of reciprocating movement during the massage treatment procedure, and a platform secured to the body. The platform includes a front end, a back end, wherein a length of the platform extends between the front end and the back end, a first side surface, a second side surface, wherein a width of the platform extends between the first side surface and the second side surface, a top surface, and a bottom surface, wherein a depth of the platform extends between the top surface and the bottom surface, wherein the platform defines an opening in a front portion of the platform near the front end, the opening extending through the platform between the top surface and the bottom surface, wherein an area defined by the bottom surface of the platform is greater than a cross-sectional area of the opening, the cross-sectional area being defined within the opening and extending within the same plane defined by the bottom surface of the platform, wherein a portion of the bottom surface of the platform extending between the opening and the back end of the platform defines an elongate flat surface, wherein a length of the elongate flat surface extends between the opening and the back end of the platform, wherein a width of the elongate flat surface extends between the first side surface and the second side surface, and wherein the length of the elongate flat surface is greater than the width of the elongate flat surface, and wherein the platform is positioned so that the single massage head extends at least partially through the opening during movement of the single massage head relative to the body, and wherein the elongate flat surface of the platform is configured to be placed against the treatment region of the patient during the massage treatment procedure and moved across the treatment region while maintaining contact with the treatment region during movement of the single massage head relative to the body. The method further includes activating the motor to drive the single massage head to reciprocate relative to the body of the massage tool and moving the platform across the treatment region while maintaining contact with the treatment region and while the single massage head is reciprocating.

The method can include adjusting a speed of the motor. The single massage head can be a first massage head, and the method can include performing a first treatment procedure with the first massage head, replacing the first massage head with a second massage head, and performing a second treatment procedure using the second massage head. The first massage head can have a first hardness and the second massage head can have a second hardness different from the first hardness. The first massage head can have a first size and the second massage head can have a second size different than the first size. The first massage head can have a first shape and the second massage head can have a second shape different than the first shape. The platform can surround the single massage head in at least one dimension during movement of the single massage head relative to the body. The single massage head and platform can be positioned so that the second end of the connector does not extend beyond the bottom surface of the platform during the massage treatment procedure. The single massage head can include an inner molding molded around the second end of the connector and an outer molding molded around the inner molding, the outer molding being configured to contact the treatment region of the patient during a massage treatment procedure. The platform can laterally enclose the single massage head and connector in a space defined within a thickness of the platform and located adjacent to an interface between the platform and the treatment region. An edge of the platform can extend around the single massage head and connector to prevent contact between the connector and the treatment region during movement of the platform across the surface of the treatment region. The body further can include a guide having a slot configured to receive the first end of the connector, the guide being configured to align the connector so that the single massage head is aligned with the opening. The connector can be releasably secured to the body of the massage tool via a quick connect coupling. The massage tool can further include a removable cover at least partially enclosing the connector. A portion of the platform extending between the opening and the front end of the platform can be dimensioned to at least partially control an angle of treatment of the massage tool when the elongate flat surface of the platform is placed against the treatment region of the patient, wherein the portion of the platform extending between the opening and the front end of the platform has a length sized to inhibit a forward rotation of the massage tool when the elongate flat surface of the platform is placed against the treatment region of the patient, wherein a portion of the platform extending between the opening and the back end of the platform is dimensioned to at least partially control an angle of treatment of the massage tool when the elongate flat surface of the platform is placed against the treatment region of the patient, wherein the portion of the platform extending between the opening and the back end of the platform includes a length sized to inhibit a rearward rotation of the massage tool when the elongate flat surface of the platform is placed against the treatment region of the patient, wherein the length of the platform is sized so that a center of gravity of the massage tool is positioned directly over the platform when the bottom surface of the platform is positioned on a support surface when not in use, and wherein the length of the platform is between 3 inches and 7 inches and a width of the platform is between 0.25 inches and 8 inches.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

Figure 1:
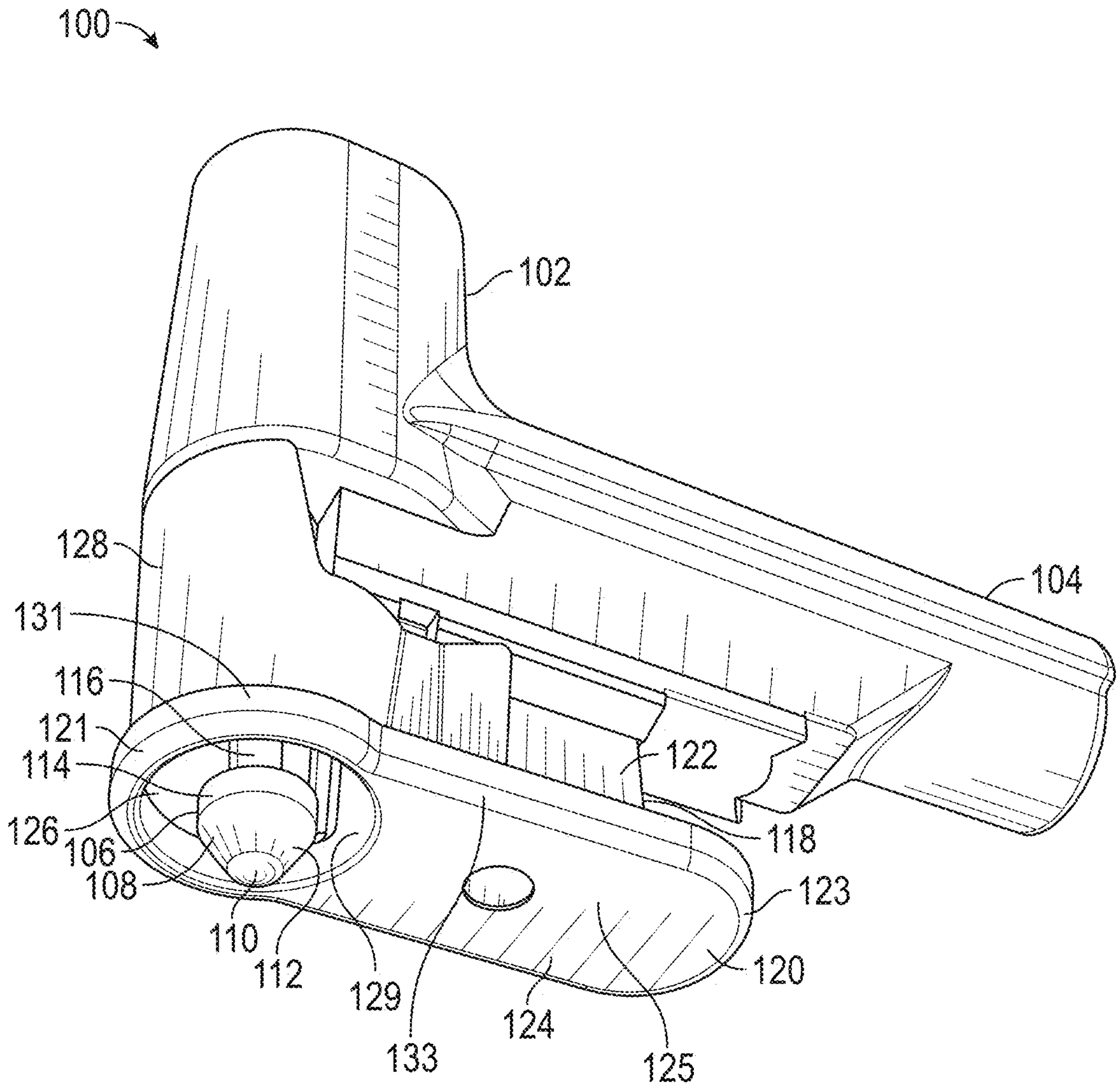
FIG. 1 is a perspective view of one embodiment of a massage tool.

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment's) herein disclosed.

According to some preferred embodiments, the devices, systems, and methods described herein relate to a massage tool. The massage tool can be used to perform percussive massage on a treatment region of a patient.

In certain embodiments, the massage tool can include a body having a handle that can be gripped in use. In certain embodiments, the massage tool can include a massage head that can be applied to the treatment region of the patient to apply a massage force to the treatment region imparted by the massage tool. In certain embodiments, the massage head can be coupled to the body.

In certain embodiments, the massage tool can include a motor. In certain embodiments, the motor can be housed within the body. In certain embodiments, the motor can be coupled to the massage head. In certain embodiments the motor can be activated to cause the massage head to undergo a reciprocating motion.

In certain embodiments, the massage head can include a patient contact portion configured to contact a treatment region of a patient during use of the massage tool, in certain embodiments, the massage head can include a connector configured to couple the patient contact portion to the body of the massage tool. In certain embodiments, the massage head can be removable. In certain embodiments, the massage tool can be configured to couple to a plurality of different massage heads.

In certain embodiments, the patient contact portion can be formed of an elastomeric material. In certain embodiments, the patient contact portion can have a semi-spherical shape.

In certain embodiments, the massage tool can include a platform. The platform can be coupled to or integrally formed with the massage body. In certain embodiments, the platform can include an opening though which the massage head can extend and retract. In certain embodiments, the platform can be placed against the body of the patient adjacent the treatment region while the massage head is applied to the treatment region. In certain embodiments, the platform can be designed to allow for movement of the platform over the body of a patient with minimal friction.

In certain embodiments, the massage tool can include a guard or cover positioned to enclose at least a portion of the connector of the massage head. In certain embodiments, a portion of the platform can be positioned to at least partially enclose the connector.

In certain embodiments, the massage head can be positioned so that, while undergoing reciprocating motion, the patient contact portion is at least partially recessed within the platform of the massage tool in a first position. In certain embodiments, the massage head can be positioned so that, while undergoing reciprocating motion, the patient contact portion extends from the first position at least partially out of the opening of the platform to a second position to contact the patient.

In certain embodiments, the massage head can be positioned so that no exposed portion of the connector extends out of the opening of the platform in the direction of the patient. In certain embodiments, the massage head can be positioned so that no portion of the connector extends out of the opening of the platform in the direction of the patient.

In certain embodiments, in use, the massage tool can be positioned so that the platform contacts a patient near or at a treatment region of the patient. In certain embodiments, the massage tool can be activated so that the massage head undergoes reciprocating motion to repeatedly extend at least partially out of the opening of the platform to contact the treatment region of a patient and retract at least partially back through the opening. In certain embodiments, the massage tool can be activated so that the massage head undergoes reciprocating motion to repeatedly extend at least partially out of the opening of the platform to contact the treatment region of a patient and retract at least partially back through the opening to provide a percussive massage to the treatment region of the patient. In certain embodiments, the massage tool can be manipulated so that the platform moves along the body of the patient while the massage head undergoes reciprocating motion. The platform can include a surface positioned to contact a treatment area during a massage treatment procedure wherein the area of the platform surface positioned to contact a treatment area is greater than a cross-sectional area of the opening defined in the platform that extends in the same plane defined by the platform surface area.

In certain embodiments, a massage system is provided. The massage system includes a massage tool. The massage tool includes a massage head configured to contact a treatment region of a patient during a massage treatment procedure, a body having a handle, and a connector having a first end and a second end, wherein the first end is releasably secured to the body and the second end is coupled to the massage head. The massage tool also includes a motor positioned within the body and configured to drive movement of the massage head relative to the body and a platform configured to be placed against the patient during a massage treatment procedure. The platform defining an opening, wherein the platform is positioned so that the massage head extends at least partially through the opening during movement of the massage head relative to the body. The platform surrounds the massage head in at least one dimension during movement of the massage head relative to the body.

The massage head and platform can be positioned so that the second end of the connector does not extend beyond a bottom surface of the platform during the massage treatment procedure. The massage head can be molded around the second end of the connector. The massage head can include an inner molding molded around the second end of the connector and an outer molding molded around the inner molding. The outer molding can be configured to contact the treatment region of the patient during a massage treatment procedure. The inner molding can have a higher hardness rating than the outer molding. The inner molding and outer molding can be formed of elastomeric materials. The inner molding can include one or more surface features configured to enhance security of the outer molding to the inner molding. The motor can be configured to drive a reciprocating motion of the massage head. The connector can be releasably secured to the body of the massage tool via a quick connect coupling. The massage system can include a cover at least partially enclosing the connector. The platform can laterally enclose the massage head and connector at an interface between the platform and the treatment region. An edge of the platform can extend around the massage head and connector to prevent contact between the connector and the treatment region.

In certain embodiments, a method for performing massage therapy is provided. The method includes aligning a massage head of a massage tool with a treatment region of a patient. The massage tool includes the massage head, a body having a handle, a connector including a first end and a second end, wherein the first end is releasably secured to the body and the second end is coupled to the massage head. The massage tool also includes a motor positioned within the body and configured to drive movement of the massage head relative to the body and a platform defining an opening. The platform is positioned so that the massage head extends at least partially through the opening during movement of the massage head relative to the body.

The method can include activating the motor to drive the massage head to reciprocate relative to the body of the massage tool and moving the platform across a surface of the treatment region while the massage head is reciprocating. The method can include adjusting a speed of the motor. The massage head can be a first massage head. The method can include performing a first treatment procedure with the first massage head, replacing the first massage head with a second massage head, and performing a second treatment procedure using the second massage head. The first massage head can have a first hardness and the second massage head can have a second hardness different from the first hardness. The first massage head can have a first size and the second massage head can have a second size different than the first size. The first massage head can have a first shape and the second massage head can have a second shape different than the first shape. The platform can surround the massage head in at least one dimension during movement of the massage head relative to the body. The massage head and platform can be positioned so that the second end of the connector does not extend beyond a bottom surface of the platform during the massage treatment procedure. The massage head can include an inner molding molded around the second end of the connector and an outer molding molded around the inner molding. The outer molding can be configured to contact the treatment region of the patient during a massage treatment procedure. The platform can laterally enclose the massage head and connector at an interface between the platform and the treatment region. The edge of the platform can extend around the massage head and connector to prevent contact between the connector and the treatment region during movement of the platform across the surface of the treatment region.

Figure 2:
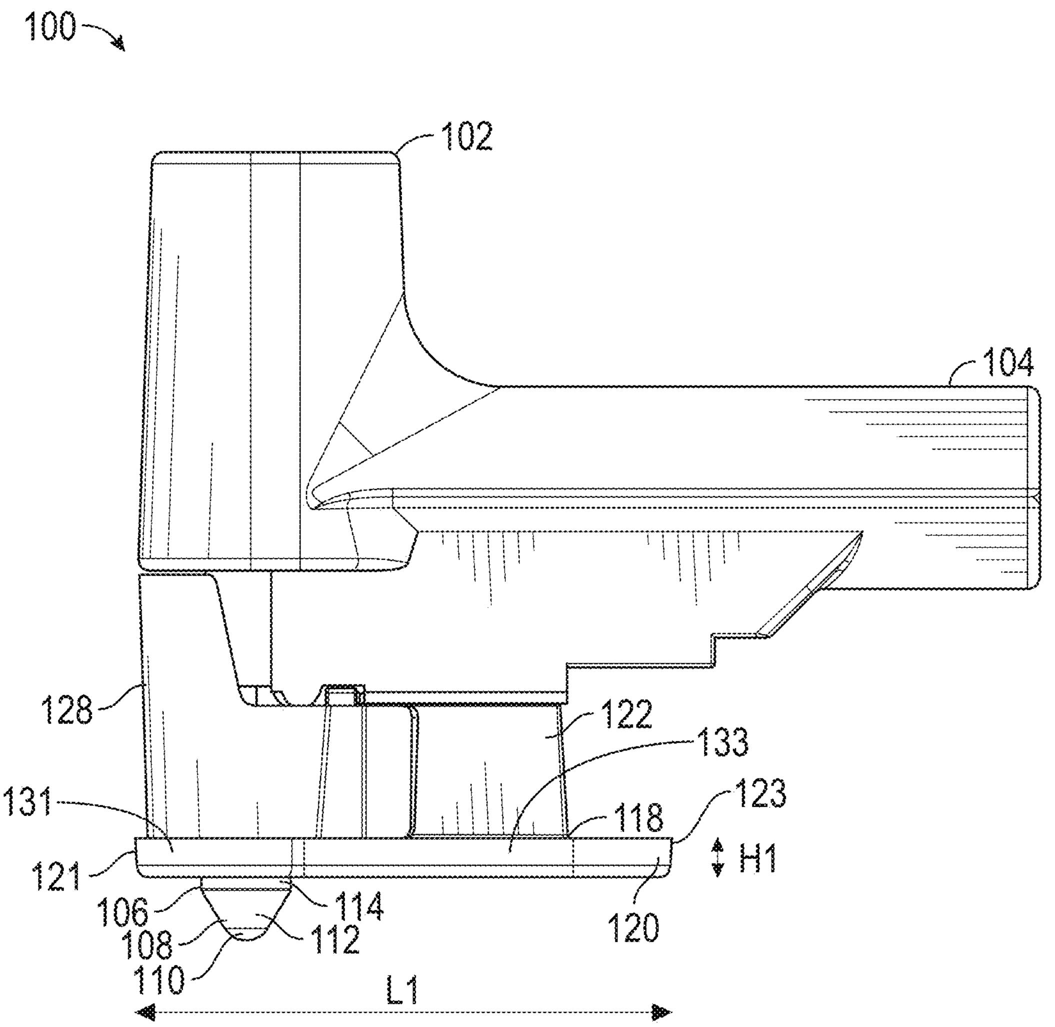
FIG. 2 is a side view of a massage tool as shown in FIG. 1.
Figure 3:
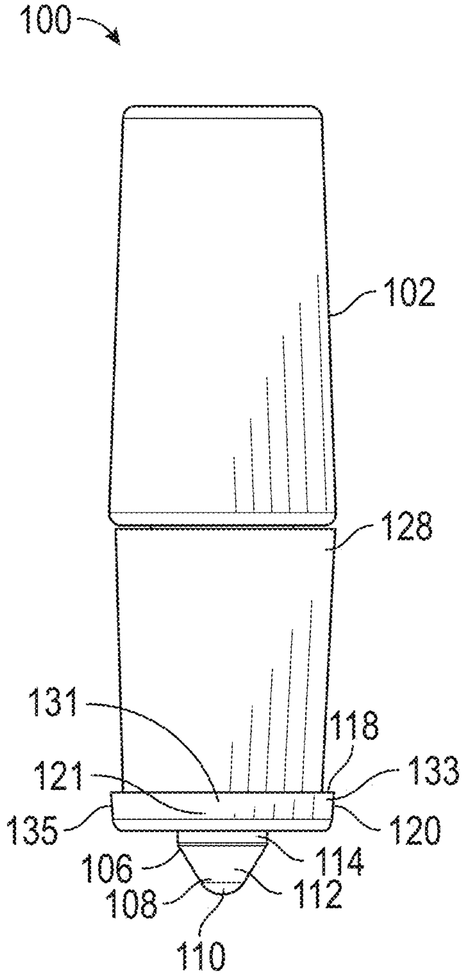
FIG. 3 is a front view of a massage tool as shown in FIG. 1.
Figure 4:
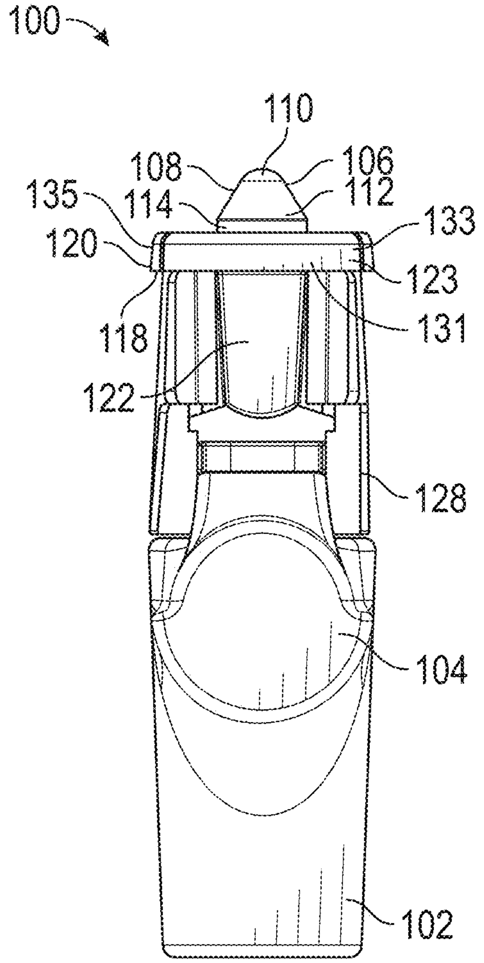
FIG. 4 is a rear view of a massage tool as shown in FIG. 1.
Figure 5:
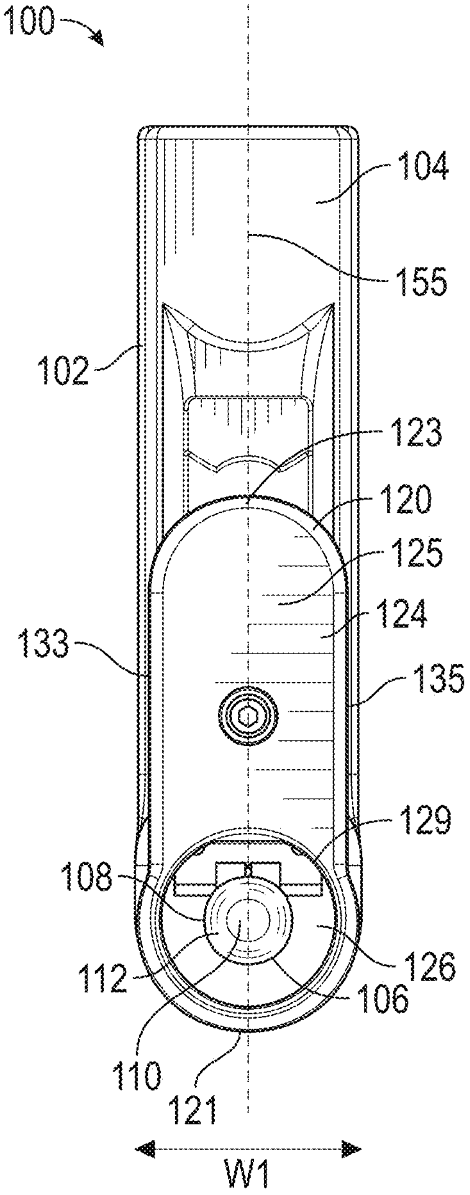
FIG. 5 is a bottom view of a massage tool as shown in FIG. 1.
Figure 6:
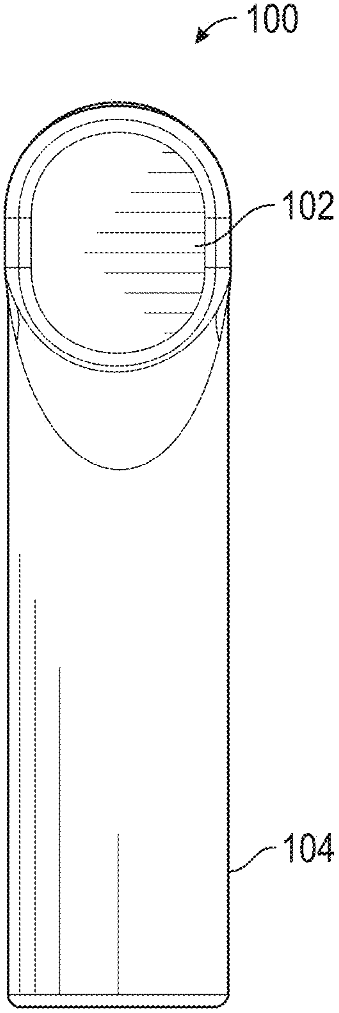
FIG. 6 is a top view of a massage tool as shown in FIG. 1.

FIG. 1 illustrates a perspective view of an embodiment of a massage tool 100. FIG. 2 illustrates a side view of the massage tool 100. FIG. 3 illustrates a front view of the massage tool 100. FIG. 4 illustrates a rear view of the massage tool 100. FIG. 5 illustrates a bottom view of the massage tool 100. FIG. 6 illustrates a top view of the massage tool 100.

The massage tool 100 includes a body 102. In certain embodiments, the body 102 can form a housing for one or more components of the massage tool 100. In certain embodiments, the body 102 can include a handle 104. In certain embodiments, the handle 104 can be gripped in use. In certain embodiments, the handle 104 can be manipulated to position the massage tool 100 during a treatment procedure using the massage tool 100.

In certain embodiments, the massage tool 100 includes a massage head 106. In certain embodiments, the massage head 106 includes a contact portion 108 configured to contact a treatment region of the patient during use of the massage tool 100. As shown in FIG. 1, the patient contact portion 108 can have a rounded tip 110 at a distal end of the contact portion 108. In certain embodiments, the contact portion 108 can include a tapered section 112. In certain embodiments, the tip 110 can extend inferiorly from the tapered section 112. In certain embodiments, the tapered section 112 can extend between a proximal end of the contact portion 108 and the rounded tip 110, In certain embodiments, the contact portion 108 can include a cylindrical section 114. In certain embodiments, the tapered section 112 can extend inferiorly from the cylindrical section 114.

In certain embodiments, the contact portion 108 can be shaped, sized, or otherwise configured to emulate a body part of a massage therapist, such as, for example, a fingertip, a knuckle, a thumb, a base of the palm, an elbow or a forearm. In certain embodiments, a contact portion 108 can be selected for a particular massage therapy to emulate the body part that a massage therapist would use in the particular massage therapy.

In certain embodiments, the massage head 106 can be coupled to a connector 116. In certain embodiments, the massage head 106 can be secured to the connected 116. In certain embodiments, the massage head 106 can be molded around a portion of the connector 116.

In certain embodiments, a first end of the connected 110 can be coupled to the body 102 of the massage tool 100. In certain embodiments, a second end of the connector 116 can be secured to the massage head 106. In certain embodiments, the second end of the connected 116 can be secured to the body 102 of the massage tool 100. In certain embodiments, the first end of the massage tool 100 can be releasably secured to the body 102 of the massage tool 100. In certain embodiments, the connector 116 can be coupled to the body 102 by a quick connect coupling. In certain embodiments, a quick connect coupling can facilitate engagement and disengagement of the massage head 106 from the body 102.

In certain embodiments, the massage head 106 can be the only massage head coupled to the body 102 of the massage tool 100 during a massage treatment procedure. In certain embodiments, the massage head 106 can be coupled to the body 102 of the massage tool 100 at only a single location.

In certain embodiments, the massage tool 100 includes a platform assembly 118. In certain embodiments, the platform assembly 118 can be coupled to the body 102. In certain embodiments, the platform assembly 118 can be integrally formed with the body 102. In certain embodiments, the platform assembly 118 can be releasably coupled to the body 102.

In certain embodiments, the platform assembly 118 can include a platform 120 and a base 122. In certain embodiments, the platform 120 can be coupled to the base 122. In certain embodiments, the platform 120 can be integrally formed with the base 122. In certain embodiments, the base 122 can be coupled to the body 102. In certain embodiments, the base 122 can be integrally formed with the body 102. In certain embodiments, the base 122 can be releasably coupled to the body 102. In certain embodiments, the base 122 can extend between the body 102 and the platform 120.

In certain embodiments, the platform 120 can include a bottom surface 124, In certain embodiments, the bottom surface 124 can be flat or generally flat. In certain embodiments, the platform 120 can include an opening 126. The opening 126 can be defined by an interior surface 129 of the platform 120. In certain embodiments, the opening can be round, ellipsoid, triangular, square, rectangular, polygonal, or any other suitable shape. In certain embodiments, when the massage head 106 is coupled to the body 102, the massage head 106 can align with the opening 126. In certain embodiments, the platform can include a bottom surface 124 positioned to contact a treatment area during a massage treatment procedure wherein the area of the bottom surface 124 positioned to contact a treatment area is greater than a cross-sectional area of the opening 126 defined in the platform that extends in the same plane as the area defined by the bottom surface 124.

In certain embodiments, the massage tool 100 can include a cover 128. In certain embodiments, the cover 128 can enclose at least a portion of the connector 116. In certain embodiments, the cover 128 can be positioned between the body 102 and the platform 120. In certain embodiments, the cover 128 can be positioned, sized, shaped, or otherwise configured to prevent user contact with the connector 116 during use of the massage tool 100. In certain embodiments, the massage tool does not include a cover 128. In certain embodiments, the cover 128 can prevent outside interference with the connector 116 and/or massage head 106. In certain embodiments, the cover 128 can prevent outside interference with the coupling of the connector 116 and the body 102.

In certain embodiments, the cover 128 can be removable to allow access to the connector 116 and/or massage head 106. In certain embodiments, the cover 128 can couple to the body 102 via a snap fit. In certain embodiments, the cover 128 can couple to the platform assembly 118 via a snap fit.

Figure 7:
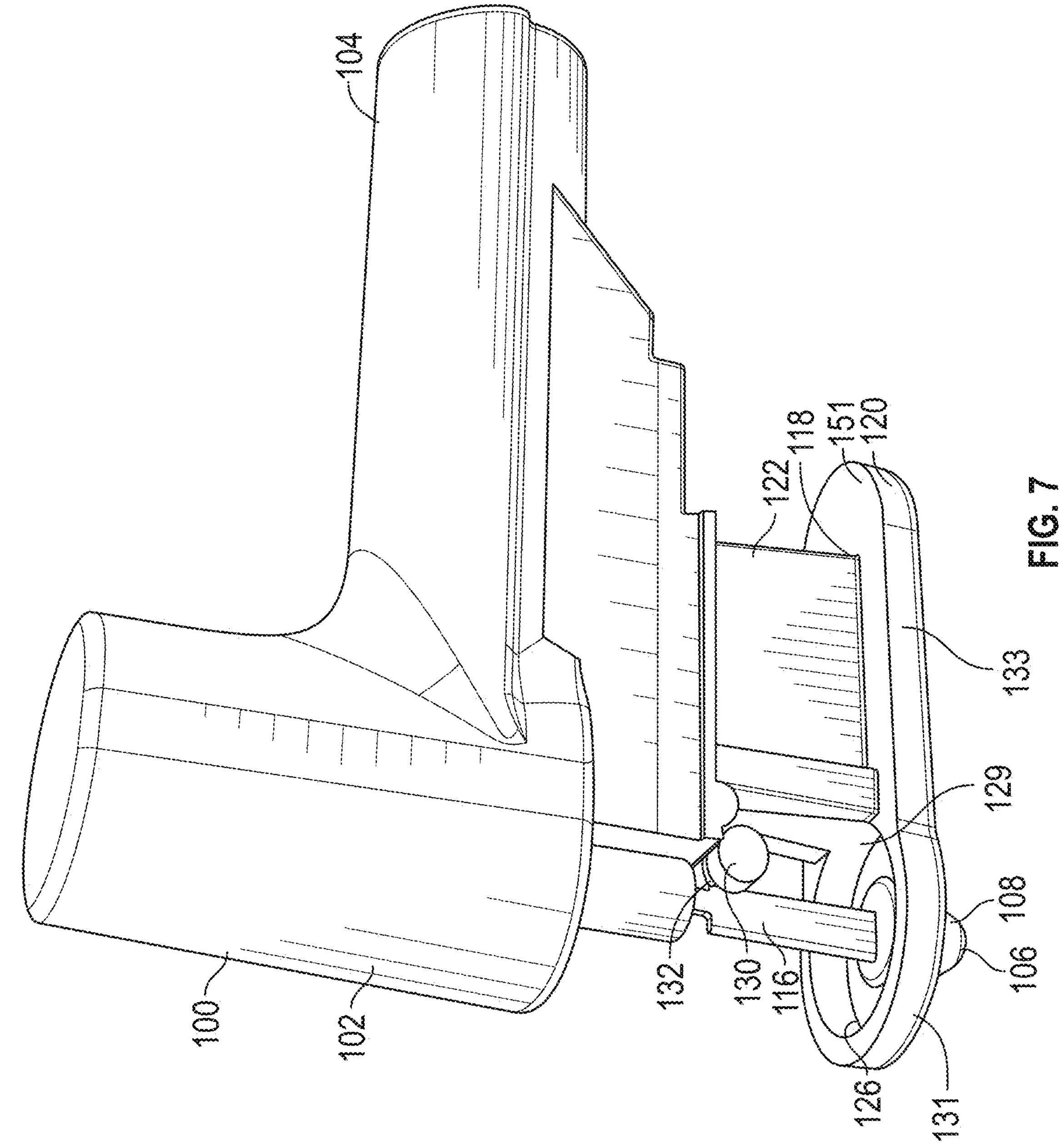
FIG. 7 is a perspective view of a massage tool as shown in FIG. 1 showing a cover removed.

FIG. 7 illustrates a perspective view of the massage tool 100 with the cover 128 removed. As shown in FIG. 7, in certain embodiments, the massage tool 100 can include a guide 130. In certain embodiments, the guide 130 can be configured to receive a portion of the connector 116. In certain embodiments, the guide 130 can be configured to align the connector 116 so that the massage head 106 is aligned with the opening 126. In certain embodiments, the guide 130 can be a slot 132 configured to receive a portion of the connector 116. In certain embodiments, the guide 130 can be coupled to the body 102. In certain embodiments, the guide 130 can be integrally formed with the body 102. In certain embodiments, the position of the guide 130 can be adjustable relative to the body 102.

Figure 8:
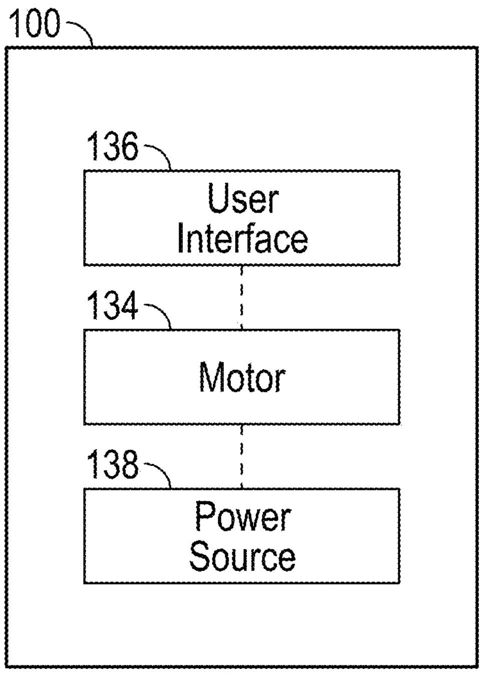
FIG. 8 is a block diagram of electrical components of a massage tool as shown in FIG. 1.

FIG. 8 illustrates a block diagram of electrical components of the massage tool 100. As shown in FIG. 8, in certain embodiments, the massage tool 100 can include a motor 134. In certain embodiments, the motor 134 can be coupled to the massage head 106. In certain embodiments, the motor 134 can be activated to cause the massage head 106 to undergo a reciprocating motion. In certain embodiments, the motor 134 can be coupled to the connector 116. In certain embodiments, the motor 134 can be activated to cause the connector 116 to undergo a reciprocating motion. In certain embodiments, the motor 134 can cause the massage head 106 to undergo a reciprocating motion at a frequency between 5 cycles per second to 60 cycles per second, 10 cycles per second to 50 cycles per second, 20 cycles per second to 40 cycles per second, 5 cycles per second to 15 cycles per second, 10 cycles per second to 15 cycles per second, 15 cycles per second to 20 cycles per second, 30 cycles per second to 60 cycles per second, 40 cycles per second to 50 cycles per second, or any other suitable range.

In certain embodiments, the motor 134 can cause the massage head 106 to undergo a reciprocating motion at a frequency of 5 cycles per second, 8 cycles per second, 10 cycles per second, 11 cycles per second, 12 cycles per second, 15 cycles per second, 20 cycles per second, 25 cycles per second, 30 cycles per second 35 cycles per second, 40 cycles per second, 45 cycles per second, 50 cycles per second, 55 cycles per second, 60 cycles per second, or any other suitable frequency.

In certain embodiments, the massage tool 100 can include a user interface 136. In certain embodiments, the user interface 136 can be configured to activate or deactivate the motor 134. In certain embodiments, the user interface 136 can include one or more buttons, switches, levers, toggles, triggers, or any other suitable user interface. In certain embodiments, a switch can be used to activate the motor 134. In certain embodiments, the motor 134 may remain active until the interface 136 is manipulated a second time.

In certain embodiments, the user interface 136 can be manipulated to alter a speed of the reciprocating motion of the massage head 106 and/or connector 116. In certain embodiments, the user interface 136 can be manipulated to alter a number of strikes per second of the massage head 106 on a treatment region. In certain embodiments, a user interface 136 can be used to set a number of strikes per second at 2 strikes per second, 3 strikes per second, 4 strikes per second, 5 strikes per second, 6 strikes per second, 7 strikes per second, 8 strikes per second, 9 strikes per second, 10 strikes per second, 11 strikes per second, 12 strikes per second, and/or any other suitable number. In certain embodiments, control of the speed of the motor 134 can be independent from activation of the motor 134.

In certain embodiments, the massage tool 100 can include a power source 138. In certain embodiments, the power source 138 can be a battery. In certain embodiments, the motor 134 can receive power from the power source 138. In certain embodiments, the power source 138 can be removable. In certain embodiments, the power source 138 can be rechargeable. In certain embodiments, the massage tool 100 can include a power cord or port configured to receive power from an external source.

With reference to FIGS. 1-7, in certain embodiments, the massage tool 100 can be configured to cause the massage head 106 to extend and retract through the opening 126. In certain embodiments, the massage tool 100 can be configured to cause the massage head to undergo reciprocation motion through the opening 126.

In certain embodiments, the massage head 106 can be positioned so that, while undergoing reciprocating motion, the massage head 106 can be at least partially recessed within the platform 120 of the massage tool 100 in a first position. In certain embodiments, the massage head 106 can be positioned so that, while undergoing reciprocating motion, the massage head 106 can extend from the first position at least partially out of the opening 126 of the platform 120 to a second position to contact a treatment region of the patient. In certain embodiments, the massage head 106 can be positioned so that, while undergoing reciprocating motion, the contact portion 108 can be at least partially recessed within the platform 120 of the massage tool 100 in a first position. In certain embodiments, contact portion 108 can be positioned so that, while undergoing reciprocating motion, the massage head 106 can extend from the first position at least partially out of the opening 126 of the platform 120 to a second position to contact a treatment region of the patient. In certain embodiments, the massage head 106 can undergo reciprocating motion along an axis that perpendicularly intersects a longitudinal midline 155 of the platform 120. In certain embodiments, the longitudinal midline 155 of the platform 120 is also a longitudinal midline of the massage tool 100, as shown in FIG. 5.

In certain embodiments, the massage head 106 can be positioned so that no exposed portion of the connector 116 extends out of the opening 126 of the platform 120 in the direction of the treatment region of the patient. In certain embodiments, the massage head 106 can be positioned so that no portion of the connector 116 extends out of the opening 126 of the platform 120 in the direction of the treatment region of the patient.

In certain embodiments, in use, the massage tool 100 can be positioned so that the platform 120 contacts a patient near or at a treatment region of the patient. In certain embodiments, the massage tool 100 can be activated so that the massage head 106 undergoes reciprocating motion to repeatedly extend at least partially out of the opening 126 of the platform 120 to contact the treatment region of a patient and retract at least partially back through the opening 126. In certain embodiments, the massage tool 100 can be activated so that the massage head 106 undergoes reciprocating motion to repeatedly extend at least partially out of the opening 126 of the platform 120 to contact the treatment region of a patient and retract at least partially back through the opening 126 to provide a percussive massage to the treatment region of the patient.

As shown in FIGS. 2 and 5, in certain embodiments, the platform 120 can have a depth or height H1, a width W1, and a length L1. In certain embodiments, heights H1, width W1, and/or length L1 can vary at different portions of the platform 120. In certain embodiments, the platform 120 can have a profile shaped to fit a particular shape or use. In certain embodiments, the platform 120 can be contoured or can include a shaped profile for use in treatment procedures for specific body areas.

In certain embodiments, the height H1 can extend between a top surface 151 of the platform and the bottom surface of the platform 124. In certain embodiments, the length of the platform can extend between an end 121 to an end 123. In certain embodiments, the width of the platform W1 can extend between a first side surface 133 and a second side surface 135.

In certain embodiments, the platform 120 can be shaped, sized, or otherwise configured to prevent the massage tool from tipping or rotating in forward and/or rearward directions. In certain embodiments, the platform 120 can be shaped, sized or otherwise configured such that a center of gravity of the massage tool 100 is positioned over the platform 120. In certain embodiments, the platform 120 can have an elongated shape to prevent rotating or tipping of the massage tool 100 in the forward and/or rearward directions.

In certain embodiments, the platform 120 can be rectangular or generally rectangular. In certain embodiments, the platform 120 can include rounded edges. In certain embodiments, the platform 120 can be oval or generally oval. In certain embodiments, the platform 120 can be circular or generally circular. In some embodiments, a circular platform 120 may be used to treat an acute condition that requires precise and delicate treatment. In certain embodiments, the body 102 can be circular or generally circular. In certain embodiments, a circular platform 120 and circular body 102 can provide ergonomic advantages to a user.

In certain embodiments, the platform 120 can be removable and replaceable with a second platform 120 having a different shape or size. In certain embodiments, a plurality of interchangeable platforms 120, having different shapes and/or sizes, can be used with the massage tool 100 to treat different treatment areas or to perform different treatment procedures at a treatment area.

In certain embodiments, a length L1 of the platform 120 can be between 3 inches to 7 inches, between 3.5 inches to 6.5 inches, between 4 inches to 6 inches, between 4.5 inches to 5.5 inches, between 7 inches to 10 inches, or any other suitable range. In certain embodiments, the length L1 of the platform 120 can be 3.0 inches, about 3.0 inches, 3.5 inches, about 3.5 inches, 4.0 inches, about 4.0 inches, 4.5 inches, about 4.5 inches, 5.0 inches, about 5.0 inches, 5.2 inches, about 5.2 inches, 5.4 inches, about 5.4 inches, 5.5 inches, about 5.5 inches, 5.6 inches, about 5.6 inches, 5.8 inches, about 5.8 inches, 6.0 inches, about 6.0 inches, 6.5 inches, about 6.5 inches, 7.0 inches, about 7.0 inches, 8.0 inches, about 8.0 inches, 9.0 inches, about 9.0 inches, 10.0 inches, about 10.0 inches, 11.0 inches, about 11.0 inches, 12.0 inches, about 12.0 inches, or any other suitable length L1. In certain embodiments, a length L1 of the platform is sized to prevent the massage tool from tipping or rotating in forward and/or rearward directions. In certain embodiments, the length L1 of the platform can be sized so that the center of gravity of the massage tool 100 is positioned over the platform 120. In certain embodiments, a platform 120 that prevents tipping or rotation can facilitate smoother movement across the treatment area.

In certain embodiments, a thickness of the platform 120 adjacent the opening 126 can be between 0.125 inches to 1.75 inches, between 0.25 inches to 1.5 inches, between 0.25 inches to 1.0 inch, between 0.25 inches to 0.75 inches, between 0.25 inches to 0.5 inches, between 0.5 inches to 1.5 inches, between 0.5 inches to 1.0 inch, between 0.5 inches to 0.75 inches, or any other suitable thickness. In certain embodiments, a thickness of the platform can be 0.125 inches, about 0.125 inches, 0.25 inches, about 0.25 inches, 0.375 inches, about 0.375 inches, 0.5 inches, about 0.5 inches, 0.625 inches, about 0.625 inches, 0.75 inches, about 0.75 inches, 1.0 inch, about 1.0 inch, 1.25 inches, about 1.25 inches, 1.5 inches, about 1.5 inches, or any other suitable thickness.

In certain embodiments the vertical distance between a top surface 151 of the platform 120 and the body 102 above the opening 126 can be between 1.25 inches to 2.25 inches, between 1.5 inches to 2.0 inches, or any other suitable range. In certain embodiments, the vertical distance between the top surface 151 of the platform 120 and the body 102 above the opening 126 can be 1.25 inches, about 1.25 inches, 1.5 inches, about 1.5 inches, 1.75 inches, about 1.75 inches, 2.0 inches, about 2.0 inches, 2.25 inches, about 2.25 inches, or any other suitable size.

In certain embodiments, the width W1 of the platform 120 can be between 0.25 inches to 8.0 inches, between 0.5 inches to 7.0 inches, between 0.75 inches to 6 inches, between 1.0 inch to 5 inches, between 1.5 inches to 4 inches, between 2 inches to 3 inches, or any other suitable range. In some embodiments, the width W1 of the platform 120 can be 0.25 inches, about 0.25 inches, 0.5 inches, about 0.5 inches, 0.75 inches, about 0.75 inches, 1.0 inch, about 1.0 inch, 1.25 inches, about 1.25 inches, 1.5 inches, about 1.5 inches, 1.75 inches, about 1.75 inches, 2.0 inches, about 2.0 inches, 2.25 inches, about 2.25 inches, 2.5 inches, about 2.5 inches, 2.75 inches, about 2.75 inches, 3.0 inches, about 3.0 inches, 3.25 inches, about 3.25 inches, 3.5 inches, about 3.5 inches, 3.75 inches, about 3.75 inches, 4.0 inches, about 4.0 inches, 4.25 inches, about 4.25 inches 4.5 inches, about 4.5 inches, 4.75 inches, about 4.75 inches, 5.0 inches, about 5.0 inches, 5.25 inches, about 5.25 inches, 5.5 inches, about 5.5 inches, 5.75 inches, about 5.75 inches, 6.0 inches, about 6.0 inches, 6.5 inches, about 6.5 inches, 7.0 inches, about 7.0 inches, 8.0 inches, about 8.0 inches, or any other suitable width. In certain embodiments, the width W1 of the platform 120 can be sized to provide for stability of the platform 120 relative to the treatment region. In certain embodiments the width W1 of the platform can be sufficiently narrow to allow for alignment with treatment regions of the patient and/or movement about the contours of the body of the patient. In certain embodiments, the width W1 of the platform 120 is sized to prevent tipping or rotation of the platform 120 in the lateral directions. In certain embodiments, the width W1 of the platform 120 is sized such that the center of gravity of the massage tool 100 is positioned over the platform 120.

In certain embodiments, the platform 120 may be removable and/or replaceable. In certain embodiments, a plurality of platforms 120 can have a plurality of different widths W1. A platform 120 can be selected based on the size of the treatment region, the type of treatment being provided, and the body type of the patient. For example, in certain embodiments, a platform 120 having a relatively narrow width W1 may be used for small treatment regions, highly contoured treatment regions, or less defined body types.

In certain embodiments, an end 121 of the platform can be sized and/or shaped to differ from an end 123 of the platform. The different shape of the end 121 can provide an indication of the location of the massage head 106. In certain embodiments, the end 121 of the platform 120 can be generally circular or semicircular. In certain embodiments, a diameter of a portion of the platform 120 surrounding the opening 126 measured between the side surfaces of the portion of the platform 120 surrounding the opening 126 can be 1.0 inch, about 1.0 inch, 1.2 inches, about 1.2 inches, 1.4 inches, about 1.4 inches, 1.8 inches, about 1.8 inches, 2.0 inches, about 2.0 inches, 2.2 inches, about 2.2 inches, 2.4 inches, about 2.4 inches, 2.6 inches, about 2.6 inches, 2.8 inches, about 2.8 inches, 3.0 inches, about 3.0 inches, 3.2 inches, about 3.2 inches, 3.4 inches, about 3.4 inches, or any other suitable diameter. In certain embodiments, the diameter of the portion of the platform 120 surrounding the opening 126 measured between the side surfaces of the portion of the platform 120 surrounding the opening 126 can be between 1 inch to 3.4 inches, between 1.4 inches to 3.0 inches, between 1.8 inches and 2.6 inches, between 2.0 inches and 2.4 inches, or any other suitable range.

In certain embodiments, the end 121 of the platform 120 can be dimensioned, shaped, positioned, or otherwise configured to prevent contact between the connector 116 and the treatment region while the massage tool 100 is positioned in a stationary position on the treatment region. In certain embodiments, the end 121 of the platform may be dimensioned, shaped, positioned, or otherwise configured to prevent contact between the connector 116 and the treatment region while the massage tool 100 is moved about the treatment region. For example, the end 121 can be dimensioned, shaped, positioned, or otherwise configured to prevent the massage tool from tipping or rotating in a forward direction while the massage tool is moved about the treatment region. In certain embodiments, an edge 131 of the platform 120 can extend around the massage head 106 and connector 116 to prevent contact between the connector 116 and the treatment region during movement of the platform 120 across the surface of the treatment region. In certain embodiments, the edge 131 can define the front end 121 and the rear end 123. In certain embodiments, the edge 131 can define a first side surface 133 and a second side surface 135.

In certain embodiments, the platform 120 can have a different width at a section of the platform 120 surrounding the opening 126. In certain embodiments, the platform 120 can have a larger width surrounding the opening 126 than a width of the platform 120 at a section rearward from the opening 126 between the opening 126 and the end 123. For example, in certain embodiments, a diameter of the portion of the platform defining the opening 126 can be 2.2 inches or about 2.2 inches and a width of the platform 120 at a section rearward from the opening 126 can be 2.0 inches or about 2.0 inches. In certain embodiments, a ratio between the width of the section of the platform 120 rearward from the opening 126 and a maximum diameter of the massage head 106 can be 1:4, 1:3, 1:2, 1:1, 2:1, 3:1, 4:1, 5:1, 6:1 or any other suitable ratio.

In certain embodiments, the platform 120 can surround the massage head 106 in at least one dimension. In certain embodiments, in use, the platform 120 can enclose the massage head 106 and connector 116 at an interface between the platform 120 and the treatment region. In certain embodiments, in use, the platform can include the massage head 106 and connector 116 at an interface between the platform 120 and the treatment region so that a maximum depth that the massage head 106 will extend beyond the bottom surface 124 of the platform 120 is fixed for any application angle to the treatment region. In certain embodiments, if the bottom surface 124 is held parallel to the treatment region, a depth that the massage head will extend beyond into the treatment region is predetermined and repeatable. In certain embodiments, a position of the platform 120 relative to the body 102 and/or the massage head 106 can be adjusted to adjust a depth that the massage head 106 will extend beyond the bottom surface 124.

In certain embodiments, the massage tool 100 can be manipulated so that the platform 120 moves along the body of the patient while the massage head 106 undergoes reciprocating motion. In certain embodiments, the handle 104 of the massage tool 120 can be manipulated so that the platform 120 moves along the body of the patient while the massage head 106 undergoes reciprocating motion.

As described herein, in certain embodiments, the platform 120 can include a surface 124 positioned to contact a treatment area of a patient during a massage treatment procedure. In certain embodiments, the platform 120 can provide stability during a treatment procedure while the massage tool 100 is moved about the treatment region while in contact with the treatment region.

In certain embodiments, a portion of the bottom surface 124 can define an elongate flat surface 125 extending between the opening 126 and the rear end of the platform 123. In certain embodiments, a length of the elongate flat surface 125 extends between the opening 126 and the rear end of the platform 123, and a width of the elongate flat surface extends between the first side surface 133 and the second side surface 135. In certain embodiments, the length of the elongate flat surface 125 can be greater than the width of the elongate flat surface 125. In certain embodiments, the elongate flat surface 125 can provide stability during a treatment procedure while the massage tool 100 is moved about the treatment region while in contact with the treatment region. In certain embodiments, the elongate flat surface 125 can add stability and at least partially control an angle of treatment by the massage tool 100 by preventing or restricting backward tipping or rotation of the massage tool 100.

As described herein, in certain embodiments, the opening 126 can be positioned laterally within an interior section of the platform 120 such that the platform 120 can laterally extend around the opening 126 on all sides. By surrounding the opening 126, the platform 120 can at least partially control the interaction of the massage head 106 with a treatment region of the patient. A height H1 of the platform 120 can at least partially define a depth of tissue penetration of the massage head 106 at a treatment region of a patient. A width W1 of the platform 120 can affect positioning of the massage tool 100 within certain body areas. A length L1 of the platform 120 can affect the maneuverability and stability of the massage tool 100 over the treatment region of a patient. A length of the platform 120 in front of the opening 126 can add stability and at least partially control an angle of treatment by the massage tool 100 by preventing or restricting forward tipping or rotation of the massage tool 100. A length of the platform 120 behind the opening 126 can add stability and at least partially control an angle of treatment by the massage tool 100 by preventing or restricting backward tipping or rotation of the massage tool 100. In certain embodiments, the foregoing features of the massage tool 100 can provide for repeatability and consistency of a massage treatment over a treatment area. By controlling features such as depth of penetration, angle of treatment, and stability, the platform 120 can also provide for a safer massage treatment. By surrounding the massage head 106, the platform 120 can also protect the massage head 106 and/or the connector 116 from deflection or limit exposure to forces that can cause deflection resulting from contacting the massage head 106 and/or the connector 116.

As described herein, in certain embodiments, the cover 128 can at least partially surround the connector 116 and/or the massage head 106. In combination with the platform 120 and the opening 126, the cover 128 can at leak partially control and enclose an actuation channel in which reciprocal motion of the connector 116 and massage head 106 occurs. The actuation channel can be generally enclosed and can be surrounded by portions of the massage tool 100, such as the cover 128, the platform 120, the body 102, and the base 122. The massage head 106 and connector 116 can freely reciprocate in the actuation channel. By enclosing the actuation channel, the massage tool 100 can prevent potential damage to enclosed portions of the massage head 106 and the connector 116. Enclosing the actuation channel can also prevent injury caused by contact of the connector 116 with a user or patient.

In certain embodiments, the handle 104 can extend from a rear portion of the body 102. In certain embodiments, the handle 104 can extend from the body in a direction that is perpendicular or generally perpendicular to an axis along which the massage head undergoes reciprocating motion.

The massage tool 100 can be used in various methods of massage treatment, examples of which are described herein. In certain embodiments, methods for treating a patient using the massage tool 100 can include positioning the platform 120 of the massage tool 100 over a treatment region of the patient to achieve a treatment that is perpendicular or normal to the treatment region. In certain embodiments, the height H1, width W1, and length L1 of the platform, and the positioning of the platform 120 around the opening 126 can provide for control over tissue depth penetration and the angle of treatment.

In certain embodiments, methods for treating a patient using the massage tool 100 can include moving the massage tool 100 over the treatment region of the patient by guiding the platform 120 over the treatment region of the patient while maintaining contact between the platform 120 and the treatment region of the patient. In certain embodiments, the height H1, width W1, and length L1 of the platform 120, and the positioning of the platform. 120 around the opening 126 can provide for repeatability and consistency of the depth of tissue penetration and the angle of treatment as the platform 120 moves across the treatment region while maintaining contact with the treatment region.

Figure 9A:
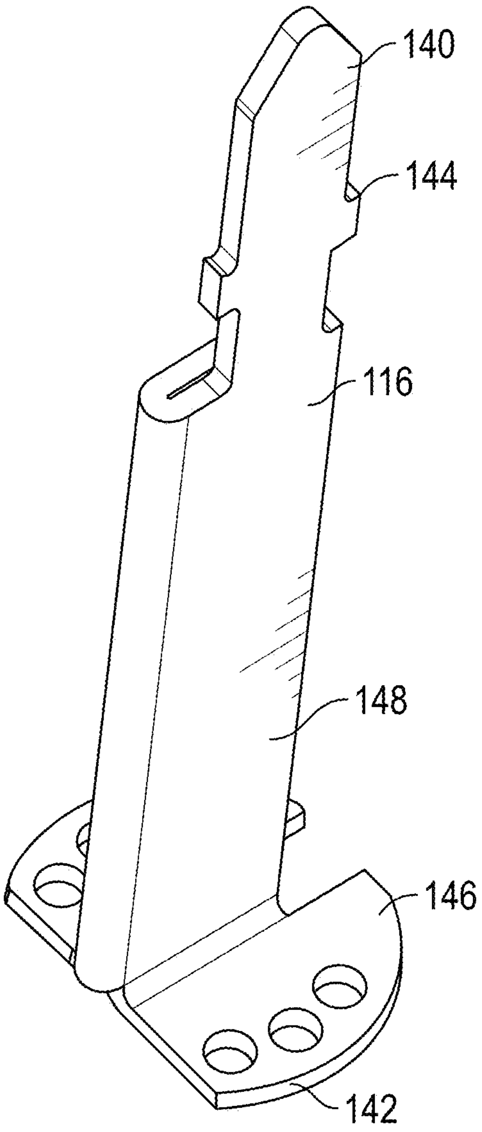
FIG. 9A is a perspective view of a connector of a massage tool as shown in FIG. 1.
Figure 9B:
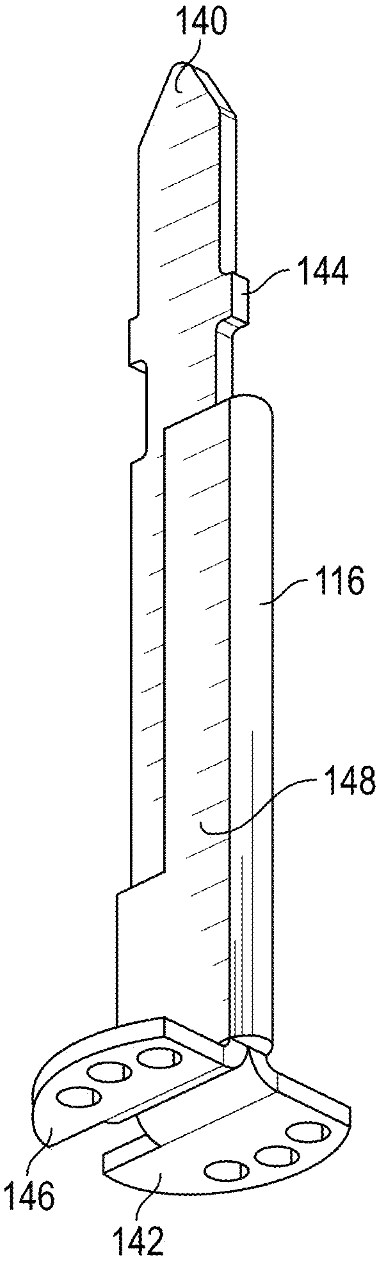
FIG. 9B is a perspective view of a connector of a massage tool as shown in FIG. 1.

FIGS. 9A and 9B illustrate a top perspective view and a bottom perspective view, respectively, of the connector 116. In certain embodiments, a first end 140 of the connector 116 can be sized, shaped, or otherwise configured to couple to the body 102 of the massage tool 100. In certain embodiments, the first end 140 of the connector 116 can be sized, shaped, or otherwise configured to be received in an opening within the body 102 of the massage tool 100. In certain embodiments, the first end 140 of the connector 116 can be sized, shaped, or otherwise configured to be releasably secured within an opening of the body 102 of the massage tool 100. In certain embodiments, the first end 140 of the connector 116 can be sized, shaped, or otherwise configured to be received in a quick connect coupling with the body 102 of the massage tool 100. In certain embodiments, a quick connect coupling can secure the connector 116 within the body 102 upon insertion of the connector 116 into the body 102. In certain embodiments, connector 116 can be released from the quick connect coupling by manipulation of a button, lever, trigger, or the like. In certain embodiments, the connector 116 can include one or more protrusions 144. The protrusions can be received within body 102 of the massage tool 100 to form the quick connect coupling with the massage tool 100.

In certain embodiments, the connector 116 can include a second end 142. In certain embodiments, the second end 142 can be sized, shaped, or otherwise configured to couple to the massage head 106. In certain embodiments, the connector 116 can be sized, shaped, or otherwise configured so that no portion of the connector 116 extends beyond the bottom surface 124 of the platform 120. In certain embodiments, the second end 142 can include a flat or generally flat surface 146. In certain embodiments, the surface 146 can be flat or generally flat to prevent or reduce a risk of injury if the surface 146 contacts a patient or user during use of the massage tool 100. In certain embodiments, the surface 146 can extend generally perpendicularly to an elongated section 148 of the connector 116 extending between the first end 140 and the second end 142. In certain embodiments, a diameter of the flat surface 146 can be between 0.5 inches to 1.5 inches, between 0.7 inches to 1.3 inches, between 0.8 inches to 1.2 inches, between 0.9 inches to 1.1 inches, or any other suitable range. In certain embodiments, a diameter of the flat surface 146 can be between 0.5 inches, about 0.5 inches, 0.6 inches, about 0.6 inches, 0.7 inches, about 0.7 inches, 0.8 inches, about 0.8 inches, 0.9 inches, about 0.9 inches, 1.0 inch, about 1.0 inch, 1.1 inches, about 1.1 inches, 1.2 inches, about 1.2 inches, 1.3 inches, about 1.3 inches, 1.4 inches, about 1.4 inches, 1.5 inches, about 1.5 inches, or any other suitable diameter. In certain embodiments, flat surface 146 having a diameter of 1.3 inches may be used with a massage head 106 having a diameter of 1.5 inches. In certain embodiments, a flat surface 146 having a diameter of 0.7 inches can be used with a massage head 106 having a diameter of 1.0 inch or 0.75 inches.

In certain embodiments, the second end 142 can be shaped, sized, positioned, or otherwise configured so that the second end 142 does not extend beyond the bottom surface 124 of the platform 120 during reciprocating motion of the massage head 106. In certain embodiments, the second end 142 can be restricted from extending beyond the bottom surface 124 of the platform 120 during reciprocating motion of the massage head 106. Restricting the second end 142 from extending beyond the bottom surface 124 of the platform 120 can prevent or reduce contact of the second end 142 with a patient or user if, for example, the massage head 106 disconnects from the connector 116.

In certain embodiments, a length between the first end 140 and the second end 142 can be 1 inch, about 1 inch, 1.5 inches, about 1.5 inches, 2 inches, about 2 inches, 2.12 inches, about 2.12 inches, 2.25 inches, about 2.25 inches, 2.5 inches, about 2.5 inches, 2.62 inches, about 2.62 inches 2.75 inches, about 2.75 inches, 3.0 inches, about 3.0 inches, 3.5 inches, about 3.5 inches, or any other suitable length. In certain embodiments, a length between the first end 140 and the second end 142 can be between 1 inch to 4 inches, between 2 inches to 3 inches, between 2.0 inches to 2.25 inches, between 2.25 inches to 2.75 inches, between 2.5 inches to 2.75 inches, or any other suitable length. In some embodiments, a connector 116 having a smaller length can allow for reduced displacement of the body tissue in comparison to a connector 116 having greater length. Reduced displacement may be desirable for treatment areas that are sore or tender. Reduced displacement may be desirable for treatment areas where there is a minimal amount of soft body tissue between the outer surface and underlying skeletal system.

In certain embodiments, the massage head 106 can be molded around second end 142. In certain embodiments, the massage head 106 can include multiple layers of molding around the second end 142. In certain embodiments, the patient contact portion 108 can form an outer mold. In certain embodiments, one or more layers of inner mold may be molded around the second end 142 between the patient contact portion 108 and the second end 142. In certain embodiments, one or more layers of the molding of the massage head 106 can extend distal to the second end 142 of the connector 116 so that a total length of the massage head 106 is greater than the length of the connector 116.

Figure 10:
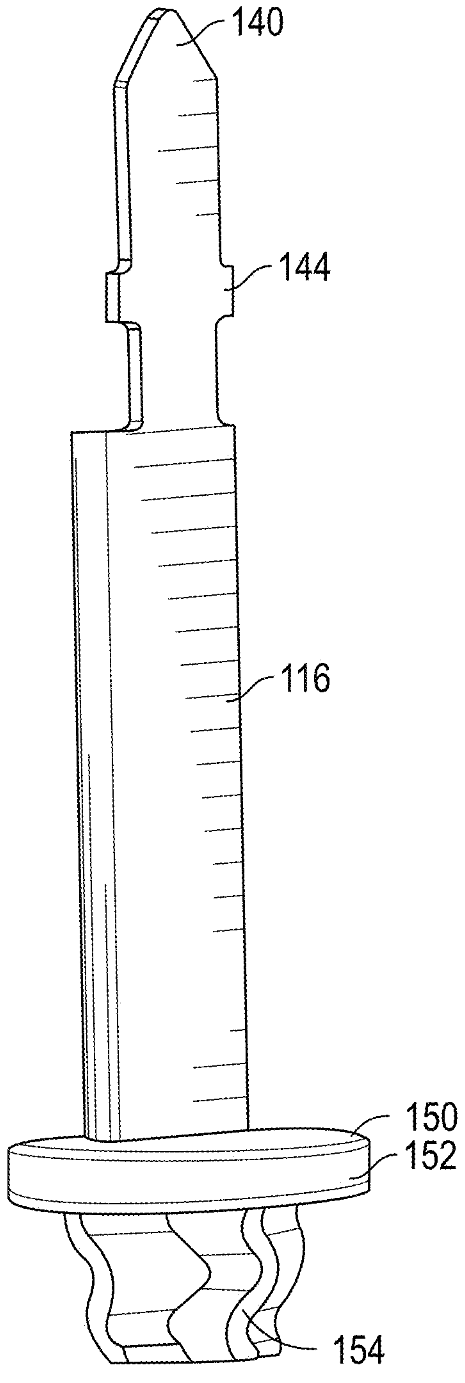
FIG. 10 is a perspective view of a massage head of a massage tool as shown in FIG. 1 showing internal features of the massage head.
Figure 11A:
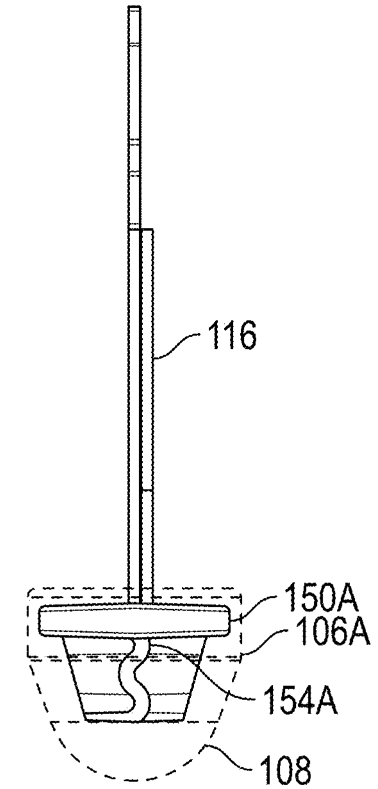
FIG. 11A illustrates a rear view of a massage head of a massage tool as shown in FIG. 1.
Figure 11B:
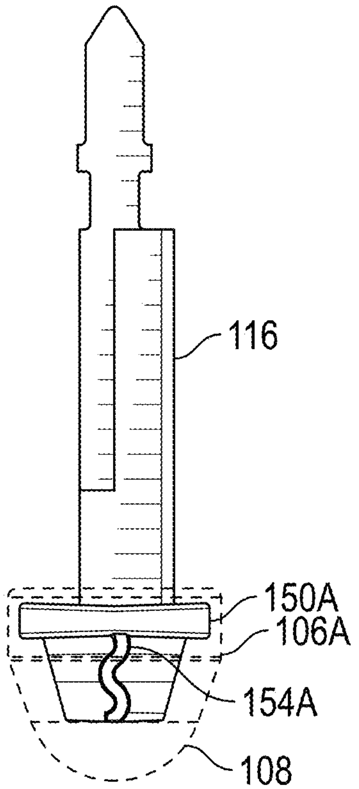
FIG. 11B illustrates a side view of a massage head of a massage tool as shown in FIG. 1.
Figure 11C:
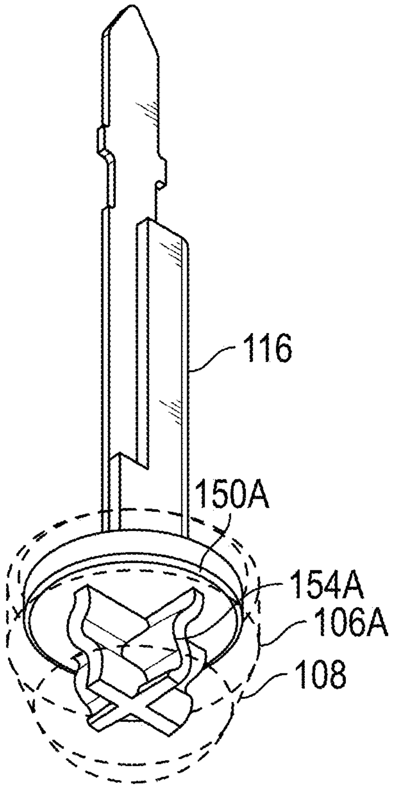
FIG. 11C illustrates a perspective view of a massage head of a massage tool as shown in FIG. 1.
Figure 11D:
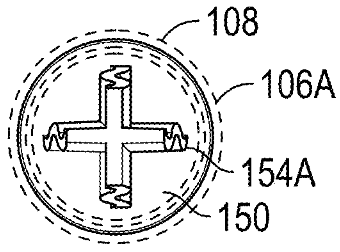
FIG. 11D illustrates a bottom view of a massage head of a massage tool as shown in FIG. 1.
Figure 12A:
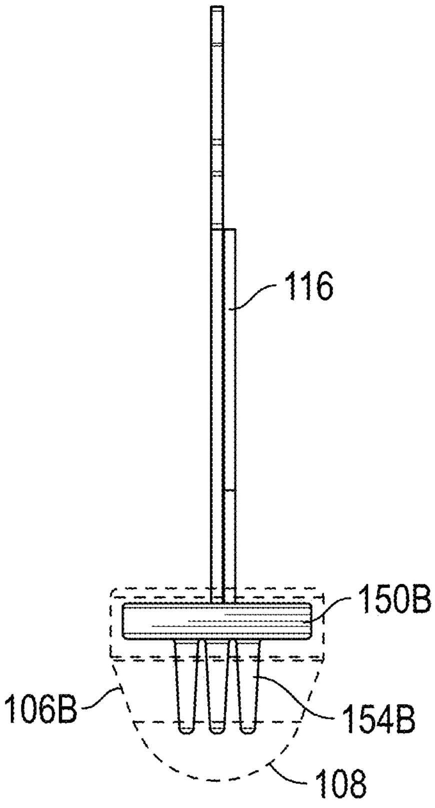
FIG. 12A illustrates a rear view of a massage head of a massage tool as shown in FIG. 1.
Figure 12B:
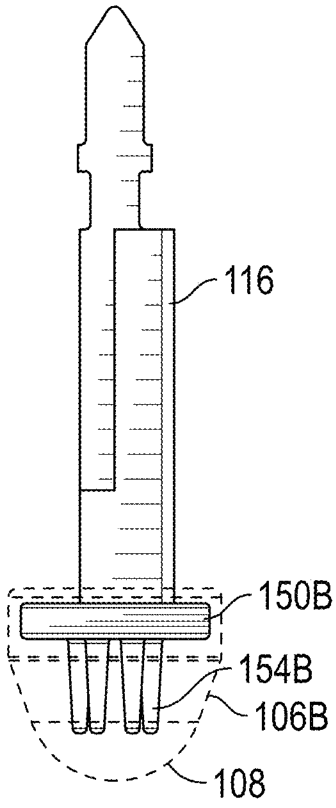
FIG. 12B illustrates a side view of a massage head of a massage tool as shown in FIG. 1.
Figure 12C:
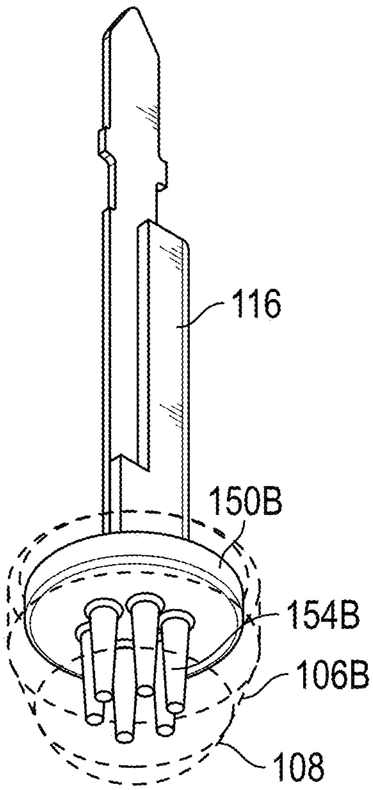
FIG. 12C illustrates a perspective view of a massage head of a massage tool as shown in FIG. 1.
Figure 12D:
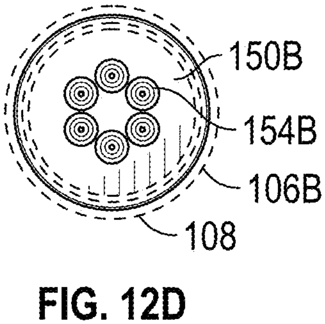
FIG. 12D illustrates a bottom view of a massage head of a massage tool as shown in FIG. 1.
Figure 13A:
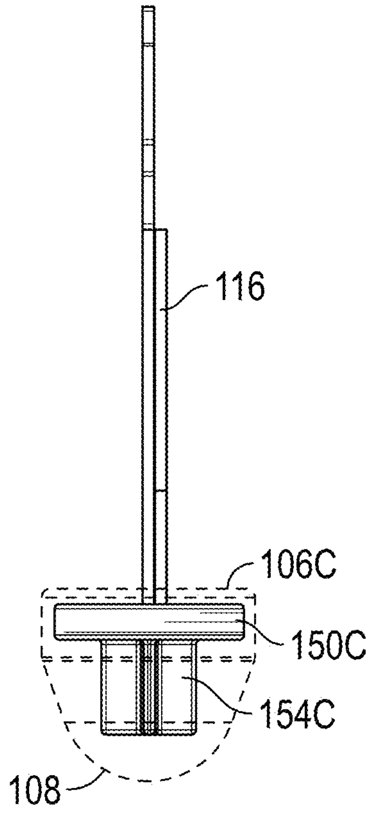
FIG. 13A illustrates a rear view of a massage head of a massage tool as shown in FIG. 1.
Figure 13B:
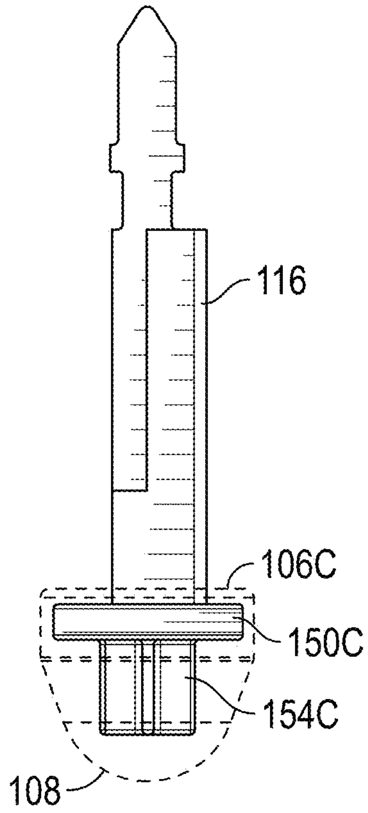
FIG. 13B illustrates a side view of a massage head of a massage tool as shown in FIG. 1.
Figure 13C:
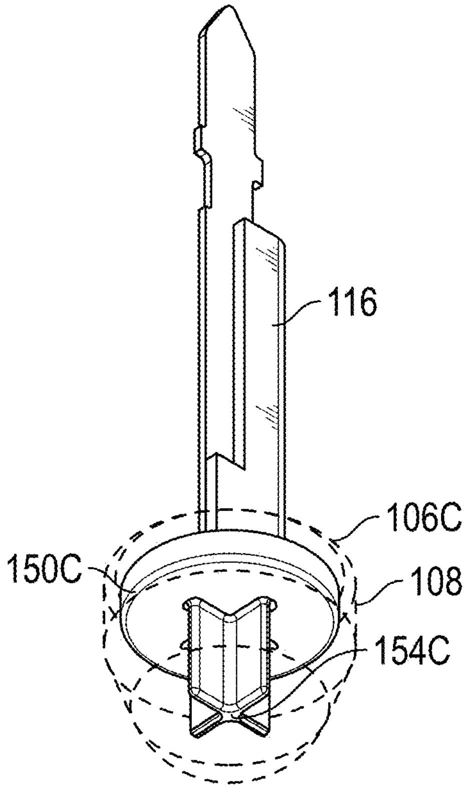
FIG. 13C illustrates a perspective view of a massage head of a massage tool as shown in FIG. 1.
Figure 13D:
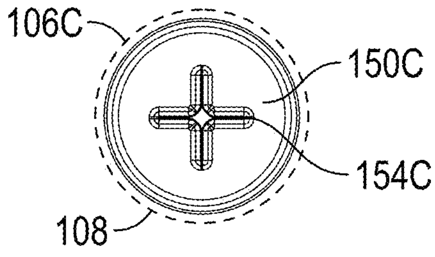
FIG. 13D illustrates a bottom view of a massage head of a massage tool as shown in FIG. 1.
Figure 14A:
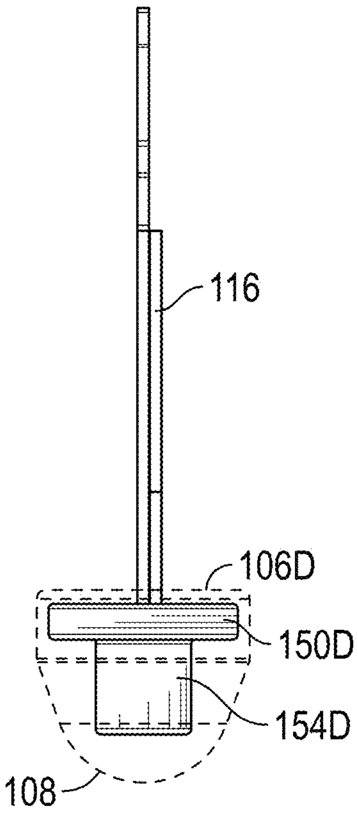
FIG. 14 illustrates a rear view of a massage head of a massage tool as shown in FIG. 1.
FIG. 14B illustrates a side view of a massage head of a massage tool shown in FIG. 1.
FIG. 14C illustrates a perspective view of a massage head of a massage tool as shown in FIG. 1.
FIG. 14D illustrates a bottom view of a massage head of a massage tool as shown in FIG. 1.
Figure 14B:
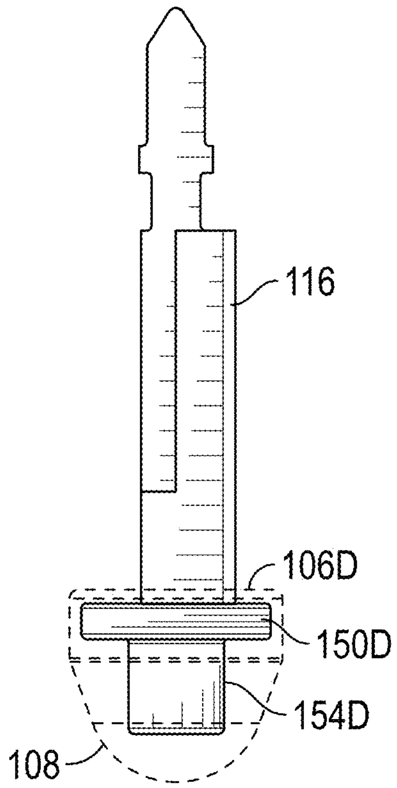
Figure 14C:
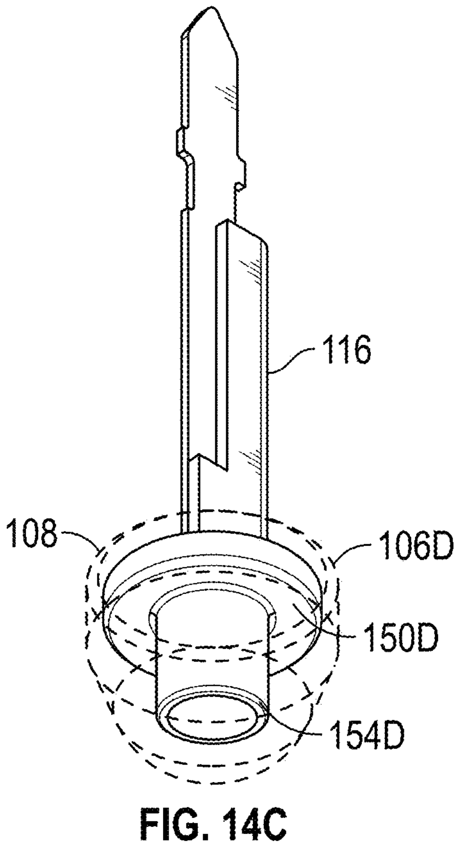
Figure 14D:
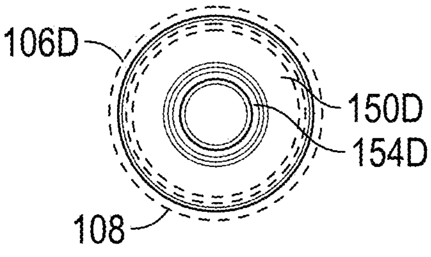
Figure 15A:
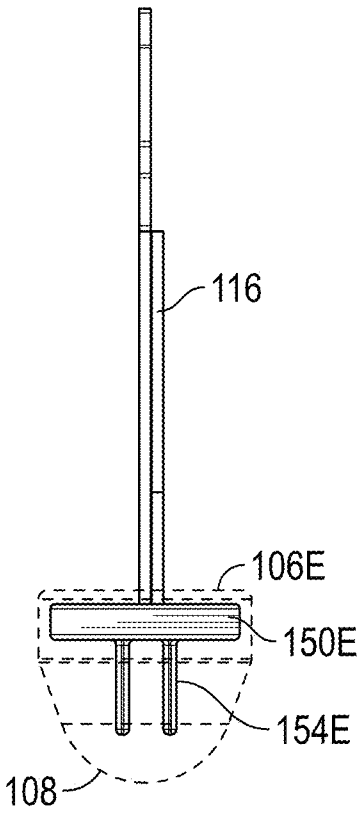
FIG. 15A illustrates a rear view of a massage head of a massage tool as shown in FIG. 1.
Figure 15B:
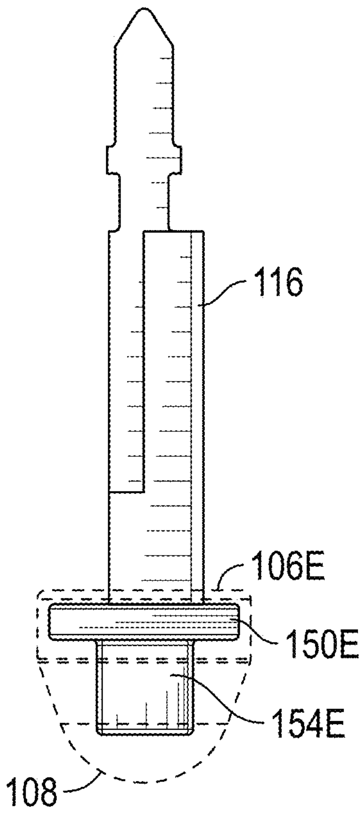
FIG. 15B illustrates a side view of a massage head of a massage tool as shown in FIG. 1.
Figure 15C:
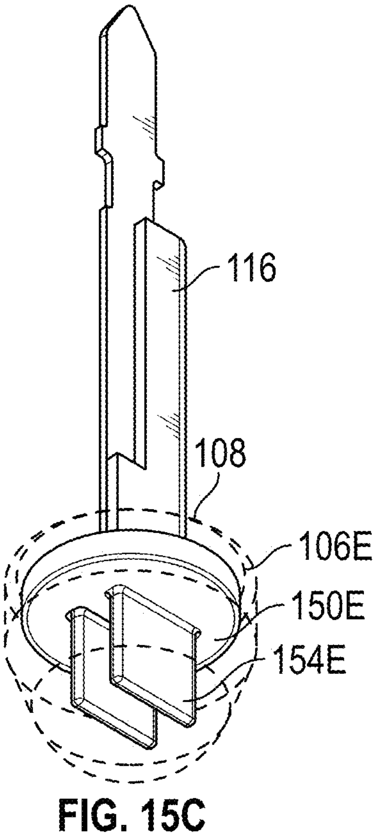
FIG. 15C illustrates a perspective view of a massage head of a massage tool as shown in FIG. 1.
Figure 15D:
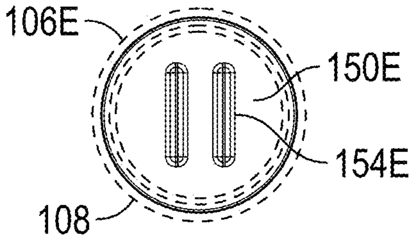
FIG. 15D illustrates a bottom view of a massage head of a massage tool as shown in FIG. 1.
Figure 16A:
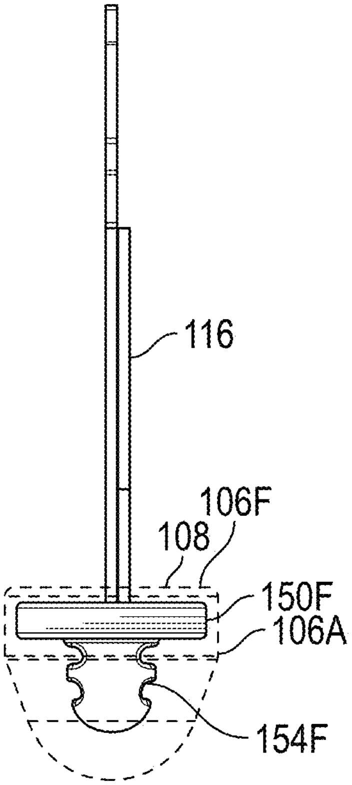
FIG. 16A illustrates a rear view of a massage head of a massage tool as shown in FIG. 1.
Figure 16B:
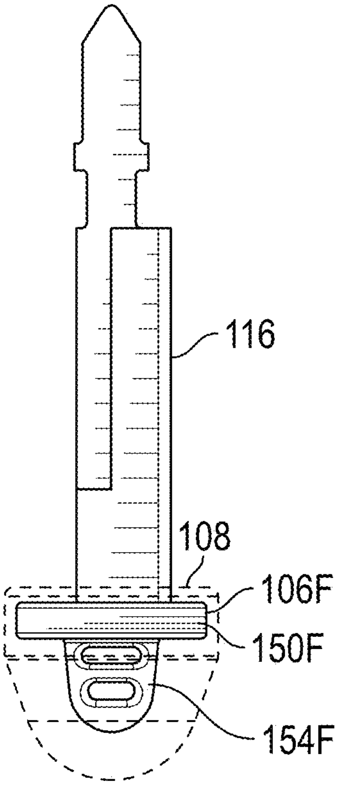
FIG. 16B illustrates a side view of a massage head of a massage tool shown in FIG. 1.
Figure 16C:
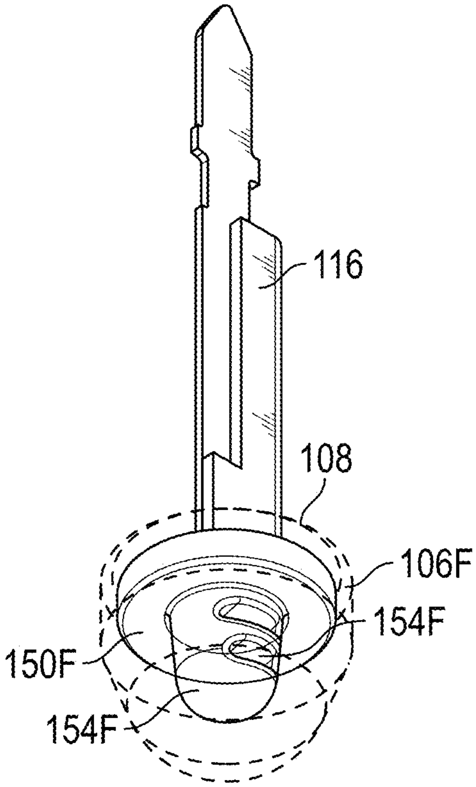
FIG. 16C illustrates a perspective view of a massage head of a massage tool as shown in FIG. 1.
Figure 16D:
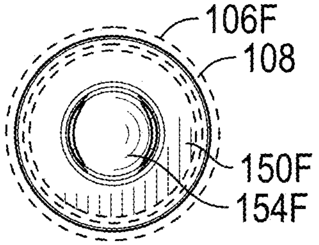
FIG. 16D illustrates a bottom view of a massage head of a massage tool as shown in FIG. 1.
Figure 17A:
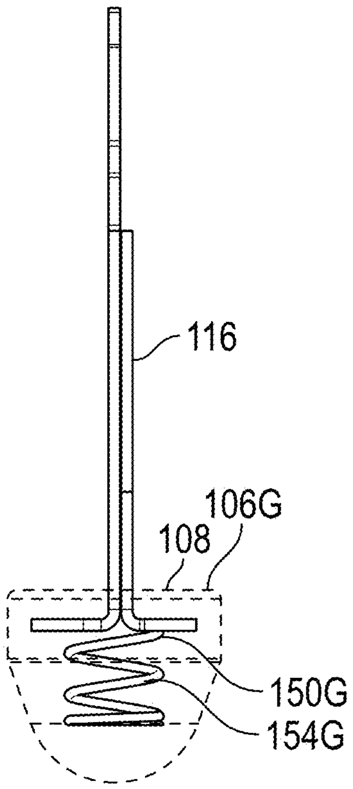
FIG. 17A illustrates a rear view of a massage head of a massage tool as shown in FIG. 1.
Figure 17B:
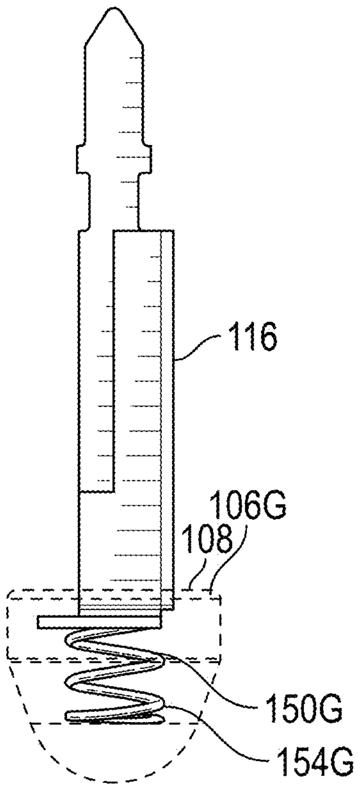
FIG. 17B illustrates a side view of a massage head of a massage tool as shown in FIG. 1.
Figure 17C:
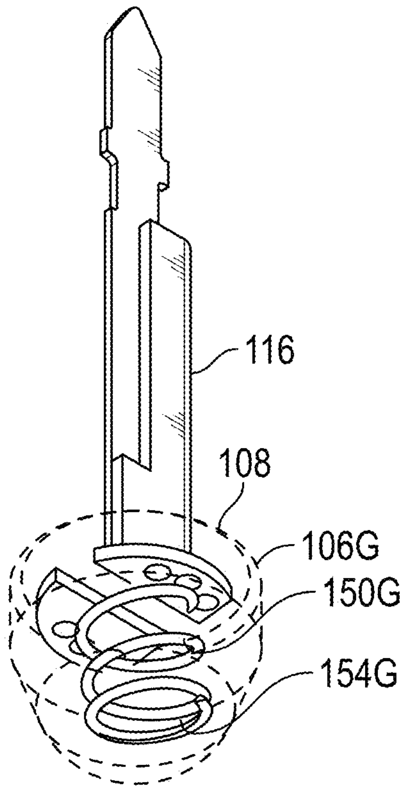
FIG. 17C illustrates a perspective view of a massage head of a massage tool as shown in FIG. 1.
Figure 17D:
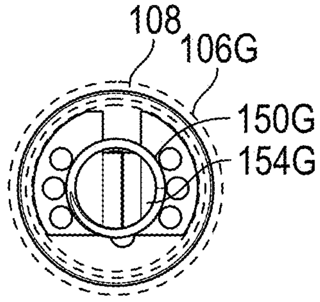
FIG. 17D illustrates a bottom view of a massage head of a massage tool as shown in FIG. 1.
Figure 18A:
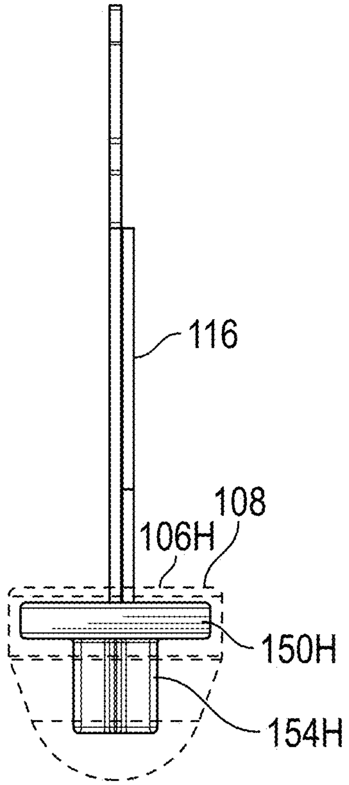
FIG. 18A illustrates a rear view of a massage head of a massage tool as shown in FIG. 1.
Figure 18B:
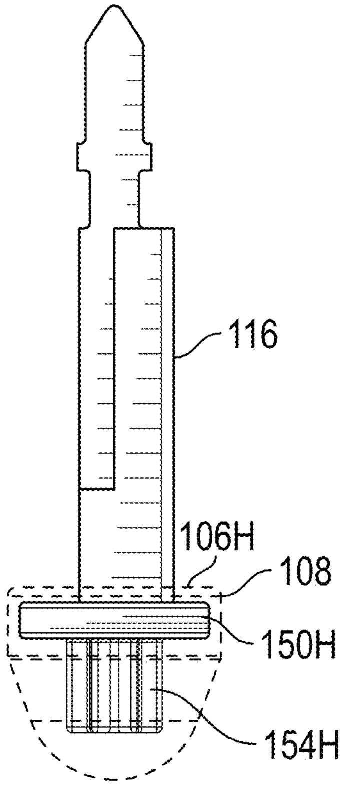
FIG. 18B illustrates a side view of a massage head of a massage tool as shown in FIG. 1.
Figure 18C:
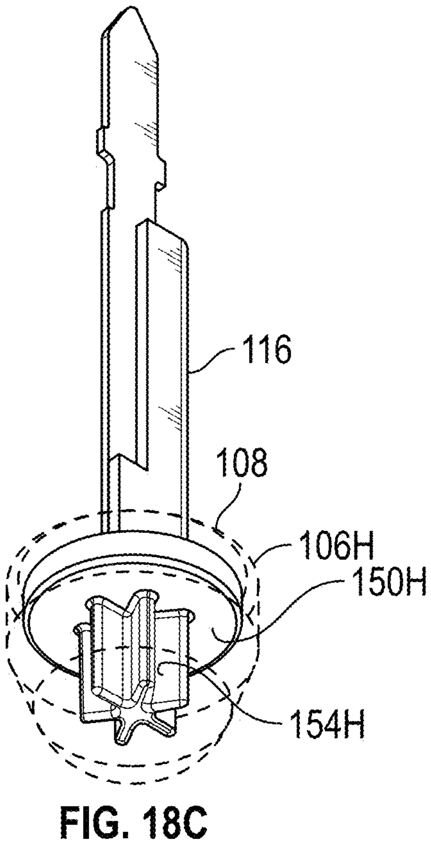
FIG. 18C illustrates a perspective view of a massage head of a massage tool as shown in FIG. 1.
Figure 18D:
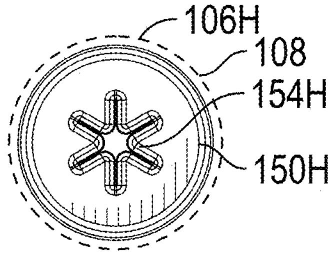
FIG. 18D illustrates a bottom view of a massage head of a massage tool as shown in FIG. 1.
Figure 19A:
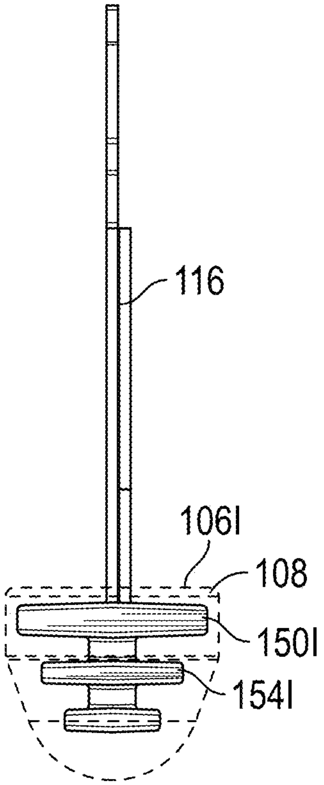
FIG. 19A illustrates a rear view of a massage head of a massage tool as shown in FIG. 1.
Figure 19B:
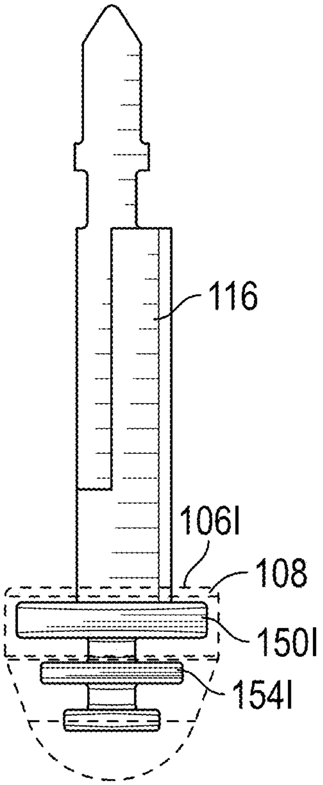
FIG. 19B illustrates a side view of a massage head of a massage tool as shown in FIG. 1.
Figure 19C:
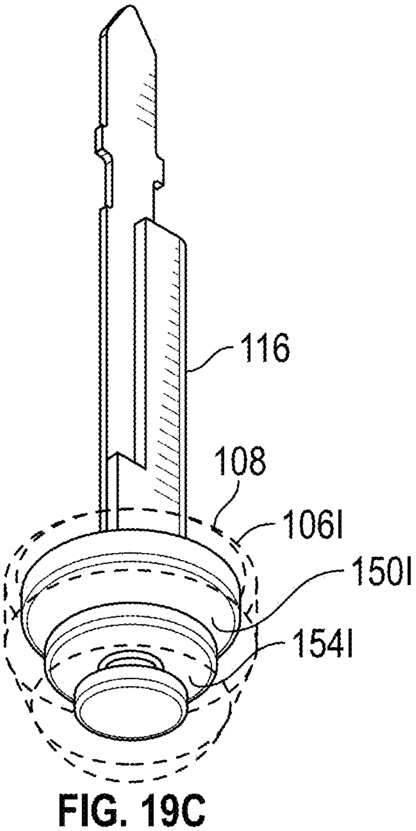
FIG. 19C illustrates a perspective view of a massage head of a massage tool as shown in FIG. 1.
Figure 19D:
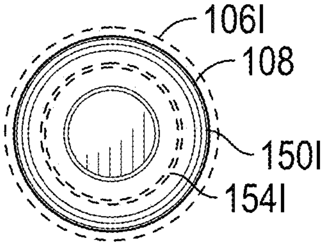
FIG. 19D illustrates a bottom view of a massage head of a massage tool as shown in FIG. 1.
Figure 20A:
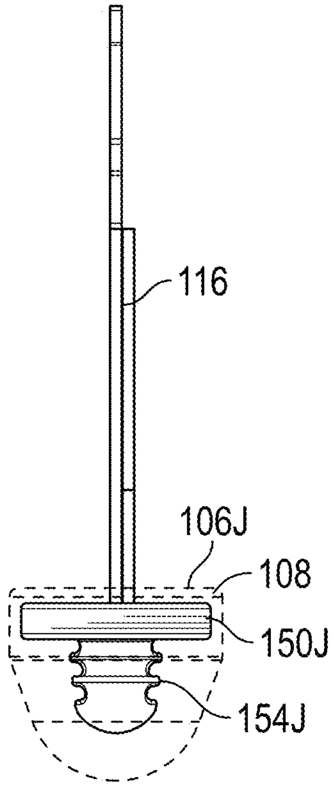
FIG. 20A illustrates a rear view of a massage head of a massage tool as shown in FIG. 1.
Figure 20B:
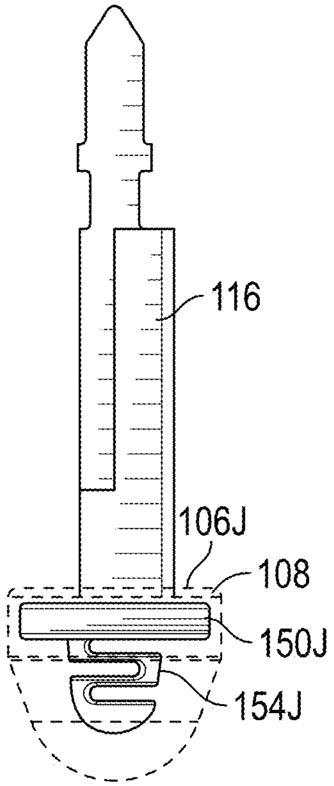
FIG. 20B illustrates a side view of a massage head of a massage tool as shown in FIG. 1.
Figure 20C:
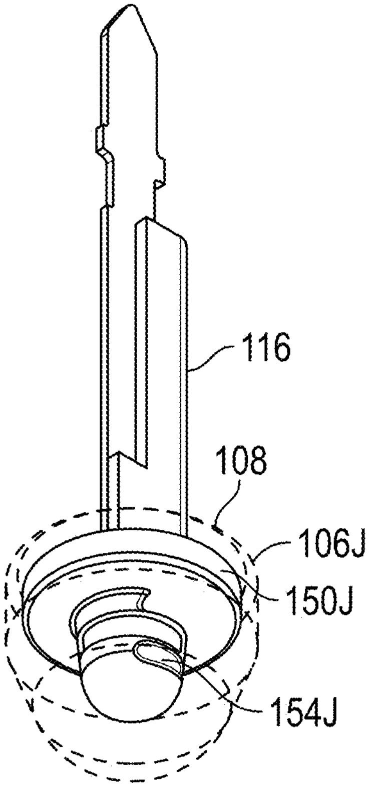
FIG. 20C illustrates a perspective view of a massage head of a massage tool as shown in FIG. 1.
Figure 20D:
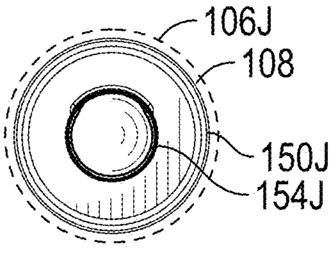
FIG. 20D illustrates a bottom view of a massage head of a massage tool as shown in FIG. 1.

FIG. 10 illustrates a perspective view of the massage head 106 with the contact portion 108 removed. As shown in FIG. 10, the massage head 106 can include an inner mold 150. In certain embodiments, the inner mold 150 can include a base 152 configured to receive the second end 142 of the connector 116.

In certain embodiments, the contact portion 108 can be molded around the inner mold 150. In certain embodiments, the contact portion 108 can form an outer mold. In certain embodiments, the inner mold 150 can be formed of a harder (higher durometer) material than the contact portion 108. In certain embodiments, the inner mold 150 can be formed of a harder (higher durometer) material than the contact portion 108 to provide for a transition of hardness between the connector 116 and the contact portion 108. In certain embodiments, the transition of hardness can prevent the contact portion 108 from disengaging from the connector 116.

In certain embodiments, the inner mold 150 can be formed of a material of sufficient hardness to prevent or restrict dislodgement of the inner mold 150 from the connector 116. In certain embodiments, the patient contact portion 108 can be formed of a material of sufficient hardness to prevent or restrict dislodgement of the contact portion 108 from the inner mold 150. In certain embodiments, the transition of hardness between the connector 116 and the patient contact portion 108 can allow for a softer patient contact portion 108 with less risk of dislodgement of the massage head 106. The transition of hardness can also provide for a softer patient contact portion 108 that can undergo repeated use without damage or dislodgement of the massage head 106. In certain embodiments, a softer patient contact portion 108 can enhance patient comfort and prevent injury when the massage head 106 is used on sensitive or delicate treatment regions.

In certain embodiments, the contact portion 108 can be a polymer. In certain embodiments, the contact portion 108 can be an elastomer. In certain embodiments, the contact portion 108 can be a polyurethane elastomer. In certain embodiments, the contact portion 108 can have a hardness of 15 Shore A, 30 Shore A, 50 Shore A, 60 Shore A, or any other suitable hardness. In certain embodiments, the contact portion 108 can have a hardness of less than 15 Shore A. In certain embodiments, the contact portion 108 can have a hardness of greater than 60 Shore A. Contact portions 108 of different hardness ratings can allow for different amounts of cushion and/or deformation of the contact portions 108 when in contact with the body tissue. Contact portions 108 having lower hardness ratings can be desirable on delicate body tissue and/or treatment regions where the body tissue is relatively close to a skeletal structure or where the density or mass of the body tissue is small or of similar thickness to the maximum displacement of the massage head 106 relative to the bottom surface 124 of the platform 120. For example, in certain embodiments, contact portions 108 having lower hardness ratings, such as 15 Shore A or less than 15 Shore A, may be applied to the muscles or body tissue in and around the elbow or other treatment regions where muscle tightness and tenderness is acute.

Contact portions 108 having higher hardness ratings can be desirable for treatment of large muscle groups such as the gluteus muscles or hamstrings to allow for penetration of deeper muscle fibers that may be more difficult to manipulate. In certain embodiments, use of relatively longer connectors 116 with a relatively large contact portion 108, such as contact portions 1080 and 108F, can be desirable for treatment of large muscle groups such as the gluteus muscles or hamstrings to allow for penetration of deeper muscle fibers that may be more difficult to manipulate.

In certain embodiments, the inner mold 150 can be a polymer. In certain embodiments, the inner mold 150 can be an elastomer. In certain embodiments, the inner mold 150 can be a polyurethane elastomer. In certain embodiments, the inner mold 150 can have a hardness of 30 Shore A, 40 Shore A, 50 Shore A, 60 Shore A, 70 Shore A, or any other suitable hardness.

In certain embodiments, the inner mold 150 can include one or more surface features 154. The surface features 154 can be sized, shaped, positioned, or otherwise configured to secure the contact portion 108 to the inner mold 150. The surface features 154 can enhance security of the contact portion 108 to the mold 150. In certain embodiments, the inner mold 150 and/or the surface features 154 can be sized, shaped, positioned, or otherwise configured to prevent dislodgement of the contact portion 108 from the inner mold. In certain embodiments, the inner mold 150 and/or the surface features 154 can be sized, shaped, positioned, or otherwise configured to prevent or limit motion or flexing of the massage head 106 perpendicular to the direction of reciprocating motion of the massage head. In certain embodiments, the surface features can include projections, protrusions, slots, recesses, bumps, ridges, grooves, irregular shapes, or any other suitable surface features. Examples of different inner mold designs are illustrated in FIGS. 11A-20D.

FIGS. 11A-D illustrates a rear view, a side view, a perspective view, and a bottom view, respectively, of a massage head 106A in which the patient contact portion 108A is shown as transparent to illustrate internal features of the massage head 106A. As shown in the FIGS. 11A-D, the patient massage head 106A includes an inner mold 150A. In certain embodiments, the inner mold 150A includes surface features 154A. In certain embodiments, the surface features 154A can include one or more wavy or curved projections. In certain embodiments, the wavy or curved projections can cross one another or be connected to one another or integrally formed with one another.

FIGS. 12A-D illustrates a rear view, a side view, a perspective view, and a bottom view, respectively, of a massage head 106B in which the patient contact portion 108B is shown as transparent to illustrate internal features of the massage head 106B. As shown in the FIGS. 12A-D, the patient massage head 106B includes an inner mold 150B. In certain embodiments, the inner mold 150B includes surface features 154B. In certain embodiments, the surface features 154B can include one or more conical projections.

FIGS. 13A-D illustrates a rear view, a side view, a perspective view, and a bottom view, respectively, of a massage head 106C in which the patient contact portion 108C is shown as transparent to illustrate internal features of the massage head 106C. As shown in the FIGS. 13A-D, the patient massage head 106C includes an inner mold 150C. In certain embodiments, the inner mold 150C includes surface features 154C. In certain embodiments, the surface features 154C can include a projection having a generally plus-sign shaped cross-section.

FIGS. 14A-D illustrates a rear view, a side view, a perspective view, and a bottom view, respectively, of a massage head 106D in which the patient contact portion 108D is shown as transparent to illustrate internal features of the massage head 106D. As shown in the FIGS. 14A-D, the patient massage head 106D includes an inner mold 150D. In certain embodiments, the inner mold 150D includes surface features 154D. In certain embodiments, the surface features 154D can include a generally cylindrical projection.

FIGS. 15A-D illustrates a rear view, a side view, a perspective view, and a bottom view, respectively, of a massage head 106E in which the patient contact portion 108E is shown as transparent to illustrate internal features of the massage head 106E. As shown in the FIGS. 15A-D, the patient massage head 106E includes an inner mold 150E. In certain embodiments, the inner mold 150E includes surface features 154E. In certain embodiments, the surface features 154E can include one or more rectangular projections.

FIGS. 16A-D illustrates a rear view, a side view, a perspective view, and a bottom view, respectively, of a massage head 106F in which the patient contact portion 108F is shown as transparent to illustrate internal features of the massage head 106F. As shown in the FIGS. 16A-D, the patient massage head 106F includes an inner mold 150F. In certain embodiments, the inner mold 150F includes surface features 154F. In certain embodiments, the surface features 154F can include a rounded projection. In certain embodiments, the rounded projection can include one or more slots or recesses.

FIGS. 17A-D illustrates a rear view, a side view, a perspective view, and a bottom view, respectively, of a massage head 106G in which the patient contact portion 108G is shown as transparent to illustrate internal features of the massage head 106G. As shown in the FIGS. 16A-D, the patient massage head 106G includes an inner mold 150G. In certain embodiments, the inner mold 150G includes surface features 154G. In certain embodiments, the inner mold 150G is a spring. In such embodiments, the spring may provide lateral stability without increasing a resistance to compression of the massage head 106G along the axis of reciprocating movement of the massage head 106G. In certain embodiments, the spring can prevent or limit motion or flexing of the massage head 106G perpendicular to the direction of reciprocating motion of the massage head 106G. In certain embodiments, the surface features 154G are the coils of the spring.

FIGS. 18A-D illustrates a rear view, a side view, a perspective view, and a bottom view, respectively, of a massage head 106H in which the patient contact portion 108H is shown as transparent to illustrate internal features of the massage head 106H. As shown in the FIGS. 18A-D, the patient massage head 106H includes an inner mold 150H. In certain embodiments, the inner mold 150H includes surface features 154H. In certain embodiments, the surface features 154H can include a projection having a plurality of protrusions extending from a center region. In certain embodiments, a cross section of the projection can be shaped as a star or asterisk.

FIGS. 19A-D illustrates a rear view, a side view, a perspective view, and a bottom view, respectively, of a massage head 106I in which the patient contact portion 108I is shown as transparent to illustrate internal features of the massage head 106I. As shown in the FIGS. 19A-D, the patient massage head 106I includes an inner mold 150I. In certain embodiments, the inner mold 150I includes surface features 154I. In certain embodiments, the surface features 154I can include a generally cylindrical projection. In certain embodiments, one or more disks can extend around or be integrally formed with the generally cylindrical projection. In certain embodiments, diameter of adjacent disks can decrease between the proximal end of the inner mold 150I and the distal end of the inner mold 150I.

FIGS. 20A-D illustrates a rear view, a side view, a perspective view, and a bottom view, respectively, of a massage head 106J in which the patient contact portion 108J is shown as transparent to illustrate internal features of the massage head 106J. As shown in the FIGS. 20A-D, the patient massage head 106J includes an inner mold 150J. In certain embodiments, the inner mold 150J includes surface features 154J. In certain embodiments, the surface features 154J can include a rounded projection. In certain embodiments, the rounded projection can include one or more slots or recesses. In certain embodiments, adjacent slots or recesses may be formed in opposing sides of the rounded projection.

FIGS. 21A-F illustrate embodiments of contact portions 108 that can be used with the massage tool 100. In certain embodiments, any of the contact portions described in FIGS. 21A-F can be used with any of the inner molds described in FIGS. 11A-20D FIG. 21A illustrates a side view of a contact portion 108A. In certain embodiments, the contact portion 108A can include a cylindrical section 114A. In certain embodiments, the contact portion 108A can include a tapered section 112A. In certain embodiments, the tapered section 112A can extend inferiorly from the cylindrical section 114A. In certain embodiments, the contact portion 108A can include a rounded tip 110A, in certain embodiments, the rounded tip 110A can extend inferiorly from the tapered section 112A. In certain embodiments, the contact portion 108A can have a head volume of 0.34 $in^3$. In certain embodiments, the rounded tip 110A can be partially spherical. In certain embodiments, the rounded tip 110A can be partially spherical with a diameter of 0.5 inches. In certain embodiments, when attached to a connected 116 having a length of 2.12 inches, the rounded tip 110A can extend 0.4 inches beyond the bottom surface 124 of platform 120. In certain embodiments, when attached to a connector 116 having a length of 2.62 inches, the rounded tip 110A can extend 0.65 inches beyond the bottom surface 124 of the platform 120.

Figure 21A:
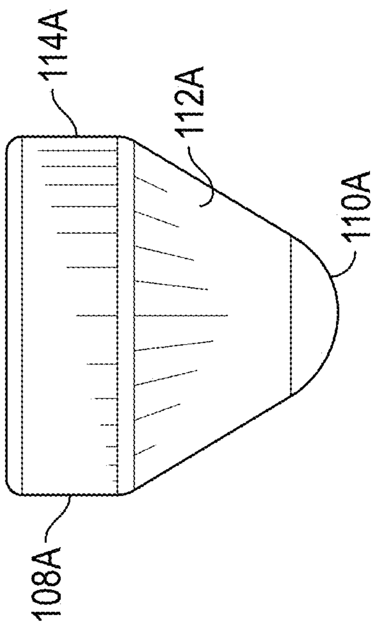
FIG. 21A illustrates a contact portion of a massage head of a massage tool as shown in FIG. 1.
Figure 21B:
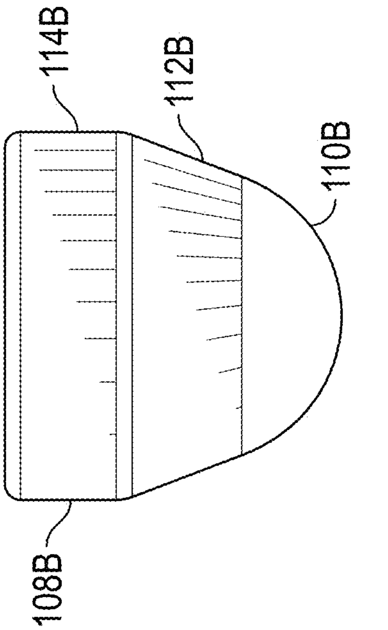
FIG. 21B illustrates a contact portion of a massage head of a massage tool as shown in FIG. 1.

FIG. 21B illustrates a side view of a contact portion 108B. In certain embodiments, the contact portion 108B can include a cylindrical section 114B. In certain embodiments, the contact portion 108B can include a tapered section 112B. In certain embodiments, the tapered section 112B can extend inferiorly from the cylindrical section 114B. In certain embodiments, the contact portion 108B can include a rounded tip 1108. In certain embodiments, the rounded tip 110B can extend interiorly from the tapered section 112B. In certain embodiments, the contact portion 108B can have a head volume of 0.38 $in^3$. In certain embodiments, the rounded tip 110B can be partially spherical. In certain embodiments, the rounded tip 110B can be partially spherical with a diameter of 0.75 inches. In certain embodiments, when attached to a connected 116 having a length of 2.12 inches, the rounded tip 110B can extend 0.4 inches beyond the bottom surface 124 of platform 120. In certain embodiments, when attached to a connector 116 having a length of 2.62 inches, the rounded tip 110B can extend 0.65 inches beyond the bottom surface 124 of the platform 120.

Figure 21C:
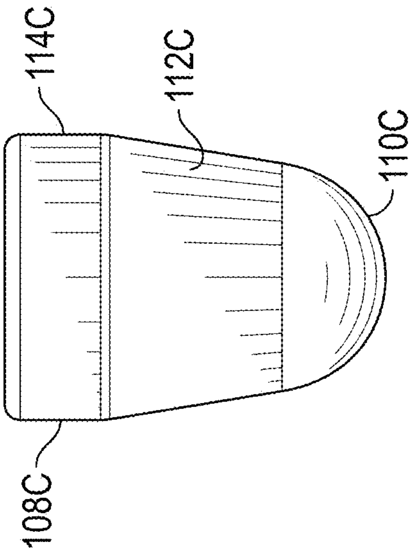
FIG. 21C illustrates a contact portion of a massage head of a massage tool as shown in FIG. 1.

FIG. 21C illustrates a side view of a contact portion 108C. In certain embodiments, the contact portion 108C can include a cylindrical section 114C. In certain embodiments, the contact portion 108C can include a tapered section 112C. In certain embodiments, the tapered section 112C can extend inferiorly from the cylindrical section 114C. In certain embodiments, the contact portion 108C can include a rounded tip 110C. In certain embodiments, the rounded tip 110C can extend inferiorly from the tapered section 112C. In certain embodiments, the contact portion 108C can have a head volume of 0.57 $in^3$. In certain embodiments, the rounded tip 110C can be partially spherical. In certain embodiments, the rounded tip 110A can be partially spherical with a diameter of 0.75 inches. In certain embodiments, when attached to a connector 116 of the same length, the rounded tip 110C can be configured to extend 0.35 inches beyond the rounded tip 110B. In such embodiments, the rounded tip 110C can emulate the application of a deeper massage by 0.35 inches (approximately half the length of a finger tip) at a single location without moving the massage tool, in comparison to the rounded tip 110B. In certain embodiments, when attached to a connector 116 having a length of 2.62 inches, the rounded tip 110C can extend 1.0 inch beyond the bottom surface 124 of the platform 120.

Figure 21D:
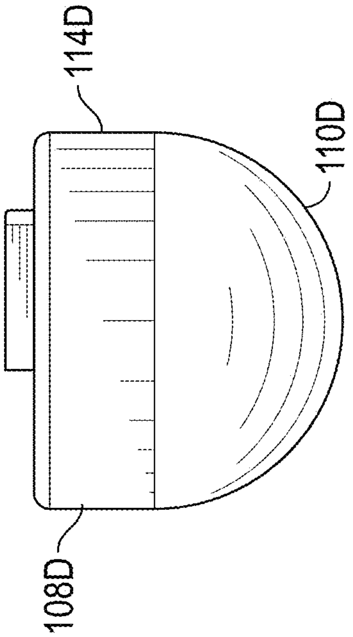
FIG. 21D illustrates a contact portion of a massage head of a massage tool as shown in FIG. 1.

FIG. 21D illustrates a side view of a contact portion 108D. In certain embodiments, the contact portion 108D can include a cylindrical section 114D. In certain embodiments, the contact portion 108D can include a rounded tip 110D. In certain embodiments, the rounded tip 110D can extend inferiorly from the cylindrical section 114D. In certain embodiments, the contact portion 108D can have a head volume of 0.51 $in^3$. In certain embodiments, the rounded tip 110D can be partially spherical. In certain embodiments, the rounded tip 110D can be partially spherical with a diameter of 1.0 inch. In certain embodiments, when attached to a connected 116 having a length of 2.12 inches, the rounded tip 110D can extend 0.4 inches beyond the bottom surface 124 of platform 120. In certain embodiments, when attached to a connector 116 having a length of 2.62 inches, the rounded tip 110D can extend 0.65 inches beyond the bottom surface 124 of the platform 120.

Figure 21E:
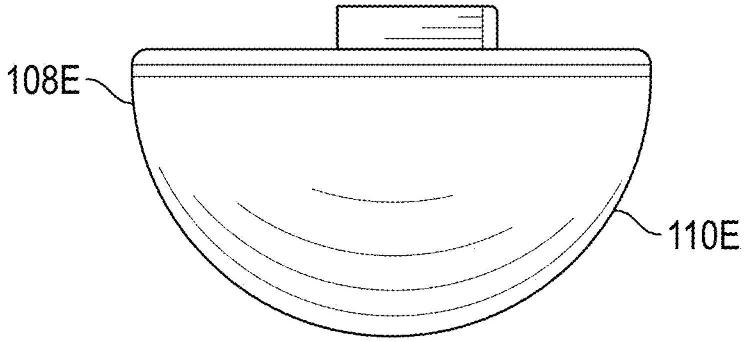
FIG. 21E illustrates a contact portion of a massage head of a massage tool as shown in FIG. 1.

FIG. 21E illustrates a side view of a contact portion 108E. In certain embodiments, the contact portion 108E can include a rounded tip 110E. In certain embodiments, the contact portion 108E can have a head volume of 1.00 $in^3$, In certain embodiments, the rounded tip 110E can be partially spherical. In certain embodiments, the rounded tip 110E can be partially spherical with a diameter of 1.5 inches. In certain embodiments, when attached to a connector 116 having a length of 2.62 inches, the rounded tip 110E can extend 0.65 inches beyond the bottom surface 124 of the platform 120.

Figure 21F:
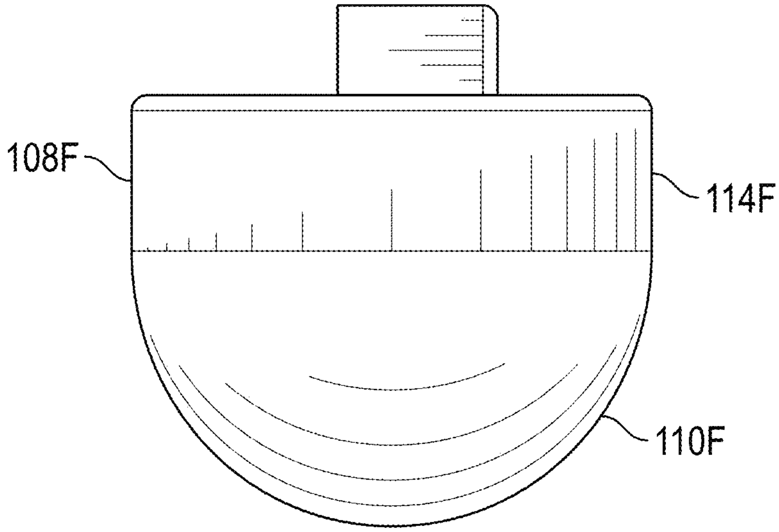
FIG. 21F illustrates a contact portion of a massage head of a massage tool as shown in FIG. 1.

FIG. 21F illustrates a side view of a contact portion 108F. In certain embodiments, the contact portion 108F can include a cylindrical section 114F. In certain embodiments, the contact portion 108F can include a rounded tip 110E In certain embodiments, the rounded tip 110E can extend inferiorly from the cylindrical section 114F. In certain embodiments, the contact portion 108E can have a head volume of 1.62 $in^3$. In certain embodiments, the rounded tip 110F can be partially spherical. In certain embodiments, the rounded tip 110F can be partially spherical with a diameter of 1.5 inches. In certain embodiments, when attached to a connector 116 of the same length, the rounded tip 110F can be configured to extend 0.4 inches beyond the rounded tip 110E. In such embodiments, the rounded tip 110F can emulate the application of a deeper massage by 0.4 inches (a deeper massage to emulate the digging in with an elbow) that is applied at a single location without moving the massage tool in comparison to the rounded tip 110E. In certain embodiments, when attached to a connector 116 having a length of 2.62 inches, the rounded tip 110F can extend 1.05 inches beyond the bottom surface 124 of the platform 120.

In certain embodiments, the contact portions 108A-F can be applied at different depths. In certain embodiments, the contact portions 108A-F can be applied at depths of 0.25 in, 0.5 in, 0.75 in, 1.0 in, 1.25 in, 1.5 in, or any other suitable depth from the bottom surface 124 of the platform. In some embodiments, the contact portions 108A-F can be coupled with connectors 116 having lengths so that a distal tip of the contact portions 108A-F extends beyond the bottom surface 124 of the platform 120 by a depth of 0.2 inches, about 0.2 inches, 0.3 inches, about 0.3 inches, 0.4 inches, about 0.4 inches, 0.45 inches, about 0.45 inches, 0.5 inches, about 0.5 inches, 0.6 inches, about 0.6 inches, 0.65 inches, about 0.65 inches, 0.7 inches, about 0.7 inches, 0.75 inches, about 0.75 inches, 0.8 inches, about 0.8 inches, 0.85 inches, about 0.85 inches, 0.9 inches, about 0.9 inches, 0.95 inches, about 0.95 inches, 1.0 inch, about 1.0 inch, 1.05 inches, about 1.05 inches, 1.1 inches, about 1.1 inches, 1.2 inches, about 1.2 inches, 1.3 inches, about 1.3 inches, 1.5 inches, about 1.5 inches, 1.75 inches, about 1.75 inches, 2.0 inches, about 2.0 inches, 2.25 inches, about 2.25 inches, 2.5 inches, about 2.5 inches, or any other suitable depth. In certain embodiments, contact portions 108A-F having greater depths can achieve deeper penetration of a treatment region.

In certain embodiments, a massage system can include the massage tool 100 and a plurality of massage heads 106 coupled to connectors 116. In certain embodiments, the plurality of massage heads 106 can include massage heads 106 having any of the contact portions 108A-F described in FIGS. 21A-F. In certain embodiments, the plurality of massage heads 106 can include massage heads 106 having any of the inner molds 150A-J and surface features 154A-J described with respect to FIGS. 11A-20D. In certain embodiments, the plurality of massage heads 106 can include massage heads 106 having any of the contact portions 108A-F in combination with any of the inner molds 150A-J and surface features 154A-J. In certain embodiments, the plurality of massage heads 106 can include massage heads 106 coupled to connectors 116 having any of the connector lengths described herein. In certain embodiments, the plurality of massage heads 106 can include massage heads 106 having any of the contact portions 108A-F described in FIGS. 21A-F coupled to connectors 116 having any of the connector lengths described herein. In certain embodiments, the plurality of massage heads 106 can include massage heads 106 having any of the inner molds 150A-J and surface features 154A-J described with respect to FIGS. 11A-20D coupled to connectors 116 having any of the connector lengths described herein. In certain embodiments, the plurality of massage heads 106 can include massage heads 106 having any of the contact portions 108A-F in combination with any of the inner molds 150A-J and surface features 154A-J and coupled to connectors 116 having any of the connector lengths described herein. In certain embodiments, the plurality of massage heads 106 can include massage heads having different Shore A hardness values.

In certain embodiments, different massage heads 106 having different contact portions 108 can be used to perform different massage procedures or to massage different areas. In certain embodiments, massage heads 106 can be used at different depths to perform different massage procedures or to massage different areas. For example, in certain embodiments, a relatively shorter connector 116 can be used with a relatively smaller patient contact portion 108 having a relatively low durometer material to allow for a minimum amount of displacement of body tissue on a patient. In certain embodiments, relatively longer connectors 116 can be used with a relatively large contact portion 108, such as contact portions 108C and 108F, having a relatively high hardness rating can be used for treatment of large muscle groups such as the gluteus muscles or hamstrings to allow for penetration of deeper muscle fibers that may be more difficult to manipulate. Examples of massage therapy procedures using different massage tool configurations are described below.

In certain embodiments, the massage tool 100 can be configured to move the massage heads 106 over a distance of between 0.2 inches to 1.2 inches, between 0.4 inches to 1.0 inch, between 0.6 inches to 0.8 inches, or any other suitable range. In certain embodiments, the massage tool 100 can be configured to move the massage heads 106 over a range of 0.2 inches, about 0.2 inches, 0.4 inches, about 0.4 inches, 0.6 inches, about 0.6 inches, 0.67 inches, about 0.67 inches, 0.7 inches, about 0.7 inches, 0.75 inches, about 0.75 inches, 0.8 inches, about 0.8 inches, 1.0 inch, about 1.0 inch, 1.2 inches, about 1.2 inches, or any other suitable distance.

In certain embodiments, when the distal end of the massage head 106 is at its maximum distance from the bottom surface 124 of the platform 120, a proximal end of the contact portions 108A-F can be retracted proximally within the platform 120 relative to the bottom surface 124. In certain embodiments, retraction of the contact portion 108A-F can prevent contact of the bottom end 142 of the connector 116 with a user or patient.

In certain embodiments, the distal end of the massage head 106 can be retracted proximally within the platform 120 relative to the bottom surface 124. In certain embodiments, when the massage head 106 is at its most retracted position within the platform 120, or when a proximal end of the massage head 106 is at a minimum distance from the body 102, the distal end of the massage head 106 can be retracted proximally within the platform 120 relative to the bottom surface 124. In certain embodiments, when the massage head 106 is in its most retracted position within the platform 120 or when a proximal end of the massage head 106 is at its minimum distance from the body 102, a distal end of the contact portions 108A, B, D, and E can be retracted proximally within the platform 120 relative to the bottom surface 124 by a distance of 0.02 inches, about 0.02 inches, 0.03 inches, about 0.03 inches, 0.04 inches, about 0.04 inches, 0.05 inches, about 0.05 inches, 0.06 inches, about 0.06 inches, 0.07 inches, about 0.07 inches, 0.08 inches, about 0.08 inches, 0.09 inches, about 0.09 inches, 0.1 inches, about 0.1 inches, or any other suitable distance. In certain embodiments, retraction of the contact portion 108A, B, D, and E can allow tissue in the treatment region to rebound after contact from the massage head 106. In certain embodiments, retraction of the contact portions 108A, B, D, and E can facilitate sliding or movement of the bottom surface 124 across a treatment region of a patient. In certain embodiments, a distal end of the contact portions 108C and F can be retracted proximally within the platform relative to the bottom surface 124. In other embodiments, the contact portions 108C and F may protrude distally from the bottom surface when the massage head 106 is at its most retracted position.

Figure 61:
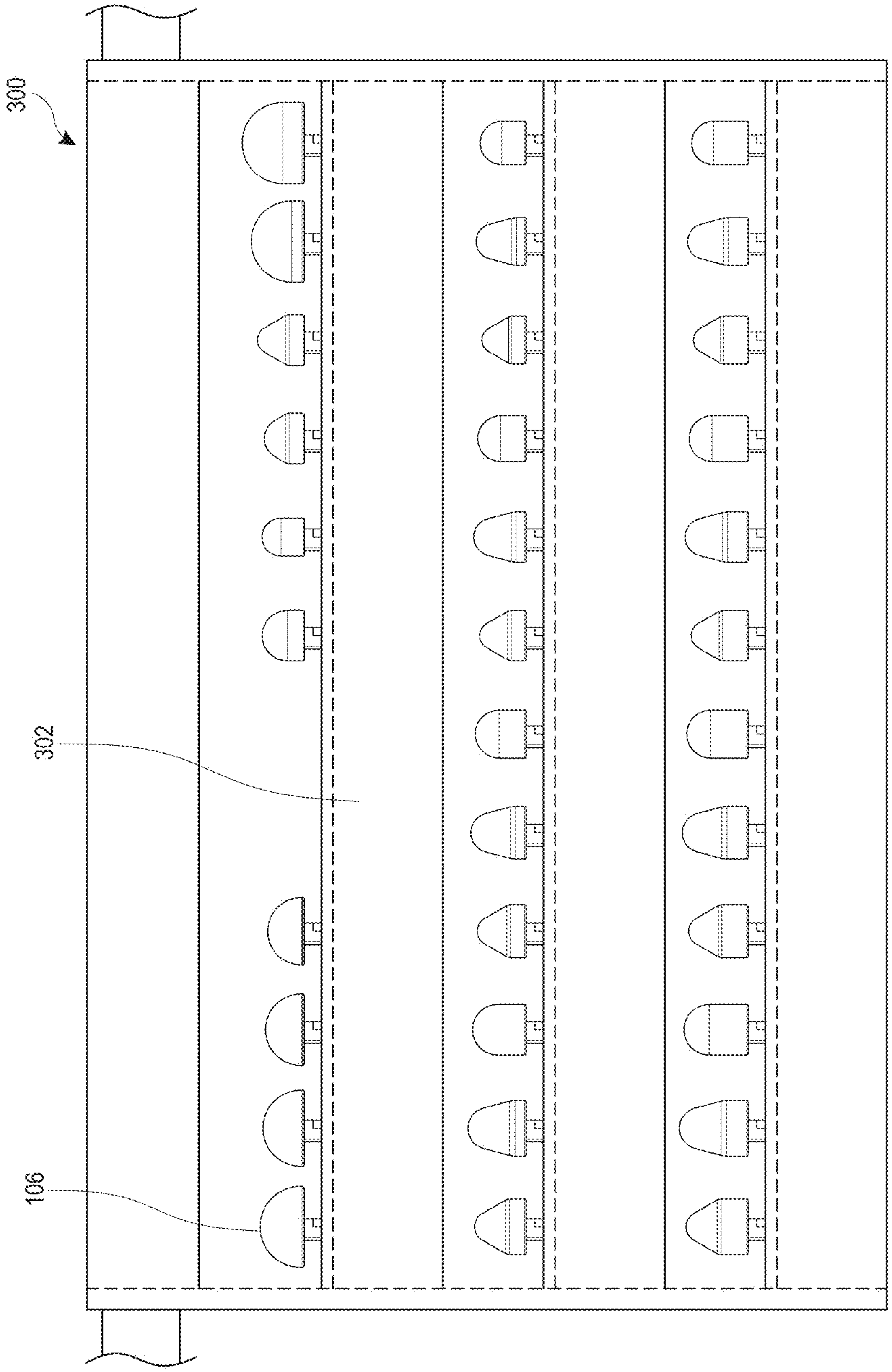
FIG. 61 illustrates a front view of an embodiment of an apron.

As shown in FIG. 61, in certain embodiments, a massage system can include a belt or apron 300 having a plurality of compartments or pockets 302 for holding different components of the massage tool 100. For example, in some embodiments, the apron 300 can include a plurality of compartments 302 configured to hold one or more heads 106 for use with the massage tool 100. In some embodiments, one or more of the plurality of compartments can include indicators for identifying an associate component of the massage tool 100. In some embodiments, the one or more compartments can be shaped, sized, positioned or otherwise configured to facilitate access to one or more components of the massage tool 100 during a massage treatment procedure.

In certain embodiments, one or more pads or other extenders can be coupled with the massage tool 100 to extend a depth of the platform 120. The versatility and breadth of depth of tissue penetration using one or more pads in combination with the platform and tips allows for a customized, repeatable, and consistent treatment to each individual treatment region in a precise, controlled, safe, fast, efficient, and effective manner.

Figure 22:
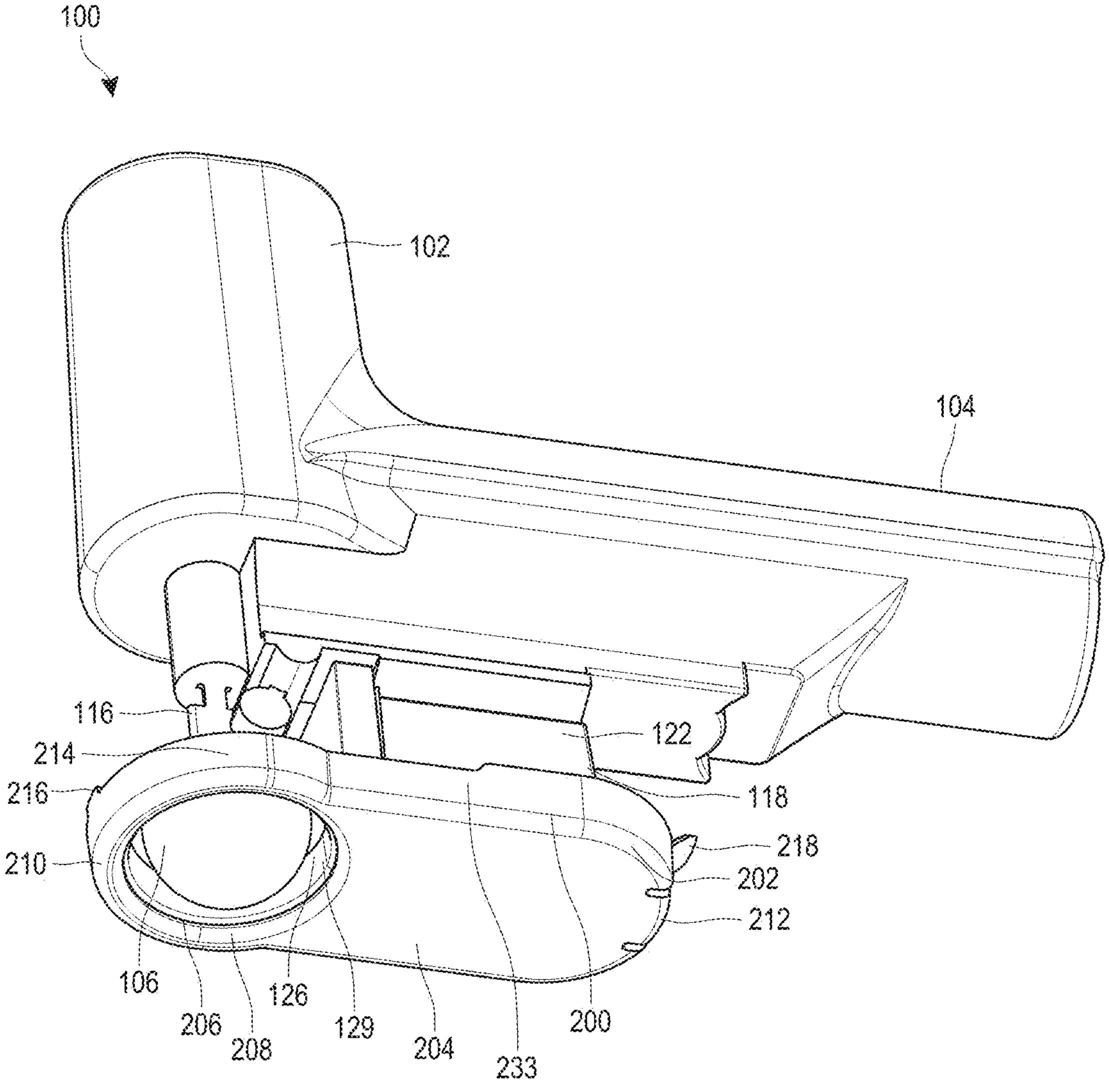
FIG. 22 illustrates a perspective view of a massage tool as shown in FIG. 1 coupled with a pad.
Figure 23:
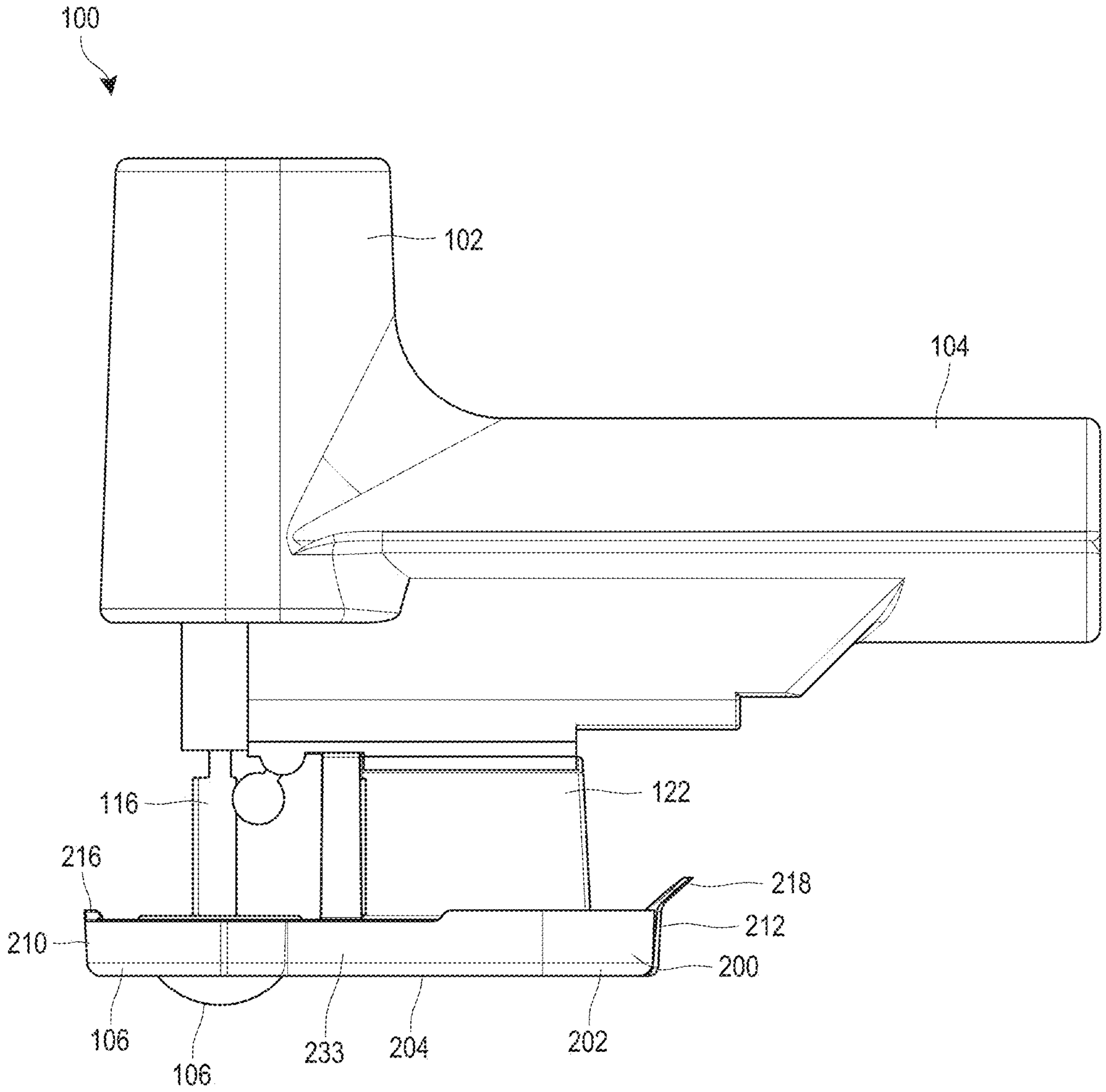
FIG. 23 illustrates a side view of a massage tool coupled with a pad as shown in FIG. 22.
Figure 24:
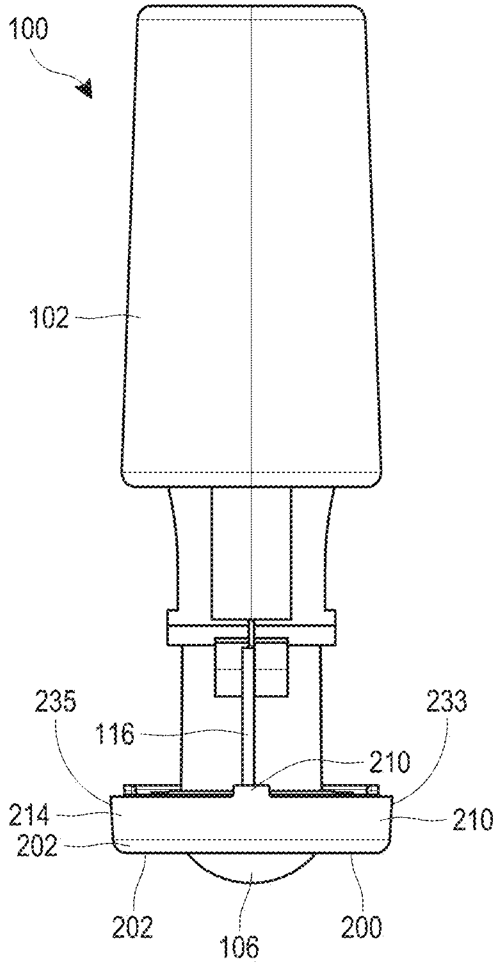
FIG. 24 illustrates a front view of a massage tool coupled with a pad as shown in FIG. 22.
Figure 25:
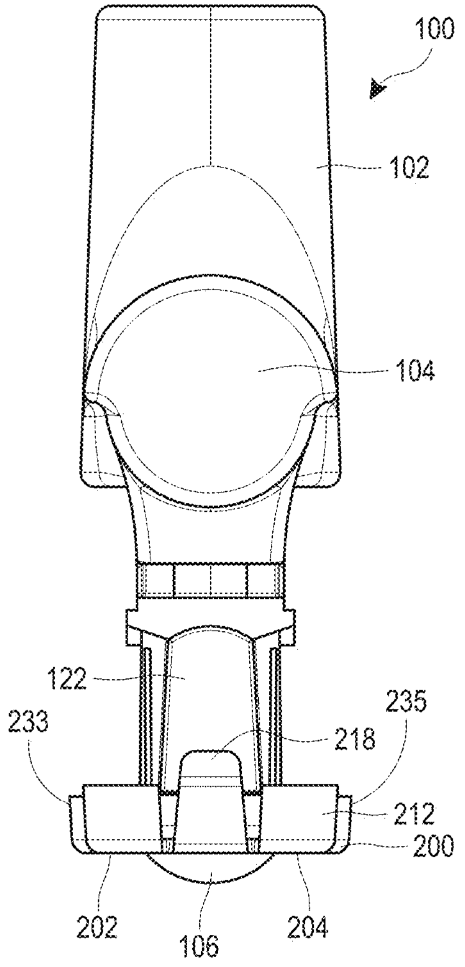
FIG. 25 illustrates a rear view of a massage tool coupled with a pad as shown in FIG. 22.
Figure 26:
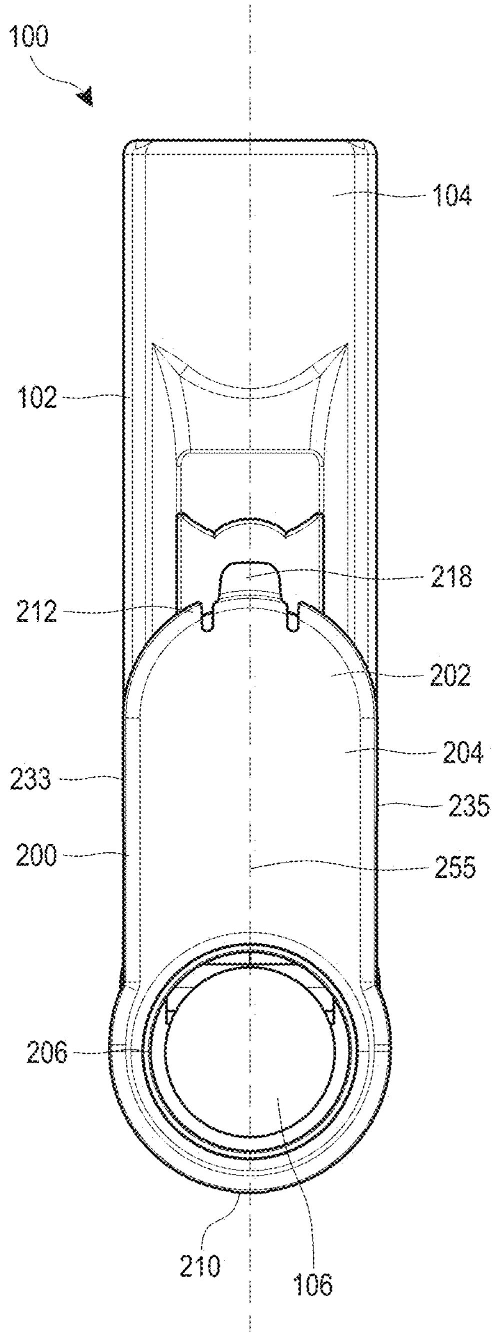
FIG. 26 illustrates a bottom view of a massage tool coupled with a pad as shown in FIG. 22.
Figure 27:
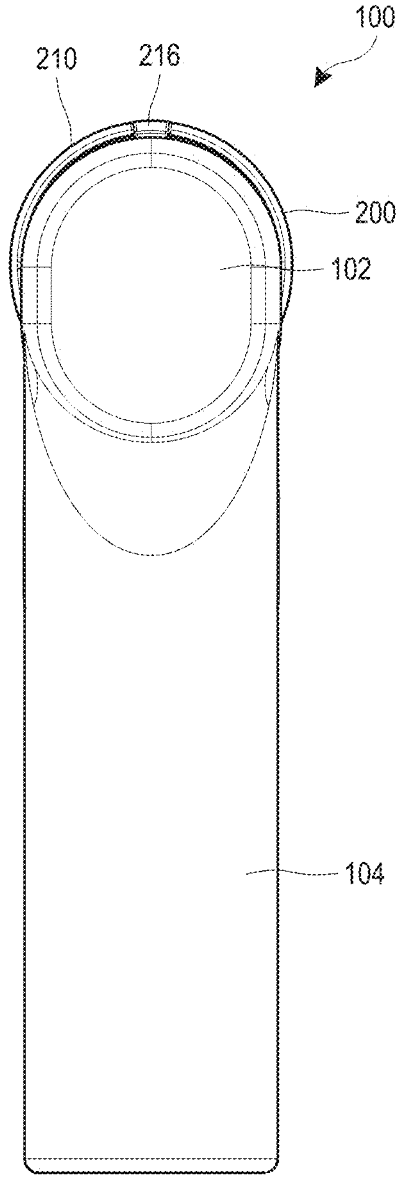
FIG. 27 illustrates a top view of a massage tool coupled with a pad as shown in FIG. 22.
Figure 28:
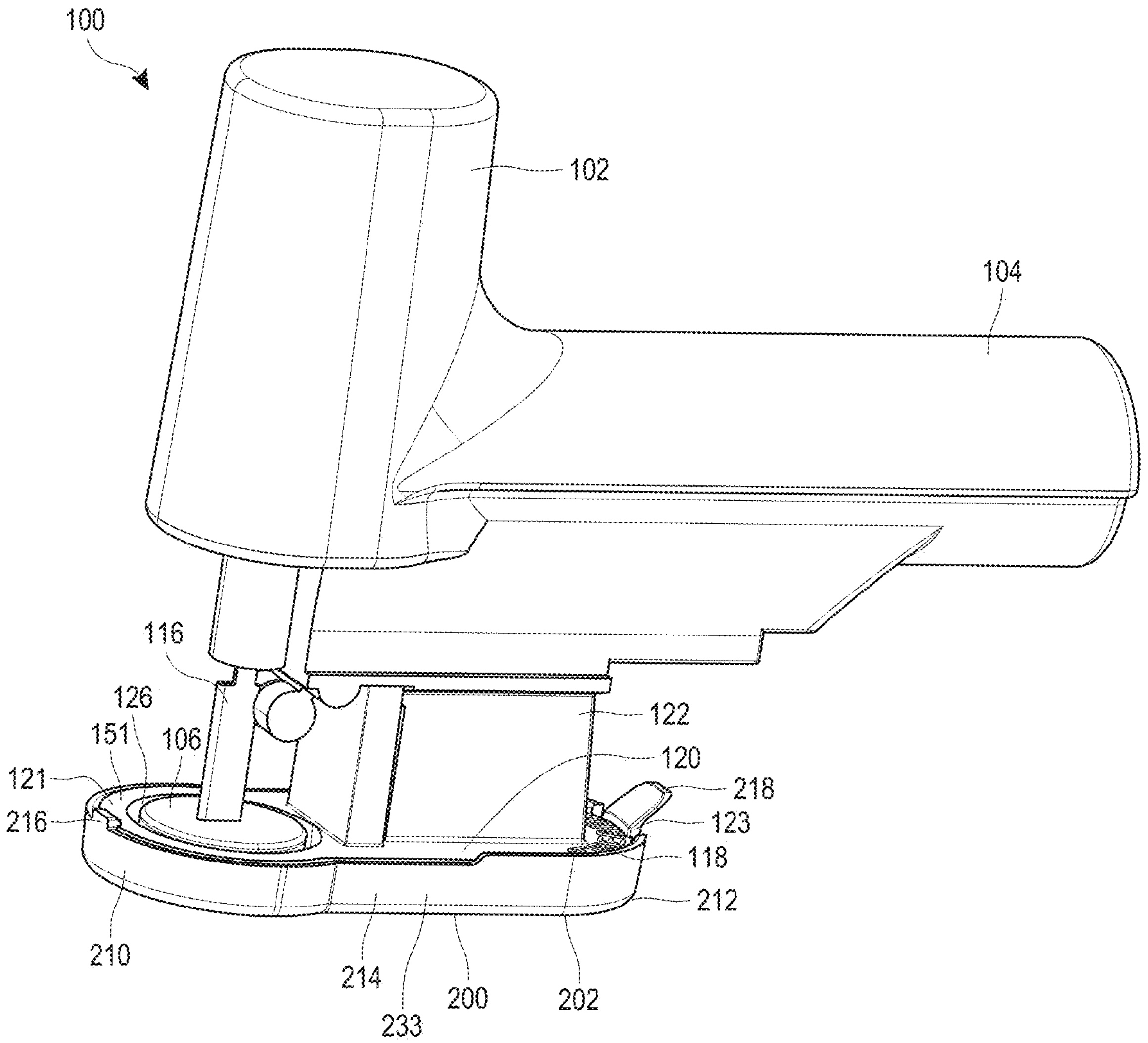
FIG. 28 illustrates a second perspective view of a massage tool coupled with a pad as shown in FIG. 22.

FIG. 22 illustrates a first perspective view of an embodiment of the massage tool 100 coupled with a pad 200. FIG. 23 illustrates a side view of the massage tool 100 coupled with the pad 200. FIG. 24 illustrates a front view of the massage tool 100 coupled with the pad 200. FIG. 25 illustrates a rear view of the massage tool 100 coupled with the pad 200. FIG. 26 illustrates a bottom view of the massage tool 100 coupled with the pad 200. FIG. 27 illustrates a top view of the massage tool 100 coupled with the pad 200. FIG. 28 illustrates a second perspective view of the massage tool 100 coupled with the pad 200.

The cover 128 is not illustrated in FIGS. 22-28 in order to illustrate interior features. However, it is contemplated that the cover 128 could be used in the embodiment shown in FIGS. 22-28 of the massage tool 100 coupled with the pad 200.

In certain embodiments, the pad 200 can be coupled to the platform assembly 118 of the massage tool 100. As shown in FIGS. 22-28, in certain embodiments, the pad 200 can be coupled to the platform 120 of the massage tool 100. In certain embodiments, when coupled to the massage tool 100, the pad 200 can add an additional depth through which the head 106 of the massage tool 100 must extend in order to contact a patient. By adding an additional depth through which the head 106 of the massage tool 100 must extend, the pad 200 can change the depth of tissue penetration by the head 106 in comparison to use of the massage tool 100 without the pad 200. In certain embodiments, the pad 200 can act to extend the depth of the platform 120 when coupled to the platform 120.

In certain embodiments, the pad 200 can include a base 202. In certain embodiments, the base 202 can include a top surface (not shown in FIGS. 22-28), a bottom surface 204, and a depth extending therebetween. In certain embodiments, the base 202 can have a uniform depth. In certain embodiments, the top surface of the base 202 is configured to receive and abut the bottom surface 124 of the platform 120. In certain embodiments, the base 202 can add an additional depth through which the head 106 of the massage tool 100 must extend in order to contact a patient when the base 202 is coupled to the platform 120. By adding an additional depth through which the head 106 of the massage tool 100 must extend, the base 202 can change the depth of tissue penetration by the head 106 in comparison to use of the massage tool 100 without the pad 200. In certain embodiments, the base 202 can act to extend the depth of the platform 120 when coupled to the platform 120. For example, when coupled to the platform 120, the depth of the base 202 and the depth of the platform 120 can create a combined depth through which the massage head 106 extends.

In certain embodiments, the bottom surface 204 can be flat or generally flat. When coupled to the platform 120, the bottom surface 204 can be positioned to contact a treatment area of a patient during a massage treatment procedure. In certain embodiments, the pad 200 and/or platform 120 can provide stability during a treatment procedure while the massage tool 100 is moved about the treatment region while in contact with the treatment region.

In certain embodiments, the pad 200 can include an opening 206. The opening 206 can be defined by an interior surface 208 of the pad 200. In certain embodiments, the opening can be round, ellipsoid, triangular, square, rectangular, polygonal, or any other suitable shape. In certain embodiments, the opening 206 can be sized, shaped, positioned, and/or otherwise configured to align with the opening 126 of the platform 120. In certain embodiments, the opening 206 can be sized and/or shaped to match the size and/or shape of the opening 126. In certain embodiments, when the massage head 106 is coupled to the body 102 and the pad 200 is coupled to the platform 120, the massage head 106 can align with the opening 206.

In certain embodiments, the massage head 106 can be positioned so that, while undergoing reciprocating motion, the massage head 106 can be at least partially recessed within the platform 120 of the massage tool 100 in a first position. In certain embodiments, the massage head 106 can be positioned so that, while undergoing reciprocating motion, the massage head 106 can extend from the first position at least partially out of the opening 126 of the platform 120 and at least partially out of the opening 206 of the pad 200 to a second position to contact a treatment region of the patient. In certain embodiments, the massage head 106 can be positioned so that, while undergoing reciprocating motion, the contact portion 108 can be at least partially recessed within the platform 120 of the massage tool 100 in a first position. In certain embodiments, contact portion 108 can be positioned so that, while undergoing reciprocating motion, the massage head 106 can extend from the first position at least partially out of the opening 126 of the platform 120 and at least partially out of the opening 206 of the pad 200 to a second position to contact a treatment region of the patient.

In certain embodiments, in use, the massage tool 100 can be positioned so that the pad 200 contacts a patient near or at a treatment region of the patient. In certain embodiments, the massage tool 100 can be activated so that the massage head 106 undergoes reciprocating motion to repeatedly extend at least partially out of the opening 206 of the pad 200 to contact the treatment region of a patient and retract at least partially back through the opening 206. In certain embodiments, the massage tool 100 can be activated so that the massage head 106 undergoes reciprocating motion to repeatedly extend at least partially out of the opening 206 of the pad 200 to contact the treatment region of a patient and retract at least partially back through the opening 206 to provide a percussive massage to the treatment region of the patient. In certain embodiments, the massage head 106 can undergo reciprocating motion along an axis that perpendicularly intersects a longitudinal midline 255 of the pad 200, as shown in FIG. 26. In certain embodiments, the longitudinal midline 255 of the pad 200 is aligned with the longitudinal midline 155 of the platform 120.

As shown in FIGS. 31, 33, 39, 41, 47, 49, 55, and 57, in certain embodiments, the pad 200 can have a height H2, a width W2, and a length L2. In certain embodiments, heights H2, width W2, and/or length L2 can vary at different portions of the pad 200. In certain embodiments, the pad 200 can have a profile shaped to fit a particular shape or use. In certain embodiments, the pad 200 can be contoured or can include a shaped profile for use in treatment procedures for specific body areas. In certain embodiments, the pad 200 can be shaped and/or dimensioned to conform with the shapes and/or dimensions of the platform 120.

In certain embodiments, the pad 200 can be shaped, sized, or otherwise configured to prevent the massage tool from tipping or rotating in forward and/or rearward directions. In certain embodiments, the pad 200 can be shaped, sized or otherwise configured such that a center of gravity of the massage tool 100 is positioned over the pad 200. In certain embodiments, the pad 200 can have an elongated shape to prevent rotating or tipping of the massage tool 100 in the forward and/or rearward directions.

In certain embodiments, the pad 200 can be rectangular or generally rectangular. In certain embodiments, the pad 200 can include rounded edges. In certain embodiments, the pad 200 can be oval or generally oval. In certain embodiments, the pad 200 can be circular or generally circular. In some embodiments, a circular pad 200 may be used to treat an acute condition that requires precise and delicate treatment.

In certain embodiments, the pad 200 can be removable and replaceable with a second pad 200 having a different shape or size. In certain embodiments, a plurality of interchangeable pads 200, having different shapes and/or sizes, can be used with the massage tool 100 to treat different treatment areas or to perform different treatment procedures at a treatment area. For example, in certain embodiments, a plurality of pads 200 having different depths of the base can be used with the massage tool 100. Pads 200 having different depths of the base 202 can provide different depths of tissue penetration by the head 106 of the massage tool 100.

In certain embodiments, a depth of the base 202 of the pad 200 can be between 0.0625 inches to 1 inch, between 0.0625 inches to 0.25 inches, between 0.125 inches to 0.375 inches, between 0.25 inches to 0.5 inches, between 0.375 inches to 0.625 inches, between 0.125 inches to 0.5 inches, between 0.5 inches to 1.0 inches, or any other suitable range. In some embodiments, the depth of the base can be 0.625 inches, 0.125 inches, 0.25 inches, 0.375 inches, 0.5 inches, 0.625 inches, 0.75 inches, 0.875 inches, 1.0 inches, or any other suitable depth or range of suitable depths extending between any of the aforementioned values.

In certain embodiments, a length L2 of the pad 200 can be generally the same or similar as the length 1.2 of the platform 120, For example, in certain embodiments, the length L2 of the pad 200 can be between 3 inches to 7 inches, between 3.5 inches to 6.5 inches, between 4 inches to 6 inches, between 4.5 inches to 5.5 inches, between 7 inches to 10 inches, or any other suitable range. In certain embodiments, the length L2 of the pad 200 can be 3.0 inches, about 3.0 inches, 3.5 inches, about 3.5 inches, 4.0 inches, about 4.0 inches, 4.5 inches, about 4.5 inches, 5.0 inches, about 5.0 inches, 5.2 inches, about 5.2 inches, 5.4 inches, about 5.4 inches, 5.5 inches, about 5.5 inches, 5.6 inches, about 5.6 inches, 5.8 inches, about 5.8 inches, 6.0 inches, about 6.0 inches, 6.5 inches, about 6.5 inches, 7.0 inches, about 7.0 inches, 8.0 inches, about 8.0 inches, 9.0 inches, about 9.0 inches, 10.0 inches, about 10.0 inches, 11.0 inches, about 11.0 inches, 12.0 inches, about 12.0 inches, or any other suitable length. In certain embodiments, a length L2 of the pad 200 is sized to prevent the massage tool from tipping or rotating in forward and/or rearward directions. In certain embodiments, the length L2 of the pad 200 can be sized so that the center of gravity of the massage tool 100 is positioned over the pad 200. In certain embodiments, a pad 200 that prevents tipping or rotation can facilitate smoother movement across the treatment area.

In certain embodiments, a thickness of the pad 200 adjacent the opening 206 can be generally the same or similar as the thickness of the platform 120 adjacent the opening 126. In certain embodiments, the thickness of the pad 200 adjacent the opening 206 can be between 0.125 inches to 1.75 inches, between 0.25 inches to 1.5 inches, between 0.25 inches to 1.0 inch, between 0.25 inches to 0.75 inches, between 0.25 inches to 0.5 inches, between 0.5 inches to 1.5 inches, between 0.5 inches to 1.0 inch, between 0.5 inches to 0.75 inches, or any other suitable thickness. In certain embodiments, a thickness of the pad 200 can be 0.125 inches, about 0.125 inches, 0.25 inches, about 0.25 inches, 0.375 inches, about 0.375 inches, 0.5 inches, about 0.5 inches, 0.625 inches, about 0.625 inches, 0.75 inches, about 0.75 inches, 1.0 inch, about 1.0 inch, 1.25 inches, about 1.25 inches, 1.5 inches, about 1.5 inches, or any other suitable thickness.

In certain embodiments, a width W2 of the pad 200 can be generally the same or similar as the width W2 of the platform 120. In certain embodiments, the width W2 of the pad 200 can be between 0.25 inches to 8.0 inches, between 0.5 inches to 7.0 inches, between 0.75 inches to 6 inches, between 1.0 inch to 5 inches, between 1.5 inches to 4 inches, between 2 inches to 3 inches, or any other suitable range. In some embodiments, the width W2 of the pad 200 can be 0.25 inches, about 0.25 inches, 0.5 inches, about 0.5 inches, 0.75 inches, about 0.75 inches, 1.0 inch, about 1.0 inch, 1.25 inches, about 1.25 inches, 1.5 inches, about 1.5 inches, 1.75 inches, about 1.75 inches, 2.0 inches, about 2.0 inches, 2.25 inches, about 2.25 inches, 2.5 inches, about 2.5 inches, 2.75 inches, about 2.75 inches, 3.0 inches, about 3.0 inches, 3.25 inches, about 3.25 inches, 3.5 inches, about 3.5 inches, 3.75 inches, about 3.75 inches, 4.0 inches, about 4.0 inches, 4.25 inches, about 4.25 inches 4.5 inches, about 4.5 inches, 4.75 inches, about 4.75 inches, 5.0 inches, about 5.0 inches, 5.25 inches, about 5.25 inches, 5.5 inches, about 5.5 inches, 5.75 inches, about 5.75 inches, 6.0 inches, about 6.0 inches, 6.5 inches, about 6.5 inches, 7.0 inches, about 7.0 inches, 8.0 inches, about 8.0 inches, or any other suitable width. In certain embodiments, the width W2 of the pad 200 can be sized to provide for stability of the platform 120 relative to the treatment region. In certain embodiments the width W2 of the pad 200 can be sufficiently narrow to allow for alignment with treatment regions of the patient and/or movement about the contours of the body of the patient. In certain embodiments, the width W2 of the pad 200 is sized to prevent tipping or rotation of the pad 200 in the lateral directions. In certain embodiments, the width W2 of the pad 200 is sized such that the center of gravity of the massage tool 100 is positioned over the pad 200.

In certain embodiments, the pad 200 may be removable and/or replaceable. In certain embodiments, a plurality of pads 200 can have a plurality of different widths W2. A pad 200 can be selected based on the size of the treatment region, the type of treatment being provided, and the body type of the patient. For example, in certain embodiments, a pad 200 having a relatively narrow width W2 may be used for small treatment regions, highly contoured treatment regions, or less defined body types.

In certain embodiments, a front end 210 of the pad 200 can be sized and/or shaped to differ from a rear end 212 of the pad 200, The different shape of the end 210 can provide an indication of the location of the massage head 106. In certain embodiments, the end 210 of the pad 200 can be generally circular or semicircular. In certain embodiments, a diameter of a portion of the pad 200 surrounding the opening 206 measured between the side surfaces of the portion of the pad 200 surrounding the opening 206 can be 1.0 inch, about 1.0 inch, 1.2 inches, about 1.2 inches, 1.4 inches, about 1.4 inches, 1.8 inches, about 1.8 inches, 2.0 inches, about 2.0 inches, 2.2 inches, about 2.2 inches, 2.4 inches, about 2.4 inches, 2.6 inches, about 2.6 inches, 2.8 inches, about 2.8 inches, 3.0 inches, about 3.0 inches, 3.2 inches, about 3.2 inches, 3.4 inches, about 3.4 inches, or any other suitable diameter. In certain embodiments, the diameter of the portion of the pad 200 surrounding the opening 206 measured between the side surfaces of the portion of the pad 200 surrounding the opening 206 can be between 1 inch to 3.4 inches, between 1.4 inches to 3.0 inches, between 1.8 inches and 2.6 inches, between 2.0 inches and 2.4 inches, or any other suitable range.

In certain embodiments, the end 210 of the pad 200 can be dimensioned, shaped, positioned, or otherwise configured to prevent contact between the connector 116 and the treatment region while the massage tool 100 is positioned in a stationary position on the treatment region. In certain embodiments, the end 210 of the pad 200 may be dimensioned, shaped, positioned, or otherwise configured to prevent contact between the connector 116 and the treatment region while the massage tool 100 is moved about the treatment region. For example, the end 210 can be dimensioned, shaped, positioned, or otherwise configured to prevent the massage tool from tipping or rotating in a forward direction while the massage tool is moved about the treatment region. In certain embodiments, an edge of the pad 200 can extend around the massage head 106 and connector 116 to prevent contact between the connector 116 and the treatment region during movement of the pad 200 across the surface of the treatment region.

In certain embodiments, the pad 200 can have a different width at a section of the pad 200 surrounding the opening 206. In certain embodiments, the pad 200 can have a larger width surrounding the opening 206 than a width of the pad 200 at a section rearward from the opening 206 between the opening 206 and the end 212. For example, in certain embodiments, a diameter of the portion of the pad 200 defining the opening 206 can be 2.2 inches or about 2.2 inches and a width of the pad 200 at a section rearward from the opening 206 can be 2.0 inches or about 2.0 inches. In certain embodiments, a ratio between the width of the section of the pad 200 rearward from the opening 206 and a maximum diameter of the massage head 106 can be 1:4, 1:3, 1:2, 1:1, 2:1, 3:1, 4:1, 5:1, 6:1 or any other suitable ratio.

In certain embodiments, the pad 200 can surround the massage head 106 in at least one dimension. In certain embodiments, in use, the pad 200 can enclose the massage head 106 and connector 116 at an interface between the pad 200 and the treatment region. In certain embodiments, in use, the pad 200 can enclose the massage head 106 and connector 116 at an interface between the pad 200 and the treatment region so that a maximum depth that the massage head 106 will extend beyond the bottom surface 204 of the pad 200 is fixed for any application angle to the treatment region. In certain embodiments, if the bottom surface 204 is held parallel to the treatment region, a depth that the massage head will extend beyond into the treatment region is predetermined and repeatable. In certain embodiments, a position of the pad 200 relative to the platform 120 and/or the massage head 106 can be adjusted to adjust a depth that the massage head 106 will extend beyond the bottom surface 204. In certain embodiments, a plurality of pads 200 having different depths can be removably attached to the platform 120 to adjust a depth that the massage head 106 will extend beyond the bottom surface 204 of the pad 200.

In certain embodiments, the massage tool 100 can be manipulated so that the pad 200 moves along the body of the patient while the massage head 106 undergoes reciprocating motion. In certain embodiments, the handle 104 of the massage tool 100 can be manipulated so that the pad 200 moves along the body of the patient while the massage head 106 undergoes reciprocating motion.

As described herein, in certain embodiments, the pad 200 can include a surface 204 positioned to contact a treatment area of a patient during a massage treatment procedure. In certain embodiments, the pad 200 can provide stability during a treatment procedure while the massage tool 100 is moved about the treatment region while in contact with the treatment region.

As described herein, in certain embodiments, the opening 206 can be positioned laterally within an interior section of the pad 200 such that the pad 200 can laterally extend around the opening 206 on all sides. By surrounding the opening 206, the pad 200 can at least partially control the interaction of the massage head 106 with a treatment region of the patient. The depth of the base 202 of the pad 200 can at least partially define a depth of tissue penetration of the massage head 106 at a treatment region of a patient. A width W2 of the pad 200 can affect positioning of the massage tool 100 within certain body areas. A length L2 of the pad 200 can affect the maneuverability and stability of the massage tool 100 over the treatment region of a patient. A length of the pad 200 in front of the opening 206 can add stability and at least partially control an angle of treatment by the massage tool 100 by preventing or restricting forward tipping or rotation of the massage tool 100. A length of the pad 200 behind the opening 206 can add stability and at least partially control an angle of treatment by the massage tool 100 by preventing or restricting backward tipping or rotation of the massage tool 100. In certain embodiments, the foregoing features of the massage tool 100 can provide for repeatability and consistency of a massage treatment over a treatment area. By controlling features such as depth of penetration, angle of treatment, and stability, the platform 120 can also provide for a safer massage treatment. By surrounding the massage head 106, the pad 200 can also protect the massage head 106 and/or the connector 116 from deflection or limit exposure to forces that can cause deflection resulting from contacting the massage head 106 and/or the connector 116.

In certain embodiments, the pad 200 can include one or more coupling features, such as loops, hooks, snaps, or any other suitable features for coupling to the platform 120. As shown in FIGS. 22-28, in certain embodiments, the pad 200 can include one or more side walls 214 extending from the base 202. In some embodiments, the side walls 214 can extend around the exterior edges of the platform 120. In certain embodiments the pad 200 can couple to the platform 120 through an interference fit between the side walls 214 and the platform 120. In some embodiments, the side walls 214 can define the front end 210 and the rear end 212. In certain embodiments, the side walls 214 can define a first side surface 233 and a second side surface 235.

In certain embodiments, a portion of the bottom surface 204 can define an elongate flat surface 225 extending between the opening 206 and the rear end of the pad 212. In certain embodiments, a length of the elongate flat surface 225 extends between the opening 206 and the rear end of the pad 212, and a width of the elongate flat surface 225 extends between the first side surface 233 and the second side surface 235. In certain embodiments, the length of the elongate flat surface 225 can be greater than the width of the elongate flat surface 225, In certain embodiments, the elongate flat surface 225 can provide stability during a treatment procedure while the massage tool 100 is moved about the treatment region while in contact with the treatment region, in certain embodiments, the elongate flat surface 225 can add stability and at least partially control an angle of treatment by the massage tool 100 by preventing or restricting backward tipping or rotation of the massage tool 100.

In certain embodiments, the pad 200 can include a hook 216. In certain embodiments, the hook 216 can extend from a section of the one or more sidewalls 214. In certain embodiments, the hook 216 can extend from the front 210 of the pad 200. In certain embodiments, the hook 216 can be positioned over a top surface 151 of the platform 120 at the front end 121 of the platform 120 to at least partially couple the pad 200 to the platform 120.

In certain embodiments, the pad 200 can include a tab 218. In certain embodiments, the tab 218 can extend from the base 202. In certain embodiments, the tab 218 can be positioned at the rear end 212 of the pad 200. In certain embodiments the tab 218 can be configured to releasably engage the top surface 151 of the platform 120 at the rear end 123 of the platform 120. In certain embodiments, the pad 200 can be releasably coupled to the platform 120 by placing the front end 210 of the pad 200 over the platform 120 so that the hook 216 is positioned over the top surface 151 and then positioning the rear end 112 of the pad 200 over the platform 120 so that the tab 218 snaps into place over the top surface 151 of the platform 120. The pad 200 can be released and disengaged from the platform 120 by pulling or pressing on the tab 218 so as to withdraw the portion of the tab 218 positioned over the top surface 151 of the platform 120.

In certain embodiments, the pad 200 can be coupled to the platform 120 and/or disengaged from the platform 120 during a treatment procedure. In certain embodiments, the pad 200 can be coupled to the platform 120 and/or disengaged from the platform 120 without turning off the massage tool 100. In certain embodiments, the pad 200 can be coupled to the platform 120 and/or disengaged from the platform 120 while the head 106 is undergoing reciprocator motion.

For example, in certain embodiments, a treatment procedure can be initiated with the bottom surface 124 of the platform 120 placed against the treatment region without the pad 200 coupled to the platform 120. Without the pad 200 coupled to the platform 120, the depth that the head 106 extends beyond the bottom surface 124 of the platform 120, and consequently the depth of tissue penetration, is at least partially defined by a depth of the platform 120 and/or a position of the bottom surface 124 of the platform relative to the massage head 106. In certain embodiments, the pad 200 can be coupled to the platform 120 during the treatment procedure to reduce the depth of tissue penetration of the head 106 when the head 106 is applied to the treatment region with the pad 200 placed against the treatment region. When the pad 200 is attached to the platform 200, the depth of penetration is additionally partially defined by the depth of the base 202. In certain embodiments, when the pad 200 is coupled to the platform 120 the depth of tissue penetration can be reduced by the same amount as the depth of the base 202 of the pad 200 in comparison to treatment when the pad is not coupled to the platform 120. Similarly, in certain embodiments, treatment can be initiated with the pad 200 coupled to the platform 120, and the depth of tissue penetration can be increased by removing the pad 200 and applying the bottom surface 124 of the platform 120 directly to the treatment region.

In certain embodiments, the pad 200 or at least a portion of the pad 200 can be transparent or at least partially transparent to facilitate visualization of the treatment area through the pad 200 or portion of the pad 200. In certain embodiments, the pad 200 or at least a portion of the pad 200 is formed of a plastic. In certain embodiments, the pad 200 or at least a portion of the pad 200 is formed of a transparent plastic or at least partially transparent plastic. In certain embodiments, the pad 200 is formed by an injection molding process.

As described herein, in certain embodiments, a massage tool system can include a plurality of pads 200. In certain embodiments, a plurality of pads 200 can be provided having bases 202 having different depths. For example, in certain embodiments, a first pad 200 can have a base 202 having a depth of 0.125 inches, a second pad 200 can have a base 202 having a depth of 0.25 inches, a third pad 200 can have a base 202 having a depth of 0.375 inches, and a fourth pad 200 can have a base 202 having a depth of 0.5 inches. In certain embodiments, one of the pads 200 can be removed and replaced with another of the pads 200 to change the depth of tissue penetration or removed without replacement so that the bottom surface of the platform can be positioned against the treatment region to change the depth of tissue penetration. In certain embodiments, the first pad, second pad, third pad, fourth pad, and platform alone can collectively allow for five different depths of tissue penetration.

In certain embodiments, one or more pads 200 can be used to change the depth of tissue penetration instead of interchanging different heads 106 of the massage tool 100. Using one or more pads 200 can be performed without stopping reciprocation of the head 106. In certain embodiments, one or more pads 200 can be used in combination with a plurality of heads 106 of different sizes to facilitate a variety of different depths of tissue penetration. The ability to quickly and finely control the depth of tissue penetration in a consistent and repeatable manner for use over what may be a large patient treatment area significantly improves treatment effectiveness and patient health and recovery time. The flexibility in treatment procedures provided by having many unique combinations of the platform, pad, and tip configurations provides many advantages to the user over known massage systems, including at least improved stability, repeatability, consistency, accuracy, precision, efficiency, flexibility, comfort, recovery, and healing. The ability to quickly and easily interchange pads and/or tips during treatment improves efficiency and precision control to accurately and precisely tailor the treatment and provide a consistently precise massage application over the treatment area. In some embodiments, other spacers can be used to adjust and precisely control tissue penetration depth and desired angle of penetration. The platform, connector, massage head, pad, and/or spacer configurations can be adjusted by the user to work in conjunction with the massage tool to provide different, but repeatable and consistent, treatments to the treatment region. That versatility to the breadth of depth and diameter of tissue penetration allows for a customized, repeatable, and consistent treatment to each individual treatment region.

Figure 29:
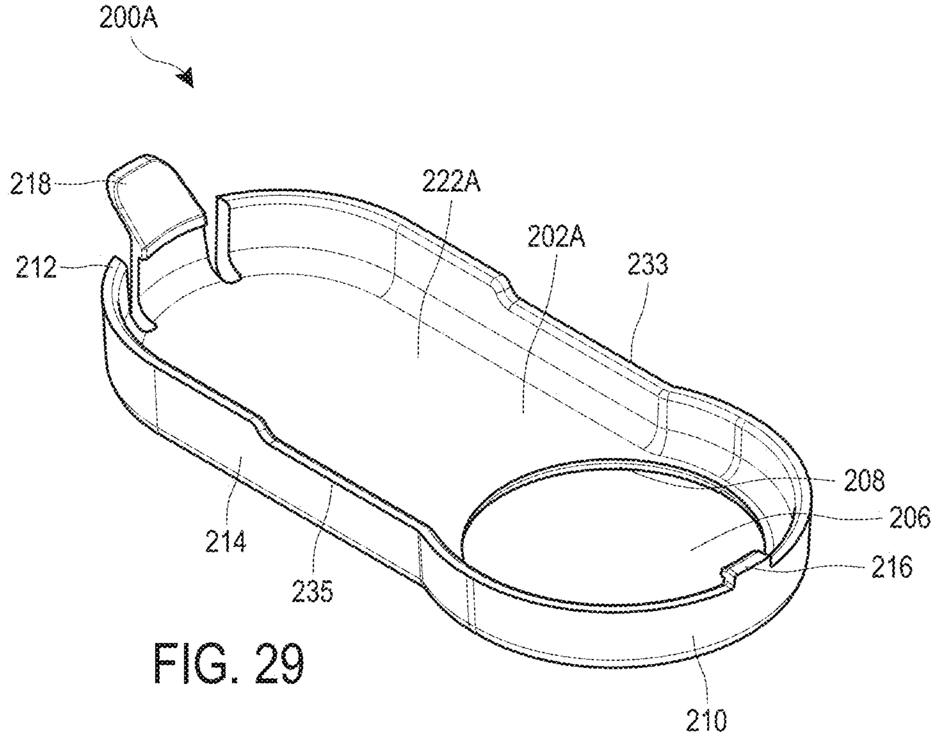
FIG. 29 illustrates a perspective view of an embodiment of a pad of a massage tool.
Figure 30:
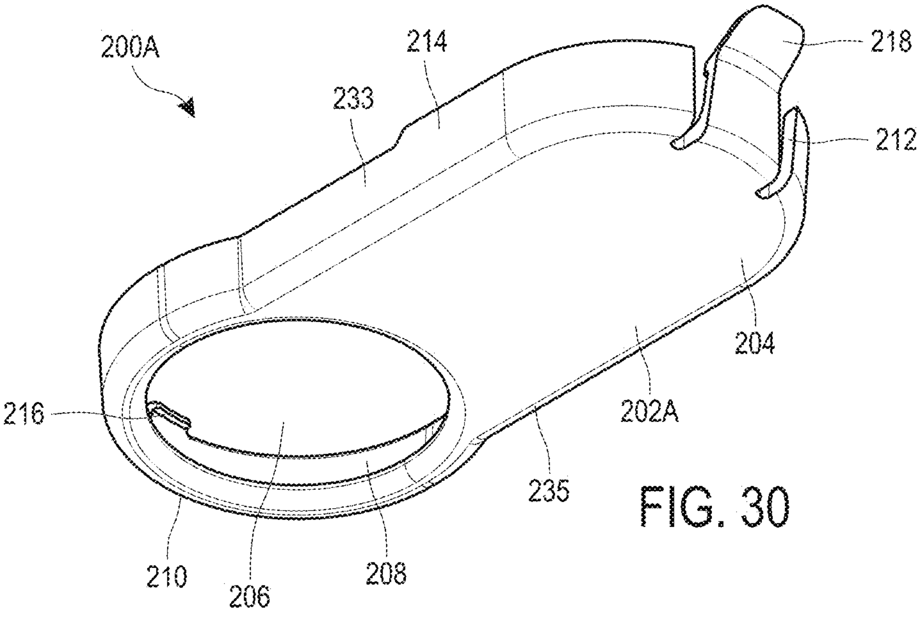
FIG. 30 illustrates a perspective view of a pad of a massage tool as shown in FIG. 29.
Figure 31:
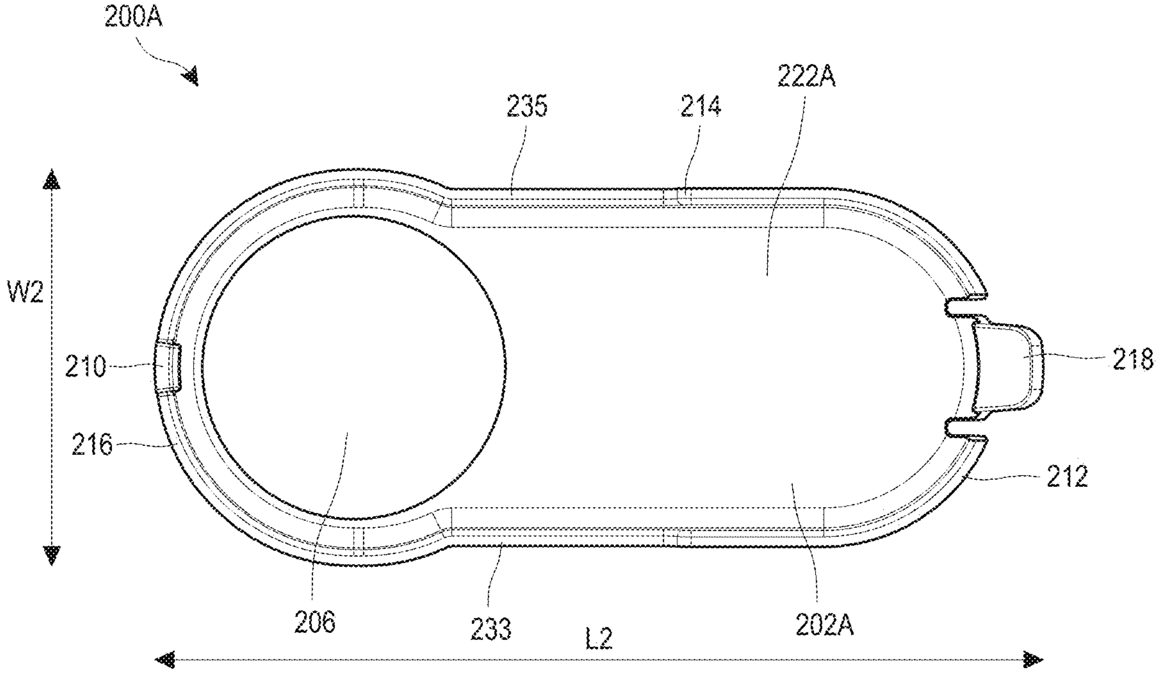
FIG. 31 illustrates a top view of a pad of a massage tool as shown in FIG. 22.
Figure 32:
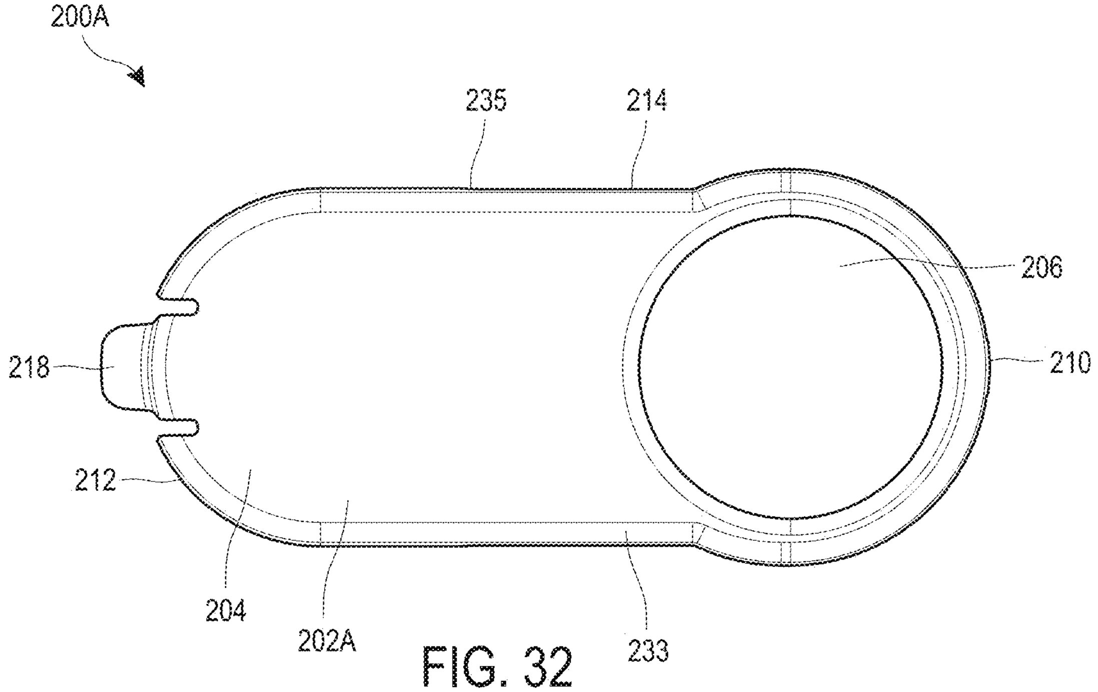
FIG. 32 illustrates a bottom view of a pad of a massage tool as shown in FIG. 29.
Figure 33:
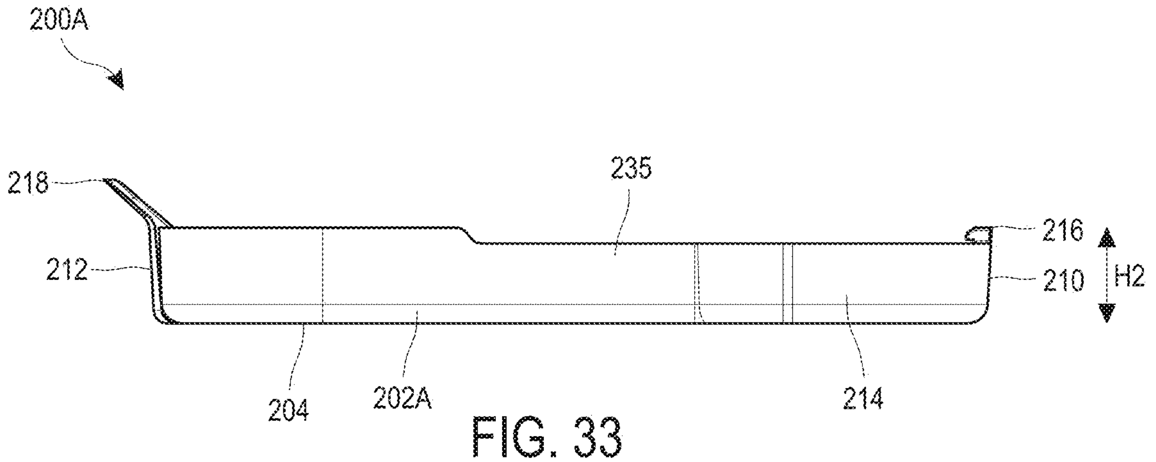
FIG. 33 illustrates a first side view of a pad of a massage tool as shown in FIG. 29.
Figure 34:
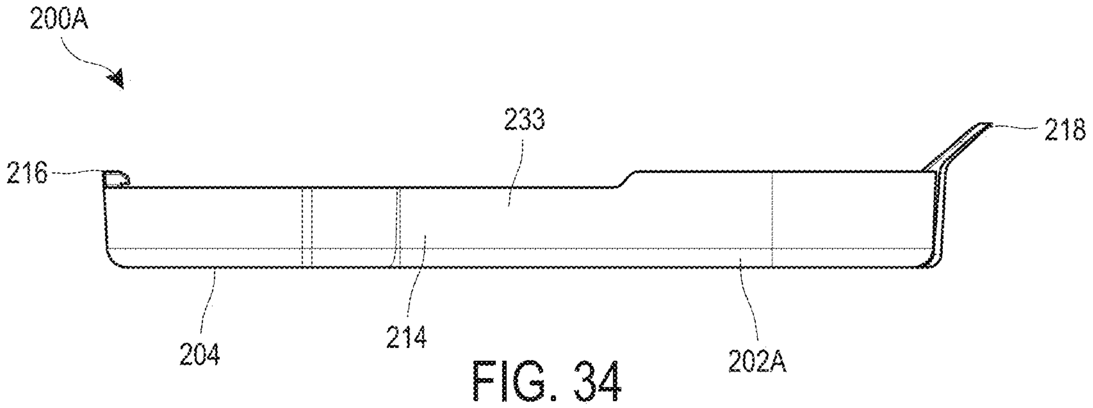
FIG. 34 illustrates a second side view of a pad of a massage tool as shown in FIG. 29.
Figure 35:
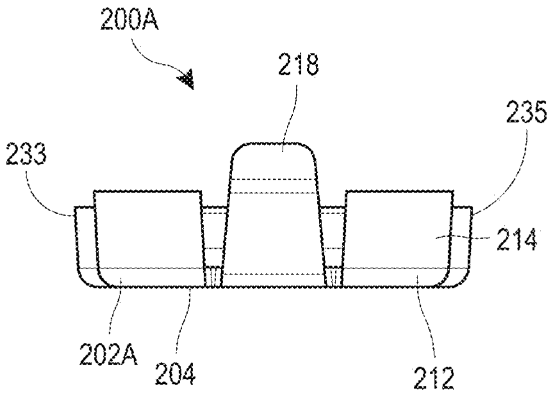
FIG. 35 illustrates a rear view of a pad of a massage tool as shown in FIG. 29.
Figure 36:
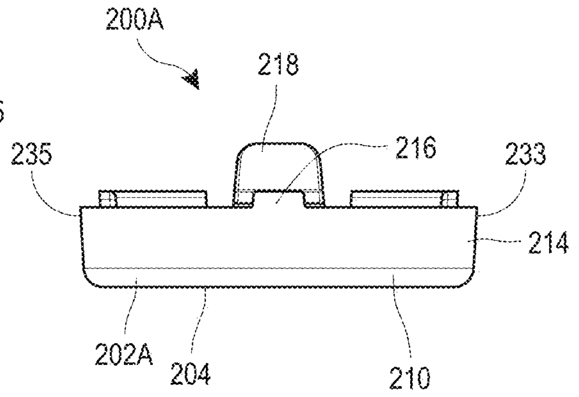
FIG. 36 illustrates a front view of a pad of a massage tool as shown in FIG. 29.

FIG. 29 illustrates a first perspective view of an embodiment of a pad 200A. FIG. 30 illustrates a second perspective view of the pad 200A. FIG. 31 illustrates a top view of the pad 200A. FIG. 32 illustrates a bottom view of the pad 200A. FIG. 33 illustrates a first side view of the pad 200A. FIG. 34 illustrates a second side view of the pad 200A. FIG. 35 illustrates a rear view of the pad 200A, FIG. 36 illustrates a front view of the pad 200A.

The pad 200A can include any of the same or similar features or functions as the pad 200. As shown in FIGS. 29-36, the pad 200A can include a base 202A having bottom surface 204, a top surface 222A, and a depth extending therebetween. The top surface 222A can be sized, shaped, and/or otherwise configured to receive the bottom surface 124 of the platform 120.

Figure 37:
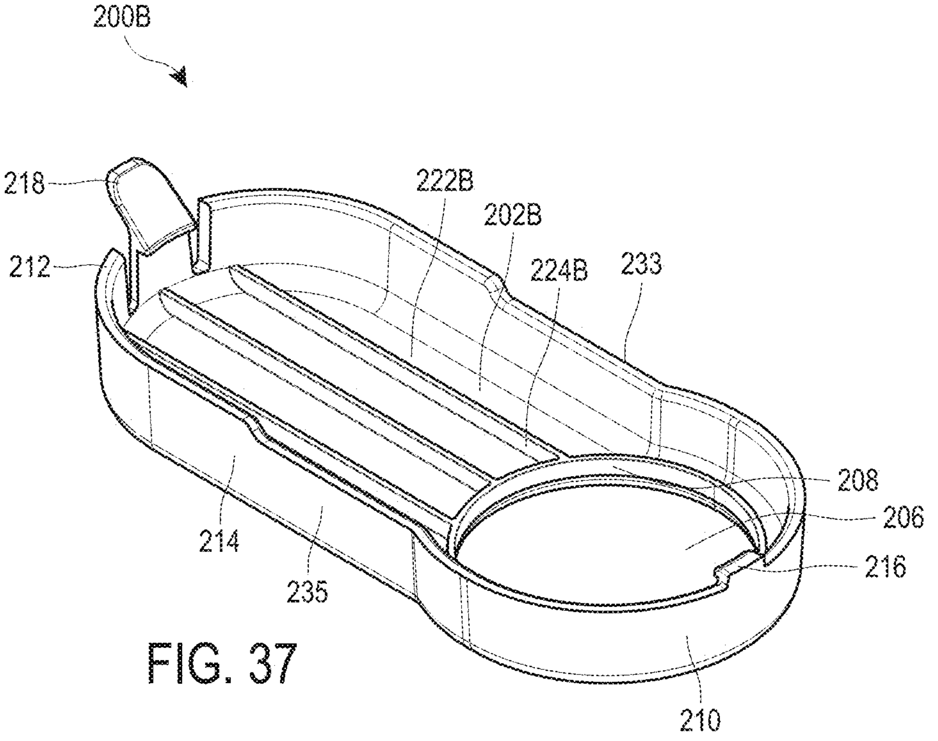
FIG. 37 illustrates a perspective view of an embodiment of a pad of a massage tool.
Figure 38:
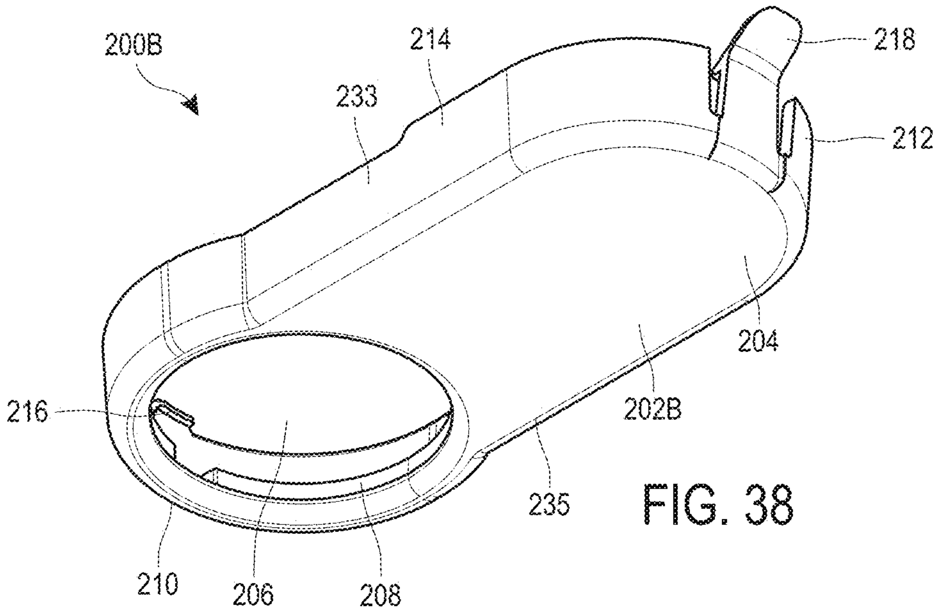
FIG. 38 illustrates a perspective view of a pad of a massage tool as shown in FIG. 37.
Figure 39:
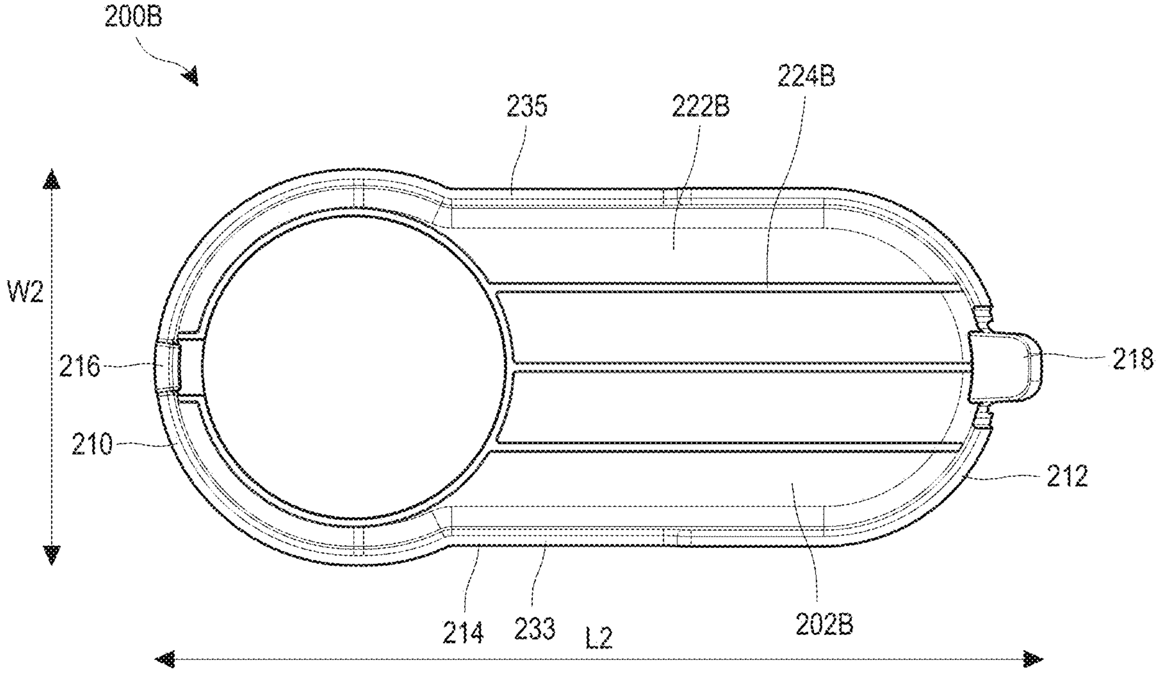
FIG. 39 illustrates a top view of a pad of a massage tool as shower FIG. 37.
Figure 40:
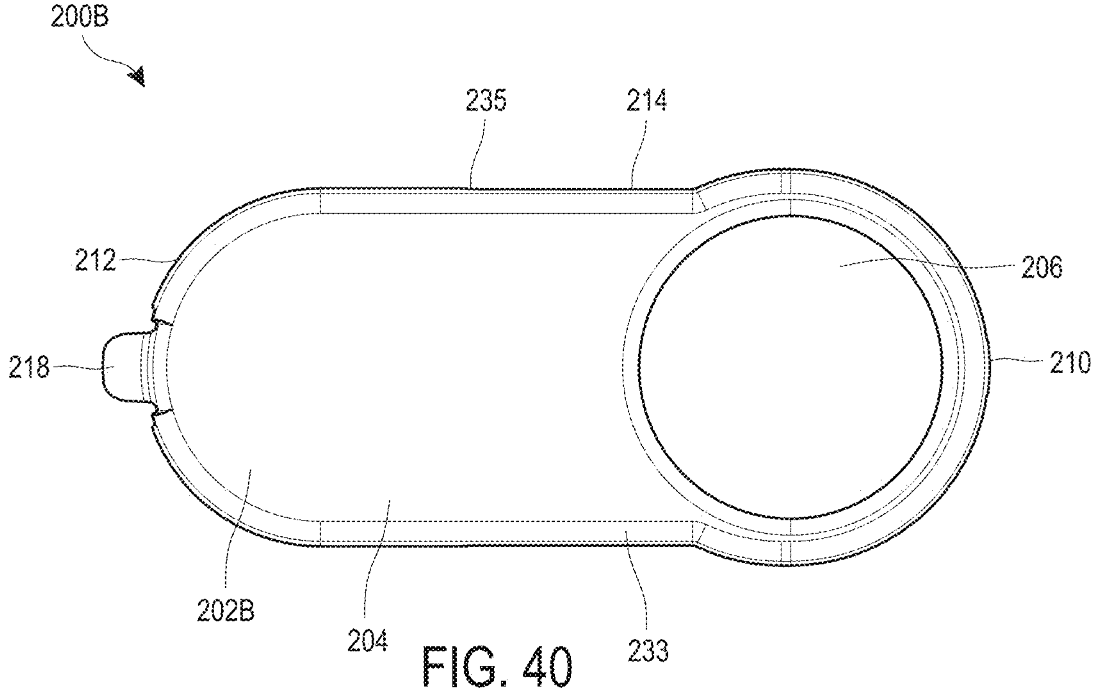
FIG. 40 illustrates a bottom view of a pad of a massage tool as shown in FIG. 37.
Figure 41:
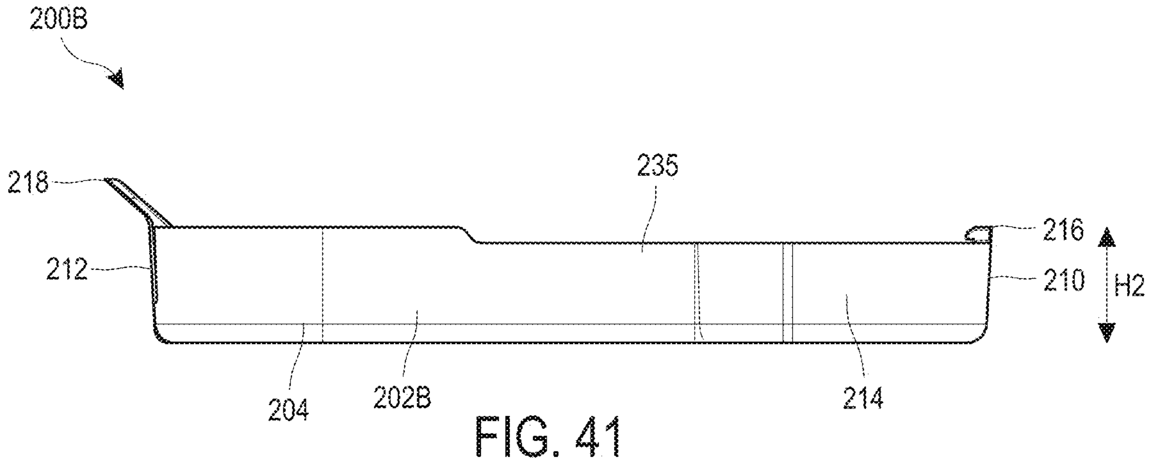
FIG. 41 illustrates a first side view of a pad of a massage tool as shown in FIG. 37.
Figure 42:
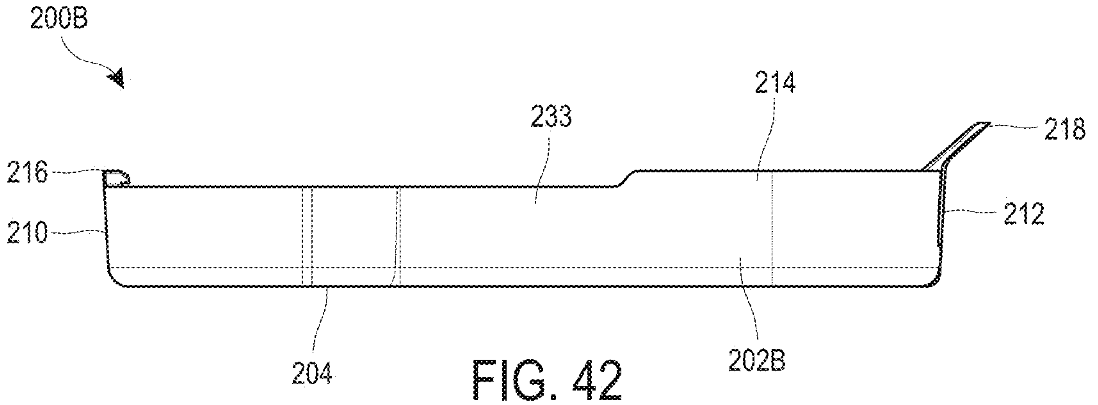
FIG. 42 illustrates a second side view of a pad of a massage tool as shown in FIG. 37.
Figure 43:
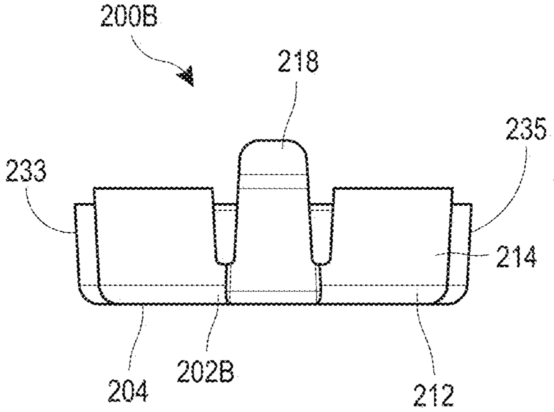
FIG. 43 illustrates a rear view of a pad of a massage tool as shown in FIG. 37.
Figure 44:
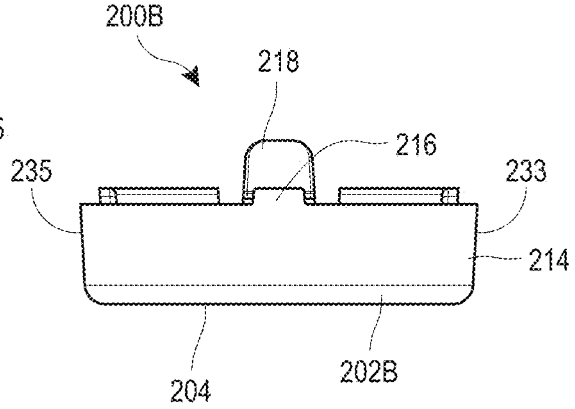
FIG. 44 illustrates a front view of a pad of a massage tool as shown in FIG. 37.

FIG. 37 illustrates a first perspective view of an embodiment of a pad 200B. FIG. 38 illustrates a second perspective view of the pad 200B. FIG. 39 illustrates a top view of the pad 200B. FIG. 40 illustrates a bottom view of the pad 200B. FIG. 41 illustrates a first side view of the pad 200B. FIG. 42 illustrates a second side view of the pad 200B. FIG. 43 illustrates a rear view of the pad 200B. FIG. 44 illustrates a front view of the pad 200B.

The pad 200B can include any of the same or similar features or functions as the pad 200. As shown in FIGS. 37-44, the pad 200B can include a base 202B having bottom surface 204 and a top surface 222B. The top surface 222B can include a plurality of struts or ridges 224B. In certain embodiments, a depth is defined between a top surface of the struts 224B and the bottom surface 204 of the bases 202B. The top surface 222B can be sized, shaped, and/or otherwise configured to receive the bottom surface 124 of the platform 120. When the pad 200B is coupled to the platform 200, the struts 224B can abut the bottom surface 124 of the platform so that the depth between the top surface of the struts 224B and the bottom surface of the base 202B defines an additional depth through which the head 106 must extend so as to change the depth of tissue penetration during a treatment procedure.

Figure 45:
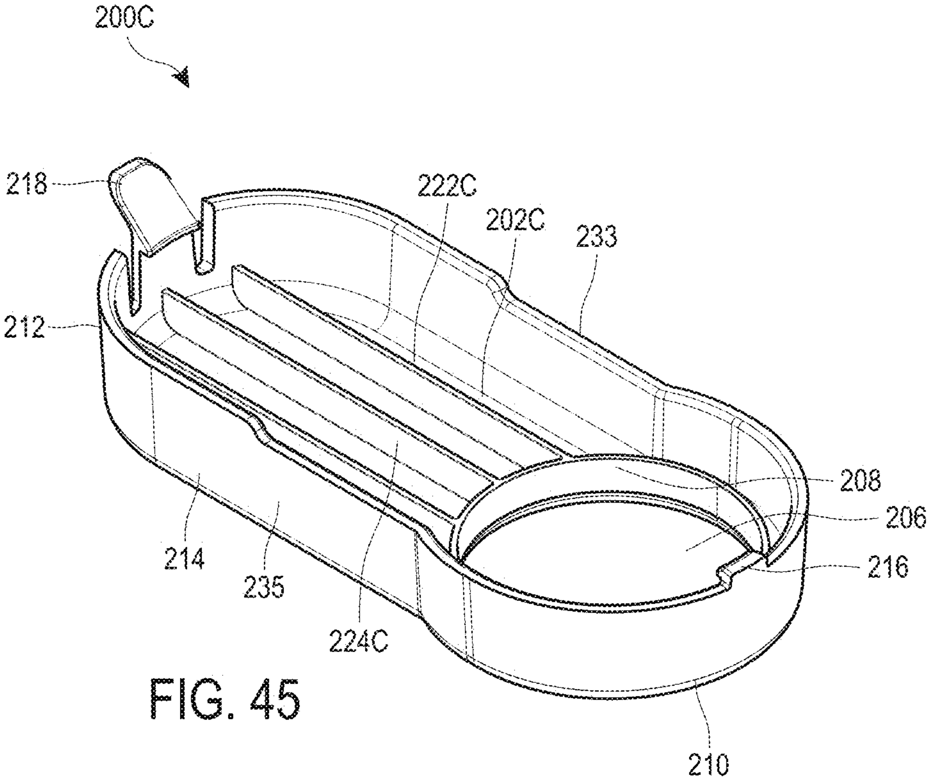
FIG. 45 illustrates a perspective view of an embodiment of a pad of a massage tool.
Figure 46:
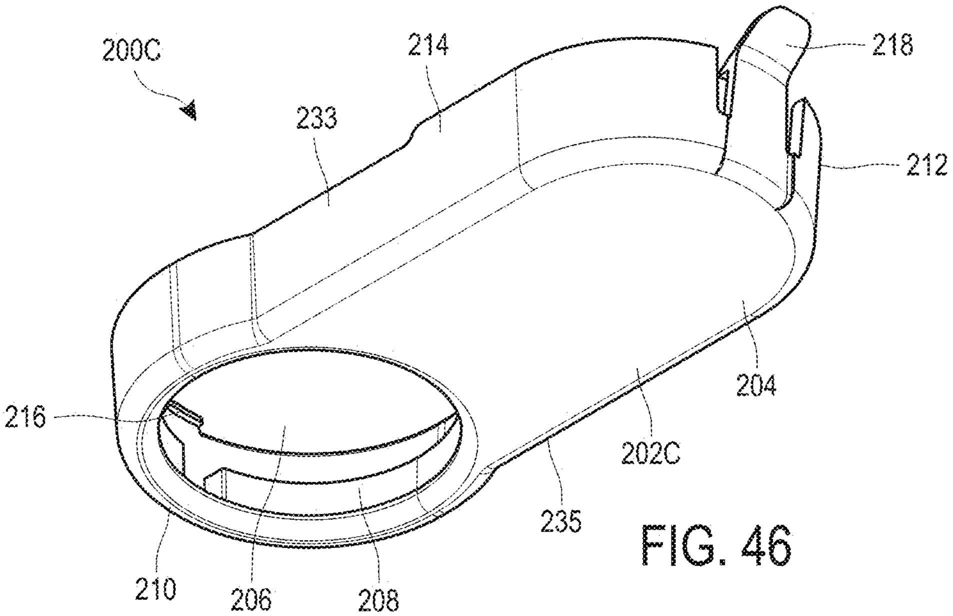
FIG. 46 illustrates a perspective view of a pad of a massage tool as shown in FIG. 45.
Figure 47:
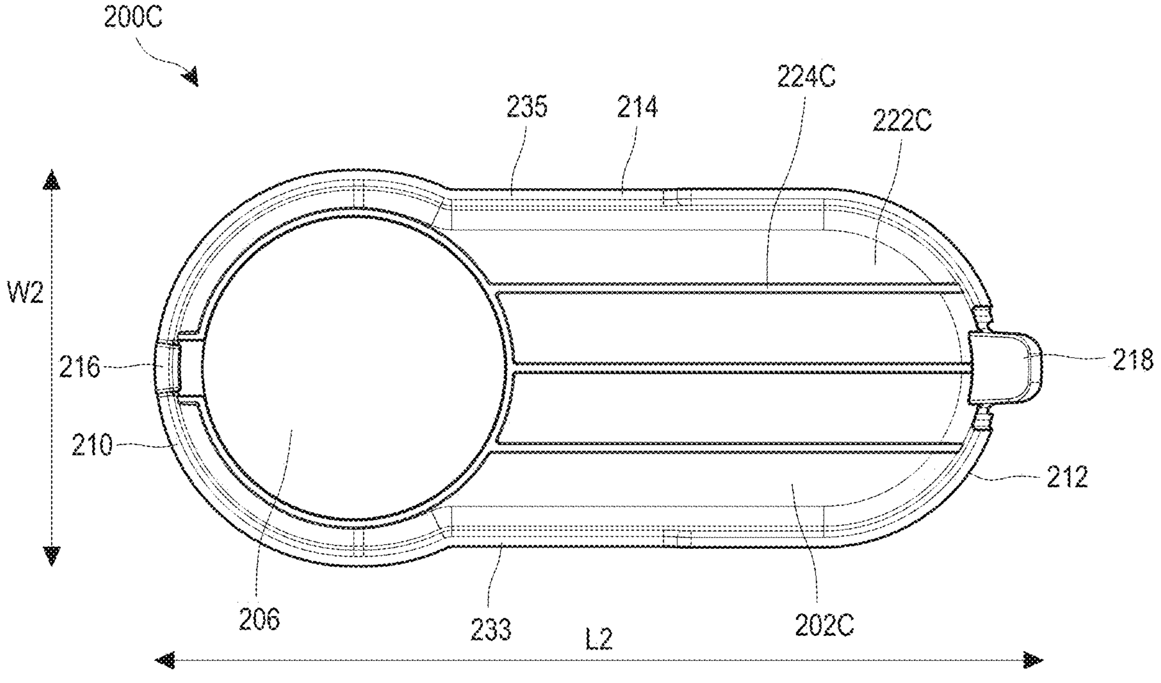
FIG. 47 illustrates a top view of a pad of a massage tool as shown in FIG. 45.
Figure 48:
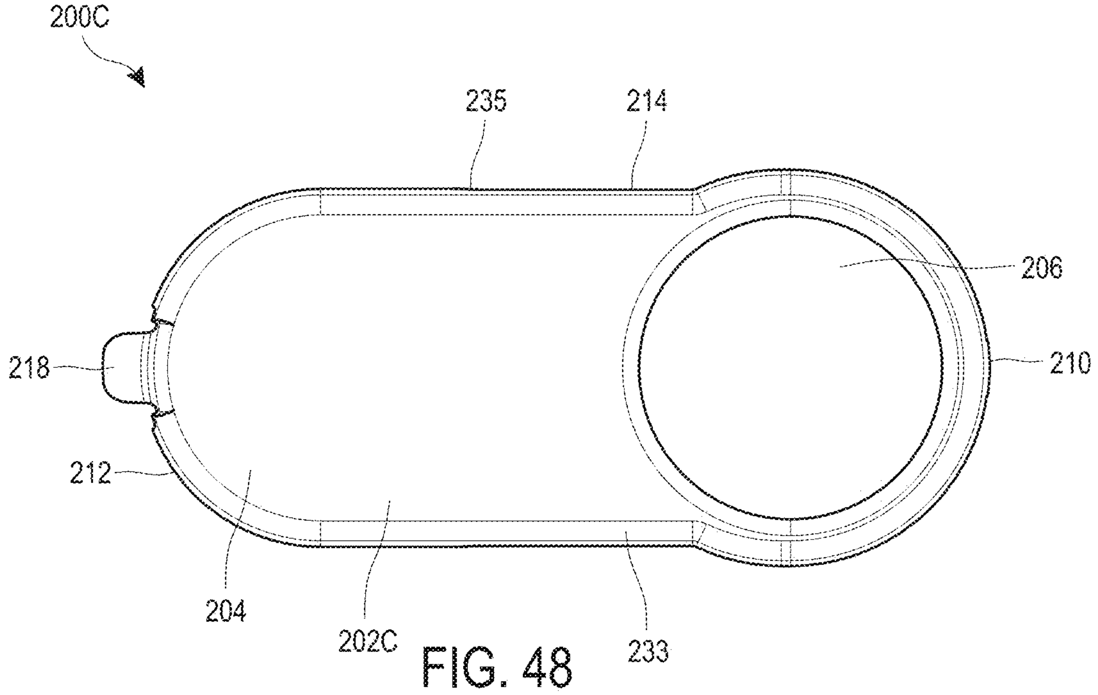
FIG. 48 illustrates a bottom view of a pad of a massage tool as shown in FIG. 45.
Figure 49:
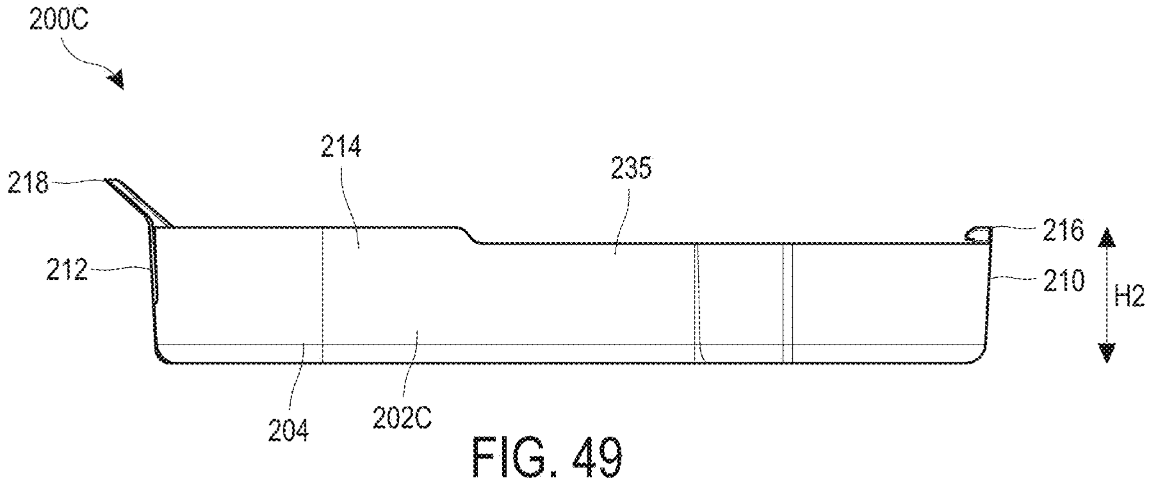
FIG. 49 illustrates a first side view of a pad of a massage tool as shown in FIG. 45.
Figure 50:
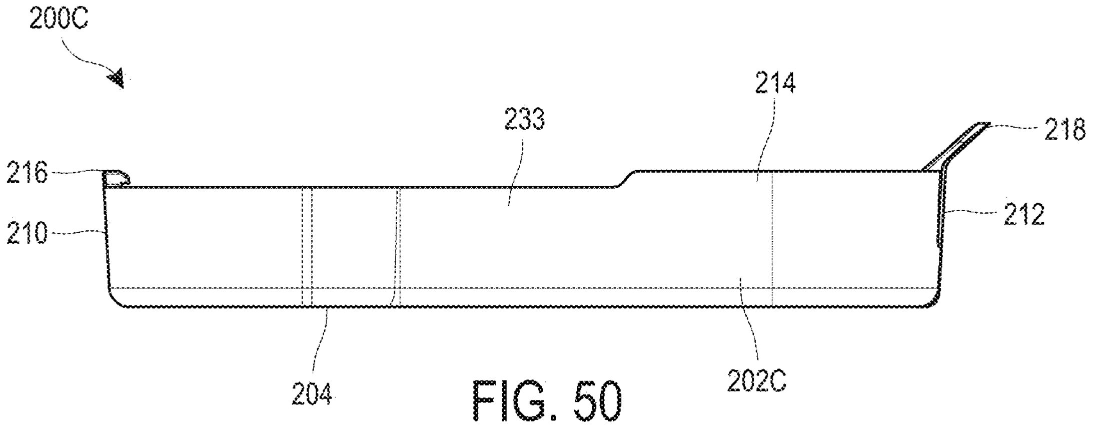
FIG. 50 illustrates a second side view of a pad of a massage tool as shown in FIG. 45.
Figure 51:
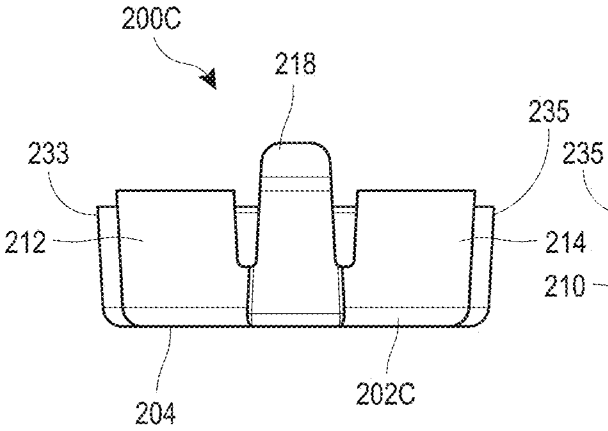
FIG. 51 illustrates a rear view of a pad of a massage tool as shown in FIG. 45.
Figure 52:
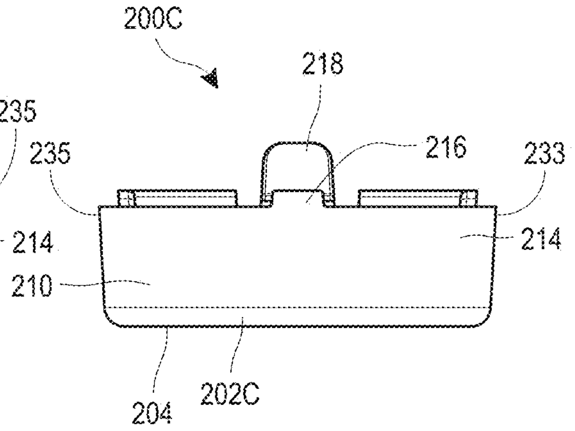
FIG. 52 illustrates a front view of a pad of a massage tool as shown in FIG. 45.

FIG. 45 illustrates a first perspective view of an embodiment of a pad 200C. FIG. 46 illustrates a second perspective view of the pad 200C. FIG. 47 illustrates a top view of the pad 200C. FIG. 48 illustrates a bottom view of the pad 200C. FIG. 49 illustrates a first side view of the pad 200C. FIG. 50 illustrates a second side view of the pad 200C. FIG. 51 depicts a illustrates view of the pad 200C. FIG. 52 illustrates a front view of the pad 200C.

The pad 200C can include any of the same or similar features or functions as the pad 200. As shown in FIGS. 45-52, the pad 200C can include a base 202C having bottom surface 204 and a top surface 222C. The top surface 222C can include a plurality of struts or ridges 224C. In certain embodiments, a depth is defined between a top surface of the struts 224C and the bottom surface 204 of the bases 202C. The top surface 222C can be sized, shaped, and/or otherwise configured to receive the bottom surface 124 of the platform 120. When the pad 200C is coupled to the platform 200, the struts 224C can abut the bottom surface 124 of the platform so that the depth between the top surface of the struts 224C and the bottom surface of the base 202C defines an additional depth through which the head 106 must extend so as to change the depth of tissue penetration during a treatment procedure.

Figure 53:
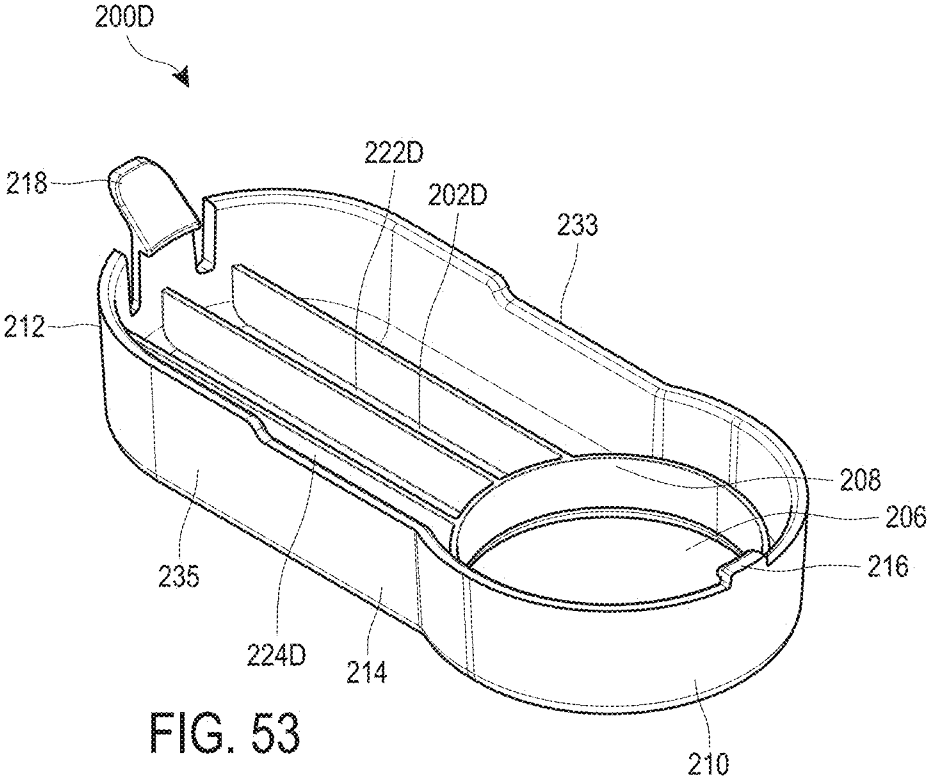
FIG. 53 illustrates a perspective view of an embodiment of a pad of a massage tool.
Figure 54:
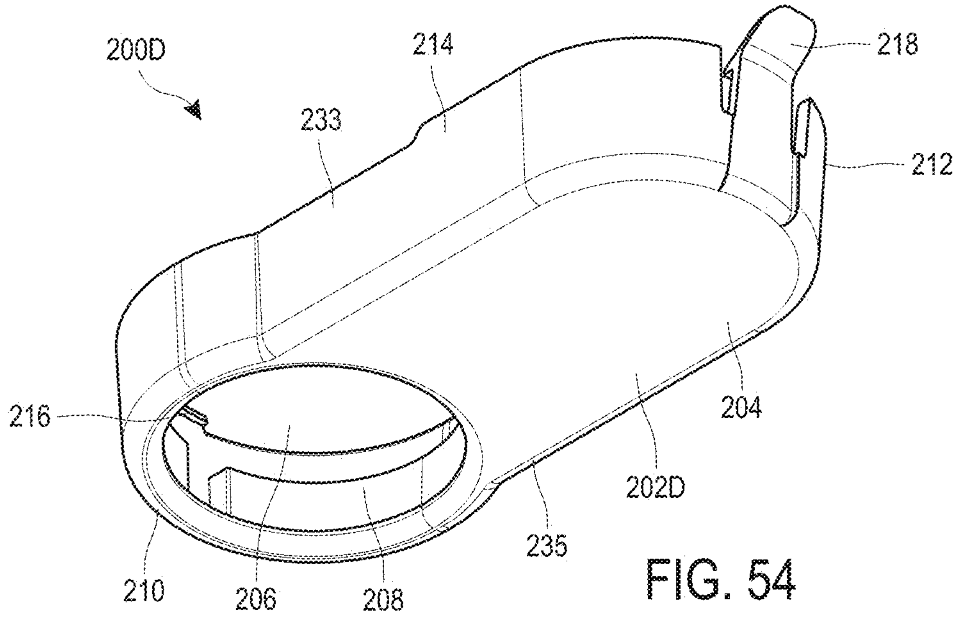
FIG. 54 illustrates a perspective view of a pad of a massage tool as shown in FIG. 53.
Figure 55:
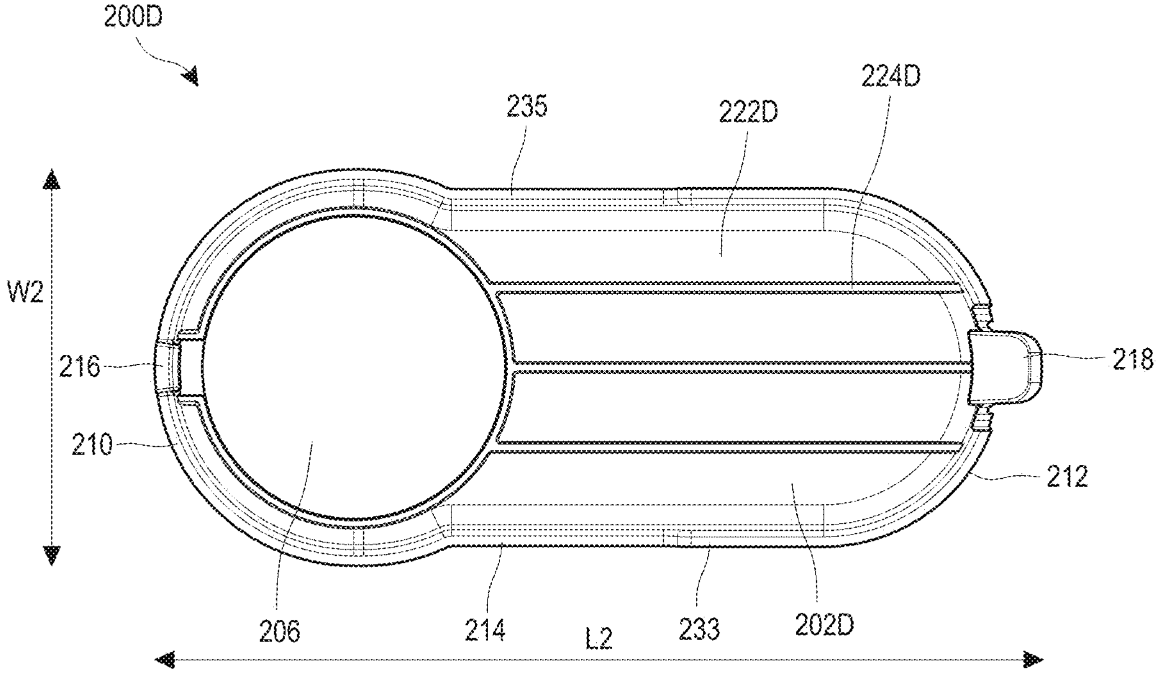
FIG. 55 illustrates a top view of a pad of a massage tool as shown in FIG. 53.
Figure 56:
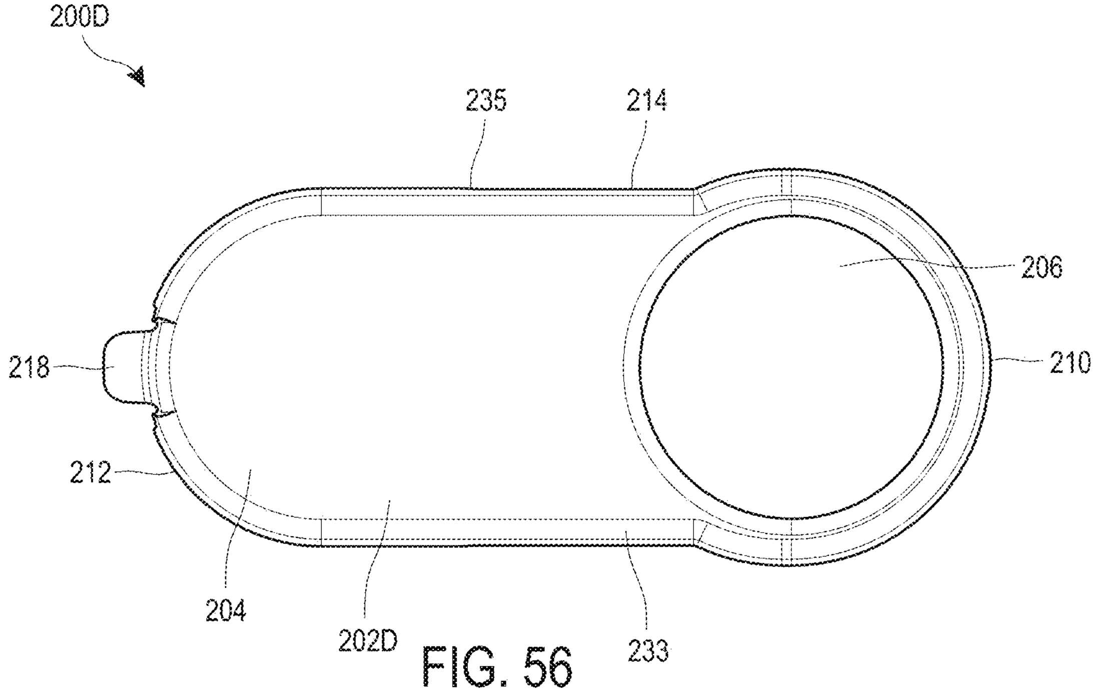
FIG. 56 illustrates a bottom view of a pad of a massage tool as shown in FIG. 53.
Figure 57:
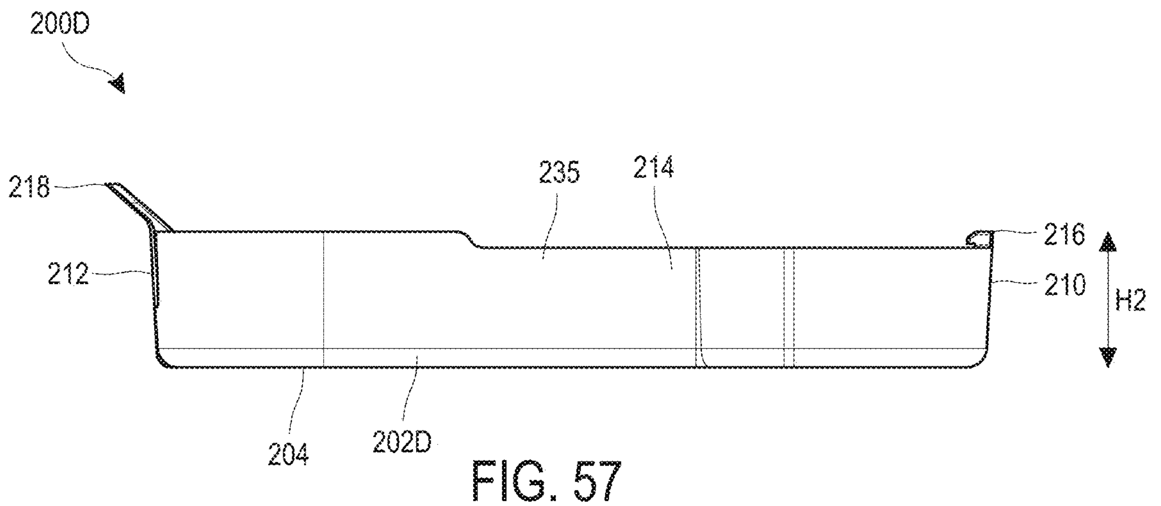
FIG. 57 illustrates a first side view of a pad of a massage tool as shown in FIG. 53.
Figure 58:
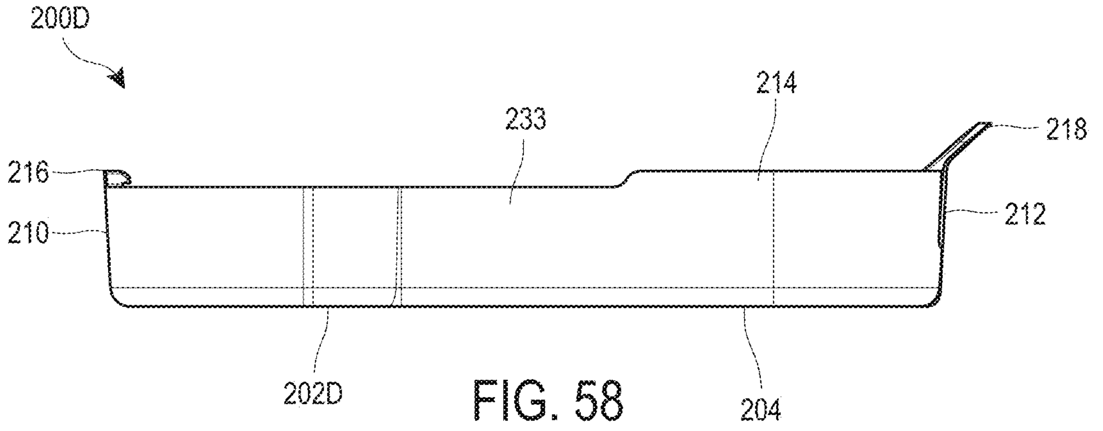
FIG. 58 illustrates a second side view of a pad of a massage tool as shown in FIG. 53.
Figure 59:
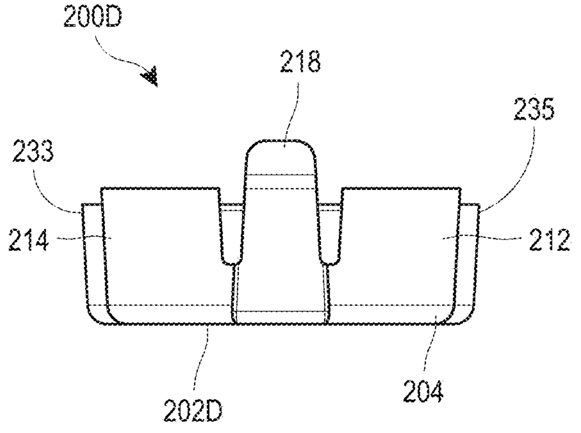
FIG. 59 illustrates a rear view of a pad of a massage tool as shown in FIG. 53.
Figure 60:
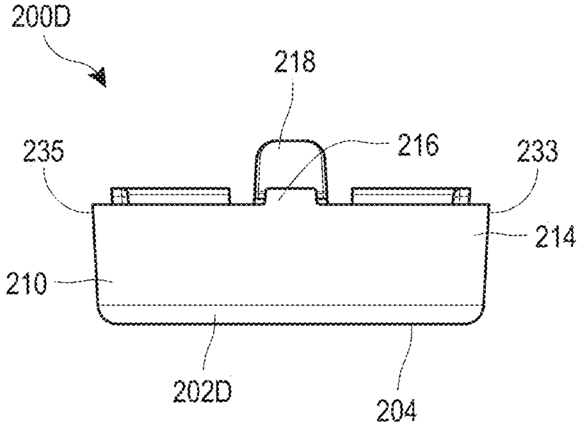
FIG. 60 illustrates a front view of a pad of a massage tool as shown in FIG. 53.

FIG. 53 illustrates a first perspective view of an embodiment of a pad 200D. FIG. 54 illustrates a second perspective view of the pad 200D. FIG. 55 illustrates a top view of the pad 200D. FIG. 56 illustrates a bottom view of the pad 200D. FIG. 57 illustrates a first side view of the pad 200D. FIG. 58 illustrates a second side view of the pad 200D. FIG. 59 illustrates a rear view of the pad 200D. FIG. 60 illustrates a front view of the pad 200D.

The pad 200D can include any of the same or similar features or functions as the pad 200. As shown in FIGS. 53-60, the pad 200D can include a base 202D having bottom surface 204 and a top surface 222D. The top surface 222D can include a plurality of struts or ridges 224D. In certain embodiments, a depth is defined between a top surface of the struts 224D and the bottom surface 204 of the bases 202D. The top surface 222D can be sized, shaped, and/or otherwise configured to receive the bottom surface 124 of the platform 120. When the pad 200D is coupled to the platform 200, the struts 224D can abut the bottom surface 124 of the platform so that the depth between the top surface of the struts 224D and the bottom surface of the base 202D defines an additional depth through which the head 106 must extend so as to change the depth of tissue penetration during a treatment procedure.

Equine Massage Therapy

As discussed herein, the massage tools and systems of the present application, such as the massage tool 100, can be used to apply a massage treatment to a treatment region of a human patient. In certain embodiments, the massage tools and systems discussed herein, such as the massage tool 100, can be used to apply a massage treatment to a treatment region of an animal. In certain embodiments, the massage tools and systems discussed herein, such as the massage tool 100, can be used to apply a massage treatment to a treatment region of an equine patient. With a human or equine patient, treating a myofascial trigger point, a muscle knot, or other defect can require incremental steps of massage intensity. As described herein, massage intensity can be affected by depth of penetration as well as diameter and durometer of the massage head 106.

In some embodiments, it may be desirably to treat an equine patient while the equine patient is in a standing position. In an equine patient, knots in the muscles, as well as the muscles in general, are generally in a contracted state while the horse is standing. Due to the contracted state of the muscles, a relatively small range of massage intensity can be comfortably applied to the equine patient. Based on the foregoing, it may be desirable to increase intensity in relatively small incremental steps to treat any myofascial trigger points, muscle knots, or other defects. Such incremental treatment may be applied using the massage tool 100 with one or more pads 200 as described herein. Additionally a plurality of heads 160 may be used with the massage tool 100 to allow for a variety of intensities when performing a massage therapy. In some embodiments, it may be beneficial to increase the depth of penetration in increments of 0.125 inches or more than 0.12.5 inches, for example, using a plurality of pads 200.

Massage Therapy Examples

In certain embodiments, a massage head 106 having a contact portion 108A with a hardness of 15 Shore A can be used at a depth of 0.4 inches for massage of a top of the neck of a patient, the forearms of the patient, the bicep of the patient near the elbow, the tricep of the patient near the elbow, and/or the palm of the hand. In certain embodiments, a massage head 106 having a contact portion 108A with a hardness of 15 Shore A can be used at a depth of 0.65 inches for massage of a trapezius muscle of the patient and/or small muscles in the exterior of the calf of the patient. In certain embodiments, a massage head 106 having a contact portion 108A with a hardness of 30 Shore A can be used at a depth of 0.65 inches for massage of a major portion of the calf of the patient.

In certain embodiments, a massage head 106 having a contact portion 1088 with a hardness of 15 Shore A can be used at a depth of 0.4 inches for massage of a base of the neck of the patient and/or a major portion of the bicep of the patient. In certain embodiments, a massage head 106 having a contact portion 108B with a hardness of 15 Shore A can be used at a depth of 0.65 inches for massage of a quadricep of the patient and/or a major portion of the triceps of the patient. In certain embodiments, a massage head 106 having a contact portion 108B with a hardness of 30 Shore A can be used at a depth of 0.65 inches for massage of the erector spinae.

In certain embodiments, a massage head 106 having a contact portion 108C with a hardness of 50 Shore A can be used at a depth of 1.0 inch for massage of the major gluteus muscles below the erector spinae of the patient.

In certain embodiments, a massage head 106 having a contact portion 108D with a hardness of 15 Shore A can be used at a depth of 0.65 inches for massage of the deltoids of the patient. In certain embodiments, a massage head 106 having a contact portion 108D with a hardness of 30 Shore A can be used at a depth of 0.65 inches for massage of the soles of the feet and/or the IT band of the patient.

In certain embodiments, a massage head 106 having a contact portion 108E with a hardness of 15 Shore A can be used at a depth of 0.65 inches for massage of the base of the back, the upper gluteus muscles, the latissimus dorsi muscles, and/or the pectoral muscles of the patient. In certain embodiments, a massage head 106 having a contact portion 108E with a hardness of 30 Shore A can be used at a depth of 0.65 inches for massage of the hips of the patient.

In certain embodiments, a massage head 106 having a contact portion 108F with a hardness of 50 Shore A can be used at a depth of 1.05 inches for massage of the hamstrings.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope,

What is claimed is:

1. A massage system comprising:

a massage tool comprising:
- a massage head configured to contact a treatment region of a patient during a massage treatment procedure;
- a body comprising a handle;
- a connector comprising a first end and a second end, wherein the first end is releasably secured to the body and the second end is coupled to the massage head;
- a motor positioned within the body and configured to drive movement of the massage head relative to the body;

a platform providing a support configured to transfer a force of the massage tool to the treatment region of the patient during a massage treatment procedure, the platform defining an opening, wherein the platform is positioned so that the massage head extends at least partially through the opening of the platform during movement of the massage head relative to the body, wherein a portion of a bottom surface of the platform extending between the opening of the platform and a back end of the platform defines an elongate flat surface, wherein the elongate flat surface of the platform is configured to contact and move across the treatment region of the patient while maintaining contact with the treatment region; and a pad removably couplable to the platform, the pad defining an opening, wherein the pad is positioned so that the massage head extends at least partially through the opening of the pad during movement of the massage head relative to the body when the pad is coupled to the platform, wherein the pad is shaped and dimensioned to change a depth of tissue penetration of the massage head when the pad is coupled to the platform and the massage tool is placed against the treatment region of the patient, wherein the pad comprises an elongate flat surface extending between the opening of the pad and a back end of the pad, wherein the elongate flat surface of the pad is configured to contact and move across the treatment region of the patient when the pad is coupled to the platform and support, and wherein the elongate flat surface of the pad also extends between a first side of the pad and a second side of the pad where the first side and the second side are spaced apart by a width at least as wide as a maximum width defined by the opening of the pad, and wherein the elongate flat surface of the pad entirely covers the elongate flat surface of the platform.

2. The system of claim 1, wherein the pad further comprises a first coupling member configured to releasably engage a top surface of the platform at a front end of the platform and a second coupling member configured to releasably engage the top surface of the platform at a rear end of the platform.

3. The system of claim 1, wherein at least a portion of the pad is at least partially transparent.

4. The system of claim 1, wherein a top surface of the pad comprises a plurality of ridges.

5. The system of claim 1, wherein the pad is a first pad, the system further comprising a second pad removably couplable to the platform, wherein the first pad is shaped and dimensioned to change a depth of tissue penetration of the massage head by a first amount when the first pad is coupled to the platform and the massage tool is placed against the treatment region of the patient and the second pad is shaped and dimensioned to change the depth of tissue penetration of the massage head by a second amount when the second pad is coupled to the platform and the massage tool is placed against the treatment region of the patient, the first amount being different from the second amount.

6. The system of claim 1, wherein the massage head is removable from the massage tool.

7. The system of claim 1, further comprising an apron comprising a plurality of compartments, wherein at least one of the plurality of compartments is configured to receive the massage head when the massage head is removed from the massage tool.

8. The system of claim 1, wherein the massage head is a single massage head, wherein the single massage head is the only massage head coupled to the body of the massage tool during the massage treatment procedure, wherein the single massage head is coupled to the body of the massage tool at only a single location; and wherein the platform comprises:
- a front end;
- the back end, wherein a length of the platform extends between the front end and the back end;
- a first side surface;
- a second side surface, wherein a width of the platform extends between the first side surface and the second side surface;
- a top surface; and the bottom surface, wherein a depth of the platform extends between the top surface and the bottom surface, wherein the opening of the platform extends through the platform between the top surface and the bottom surface, wherein an area defined by the bottom surface of the platform is greater than a cross-sectional area of the opening of the platform, the cross-sectional area being defined within the opening of the platform and extending within the same plane defined by the bottom surface of the platform, and wherein a length of the elongate flat surface of the platform extends between the opening of the platform and the back end of the platform, wherein a width of the elongate flat surface of the platform extends between the first side surface and the second side surface, and wherein the length of the elongate flat surface of the platform is greater than the width of the elongate flat surface of the platform.

9. A method for performing massage therapy, comprising:
aligning a massage head of a massage tool with a treatment region of a patient, the massage tool comprising:
the massage head;
a body comprising a handle;
a motor positioned within the body and configured to drive movement of the massage head relative to the body; and
a platform defining an opening, wherein the platform is positioned so that the massage head extends at least partially through the opening of the platform during movement of the massage head relative to the body, wherein a portion of a bottom surface of the platform extending between the opening of the platform and a back end of the platform defines an elongate flat surface, wherein the elongate flat surface of the platform is configured to contact and move across the treatment region of the patient while maintaining contact with the treatment region; and
coupling a pad to the platform to change a depth of tissue penetration of the massage head during a massage treatment procedure, the pad defining an opening, wherein the pad is positioned so that the massage head extends at least partially through the opening of the pad during movement of the massage head relative to the body when the pad is coupled to the platform, wherein the pad comprises an elongate flat surface extending between the opening of the pad and a back end of the pad, wherein the elongate flat surface of the pad is configured to contact and move across the treatment region of the patient when the pad is coupled to the platform and support, and wherein the elongate flat surface of the pad entirely covers the elongate flat surface of the platform.

10. The method of claim 9, further comprising:
placing the pad against the treatment region of the patient after coupling the pad to the platform; and
activating the motor to drive the massage head to reciprocate at a first depth of tissue penetration while the pad is coupled to the platform.

11. The method of claim 10, further comprising:
removing the pad from the platform;
coupling a second pad to the platform; and
placing the second pad against the treatment region of the patient after coupling the second pad to the platform to cause the massage head to reciprocate at a second depth of tissue penetration different from the first depth of tissue penetration.

12. The method of claim 11, wherein removing the pad from the platform and coupling the second pad to the platform are performed while the motor is activated.

13. The method of claim 10, further comprising:
removing the pad from the platform; and
placing the platform against the treatment region of the patient after removing the pad from the platform to cause the massage head to reciprocate at a second depth of tissue penetration different from the first depth.

14. The method of claim 9, further comprising:
placing the platform against the treatment region of the patient prior to coupling the pad to the platform;
activating the motor to drive the massage head to reciprocate at a first depth of tissue penetration; and
placing the pad against the treatment region of the patient after coupling the pad to the platform to cause the massage head to reciprocate at a second depth of tissue penetration different from the first depth of tissue penetration.

15. The method of claim 9, further comprising moving the pad across the surface of the treatment region while the massage head is reciprocating.

16. The method of claim 9, wherein the massage head is a single massage head, wherein the single massage head is the only massage head coupled to the body of the massage tool during the massage treatment procedure, wherein the single massage head is coupled to the body of the massage tool at only a single location; and
wherein the platform comprises:
a front end;
the back end, wherein a length of the platform extends between the front end and the back end;
a first side surface;
a second side surface, wherein a width of the platform extends between the first side surface and the second side surface;
a top surface; and
the bottom surface, wherein a depth of the platform extends between the top surface and the bottom surface,
wherein the opening of the platform extends through the platform between the top surface and the bottom surface
wherein an area defined by the bottom surface of the platform is greater than a cross-sectional area of the opening of the platform, the cross-sectional area being defined within the opening of the platform and extending within the same plane defined by the bottom surface of the platform, and
wherein a length of the elongate flat surface of the platform extends between the opening of the platform and the back end of the platform, wherein a width of the elongate flat surface of the platform extends between the first side surface and the second side surface, and wherein the length of the elongate flat surface of the platform is greater than the width of the elongate flat surface of the platform.

17. A method for performing massage therapy on an equine patient, comprising:
aligning a massage head of a massage tool with a treatment region of the equine patient, the massage tool comprising:
the massage head;
a body comprising a handle;
a motor positioned within the body and configured to drive movement of the massage head relative to the body to impact the equine patient when the massage head is aligned with the treatment region of the equine patient; and
a platform defining an opening, wherein the platform is positioned so that the massage head extends at least partially through the opening of the platform during movement of the massage head relative to the body, wherein a portion of a bottom surface of the platform extending between the opening of the platform and a back end of the platform defines an elongate flat surface, wherein the elongate flat surface of the platform is configured to contact and move across the treatment region of the patient while maintaining contact with the treatment region; and
coupling a pad to the platform to change a depth of tissue penetration of the massage head during a massage treatment procedure, the pad defining an opening, wherein the pad is positioned so that the massage head extends at least partially through the opening of the pad during movement of the massage head relative to the body when the pad is coupled to the platform, wherein the pad comprises an elongate flat surface extending between the opening of the pad and a back end of the pad, wherein the elongate flat surface of the pad is configured to contact and move across the treatment region of the patient when the pad is coupled to the platform and support, wherein the elongate flat surface of the pad also extends between a first side of the pad and a second side of the pad where the first side and the second side are spaced apart by a width at least as wide as a maximum width defined by the opening of the pad, and wherein the elongate flat surface of the pad entirely covers the elongate flat surface of the platform.

18. The method of claim 17, further comprising:

activating the motor to drive the massage head to reciprocate relative to the body of the massage tool; and moving the platform across a surface of the treatment region while the massage head is reciprocating.

19. The method of claim 17, further comprising activating the motor to drive the massage head to reciprocate relative to the body of the massage tool.

20. The method of claim 17, wherein the massage head is a single massage head, wherein the single massage head is the only massage head coupled to the body of the massage tool during the massage treatment procedure, wherein the single massage head is coupled to the body of the massage tool at only a single location; and wherein the platform comprises:

a front end;

the back end, wherein a length of the platform extends between the front end and the back end;

a first side surface;

a second side surface, wherein a width of the platform extends between the first side surface and the second side surface;

a top surface; and the bottom surface, wherein a depth of the platform extends between the top surface and the bottom surface, wherein the opening of the platform extends through the platform between the top surface and the bottom surface, wherein an area defined by the bottom surface of the platform is greater than a cross-sectional area of the opening of the platform, the cross-sectional area being defined within the opening of the platform and extending within the same plane defined by the bottom surface of the platform, and wherein a length of the elongate flat surface of the platform extends between the opening of the platform and the back end of the platform, wherein a width of the elongate flat surface of the platform extends between the first side surface and the second side surface, and wherein the length of the elongate flat surface of the platform is greater than the width of the elongate flat surface of the platform.

* * * * *